(12) United States Patent
Counihan

(10) Patent No.: US 9,747,642 B1
(45) Date of Patent: Aug. 29, 2017

(54) AUTOMATED METHOD OF IDENTIFYING STOCK INDEXES WHICH ARE HISTORICALLY HIGH OR LOW RELATIVE TO A PLURALITY OF MACROECONOMIC INDICATORS

(71) Applicant: Financial Realizer, LLC, Wilmington, DE (US)

(72) Inventor: Christopher R. Counihan, Wilmington, DE (US)

(73) Assignee: Financial Realizer, LLC, Wilmington, DE (US)

( * ) Notice: Subject to any disclaimer, the term of this patent is extended or adjusted under 35 U.S.C. 154(b) by 266 days.

(21) Appl. No.: 14/452,753

(22) Filed: Aug. 6, 2014

Related U.S. Application Data

(60) Provisional application No. 61/864,696, filed on Aug. 12, 2013.

(51) Int. Cl.
*G06Q 40/04* (2012.01)
*G06F 17/30* (2006.01)
*G06T 13/60* (2011.01)
*G06T 13/20* (2011.01)

(52) U.S. Cl.
CPC ............ *G06Q 40/04* (2013.01); *G06F 17/30* (2013.01); *G06F 17/3053* (2013.01); *G06F 17/30958* (2013.01); *G06T 13/20* (2013.01); *G06T 13/60* (2013.01)

(58) Field of Classification Search
CPC ........ G06Q 40/04; G06Q 40/06; G06F 17/30; G06F 17/30958; G06F 17/3053; G06T 13/60; G06T 13/20; G06C 40/04
See application file for complete search history.

(56) References Cited

U.S. PATENT DOCUMENTS

| | | | | |
|---|---|---|---|---|
| 7,219,034 | B2* | 5/2007 | McGee | G06F 11/323 348/672 |
| 7,552,076 | B1* | 6/2009 | Uenohara | G06Q 40/06 705/36 R |
| 2005/0055267 | A1* | 3/2005 | Chasanoff | G06Q 40/04 84/609 |
| 2007/0262994 | A1* | 11/2007 | Meighan | H04L 41/12 345/473 |
| 2011/0258569 | A1* | 10/2011 | Weir | G06F 3/04847 715/771 |

(Continued)

FOREIGN PATENT DOCUMENTS

GB    2 440 171    * 1/2008    ......... G06Q 10/00

OTHER PUBLICATIONS

Xie, Yihui: Animation: An R Package for Creating Animations and Demonstrating Statistical Methods, Apr. 2013, Journal of Statistical Software, vol. 53, Issue 1, pp. 1-27.*

(Continued)

*Primary Examiner* — Bijendra K Shrestha
(74) *Attorney, Agent, or Firm* — Panitch Schwarze Belisario & Nadel LLP

(57) ABSTRACT

An automated method is provided of identifying stock indexes which are historically high or historically low relative to a plurality of a macroeconomic indicators. A frequency distribution graph may then be constructed of the data points which visualizes the price history of the stock indexes in an animated graphical representation.

6 Claims, 73 Drawing Sheets

(56) References Cited

U.S. PATENT DOCUMENTS

| | | | | |
|---|---|---|---|---|
| 2011/0261049 | A1* | 10/2011 | Cardno | G06Q 10/10 |
| | | | | 345/419 |
| 2013/0116987 | A1* | 5/2013 | Zhang | G06F 8/10 |
| | | | | 703/2 |
| 2014/0280057 | A1* | 9/2014 | Oskin | G06F 17/30554 |
| | | | | 707/722 |

OTHER PUBLICATIONS

Yau, Nathan: How to Visualize and Compare Distributions, 2007, pp. 1-10.*

Woodring et al.: Multiscale Time Activity Data Exploration via Temporal Clustering Visualization Spreadsheet, Jan./Feb. 2009, IEEE Transactions on Visualization and Computer Graphics, vol. 15, No. 1, pp. 123-137.*

Harkins, Susan: Animating Individual Elements of a Power Point Chart, Nov. 22, 2011, Tech Republic, pp. 1-11.*

\* cited by examiner

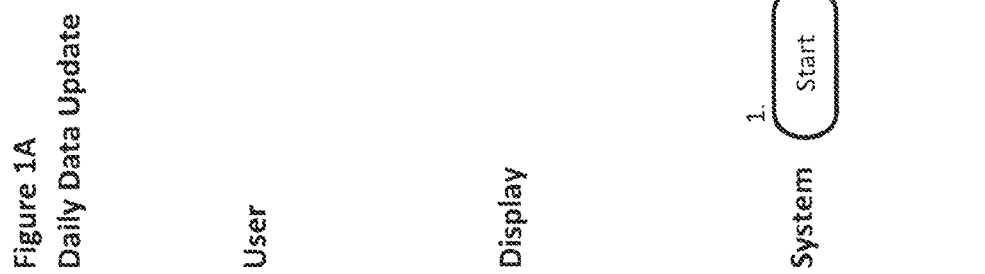

Daily Data Update (continued from Figure 1A)

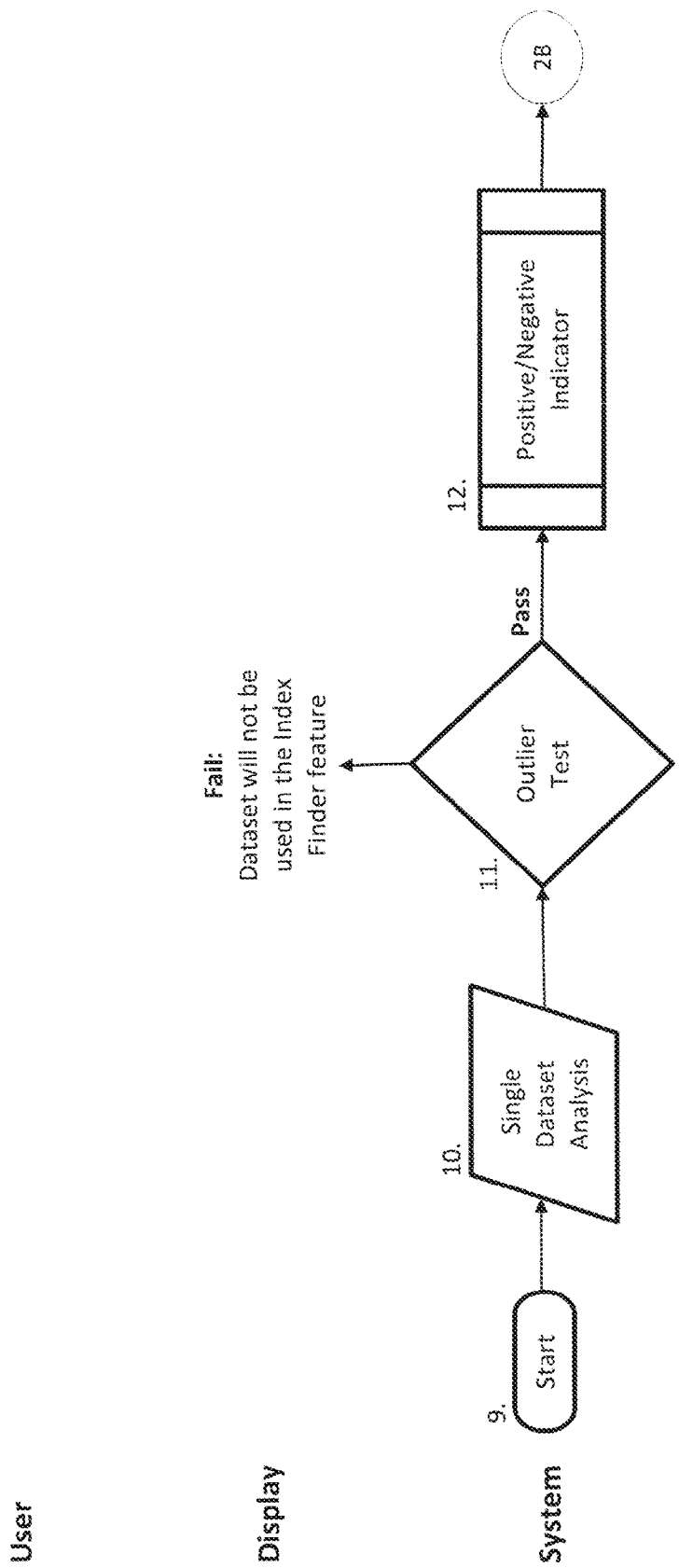

Index Finder (continued from Figure 2A)

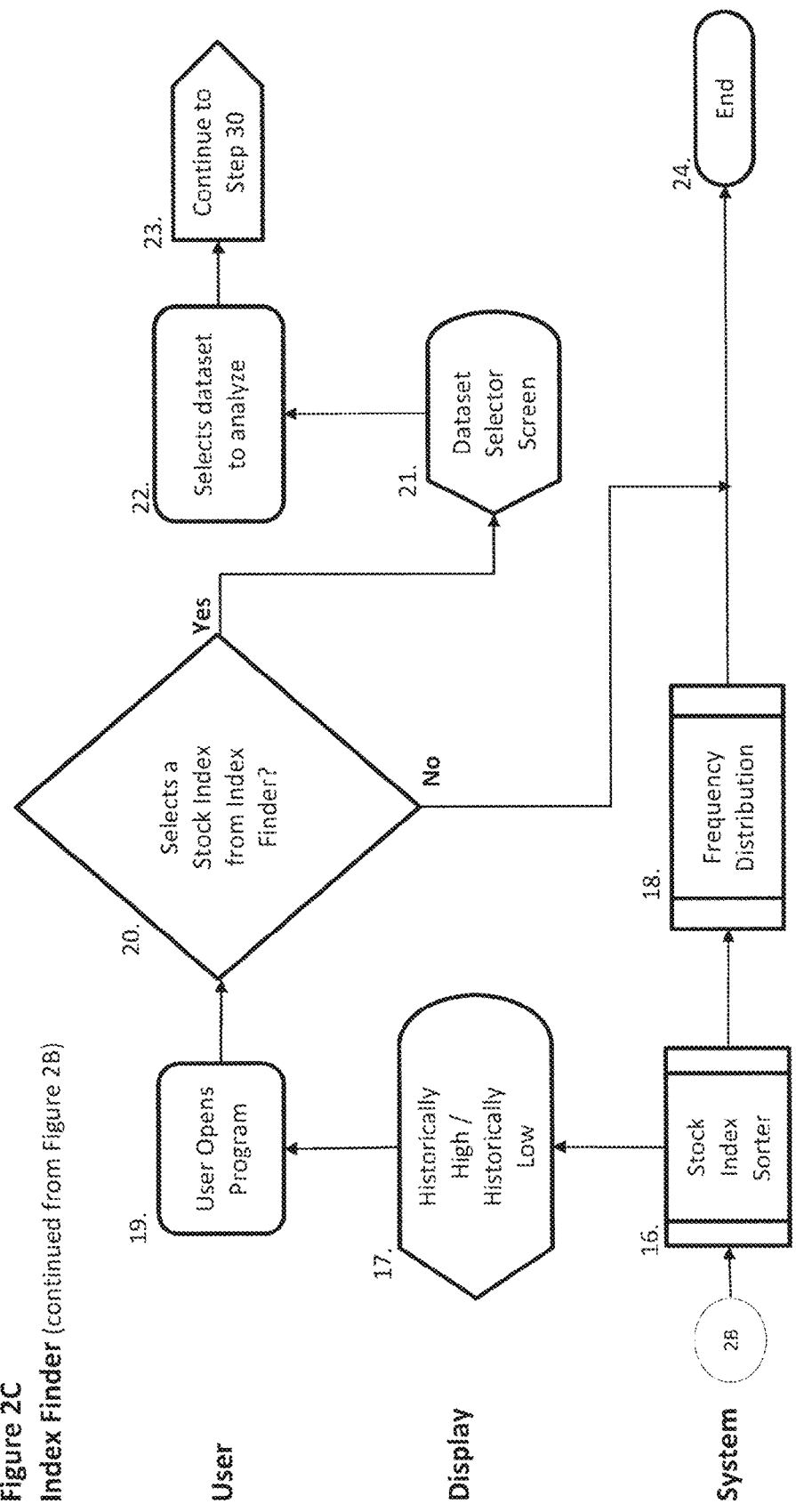

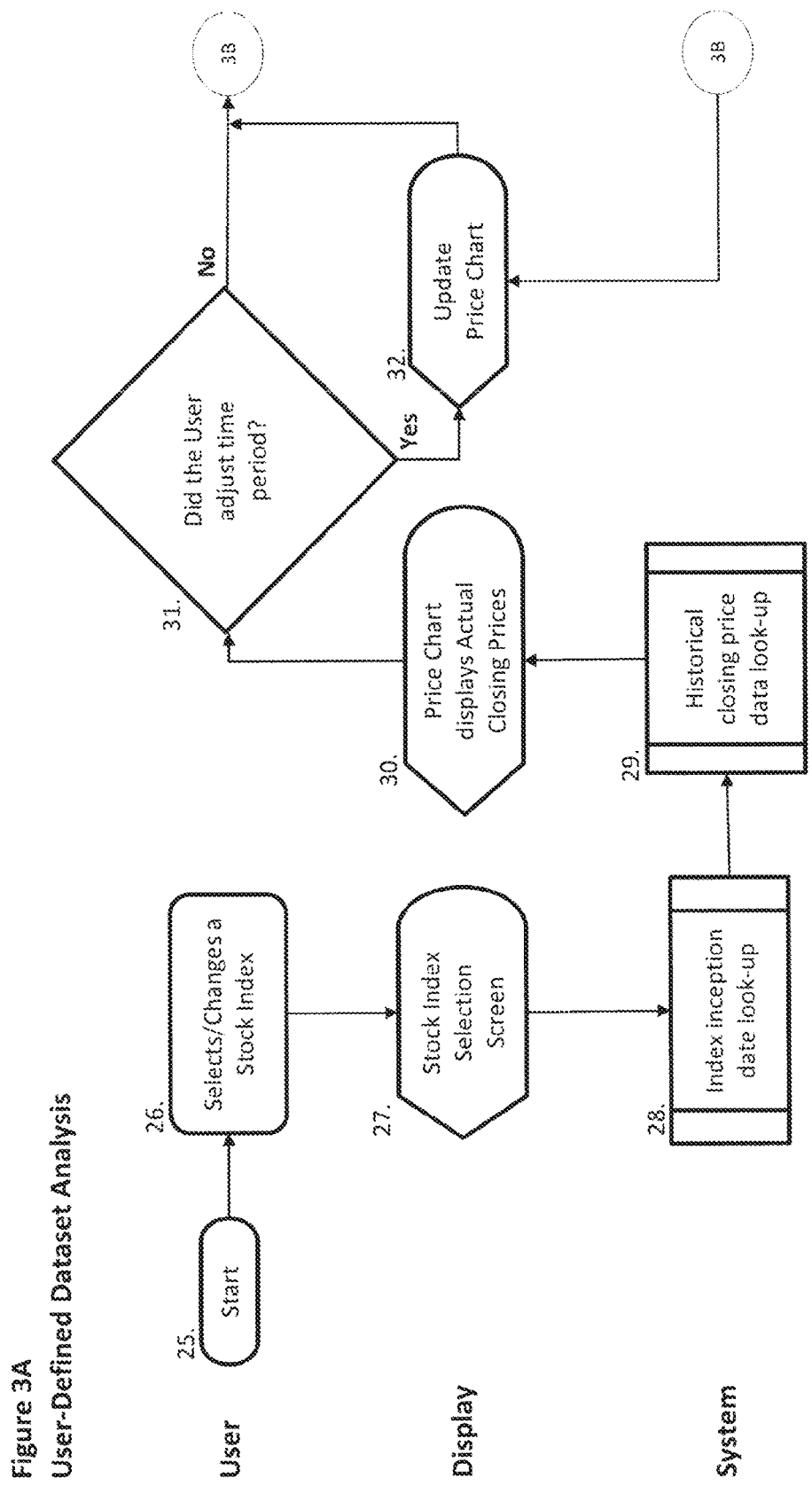

User-Defined Dataset Analysis (continued from Figure 3A)

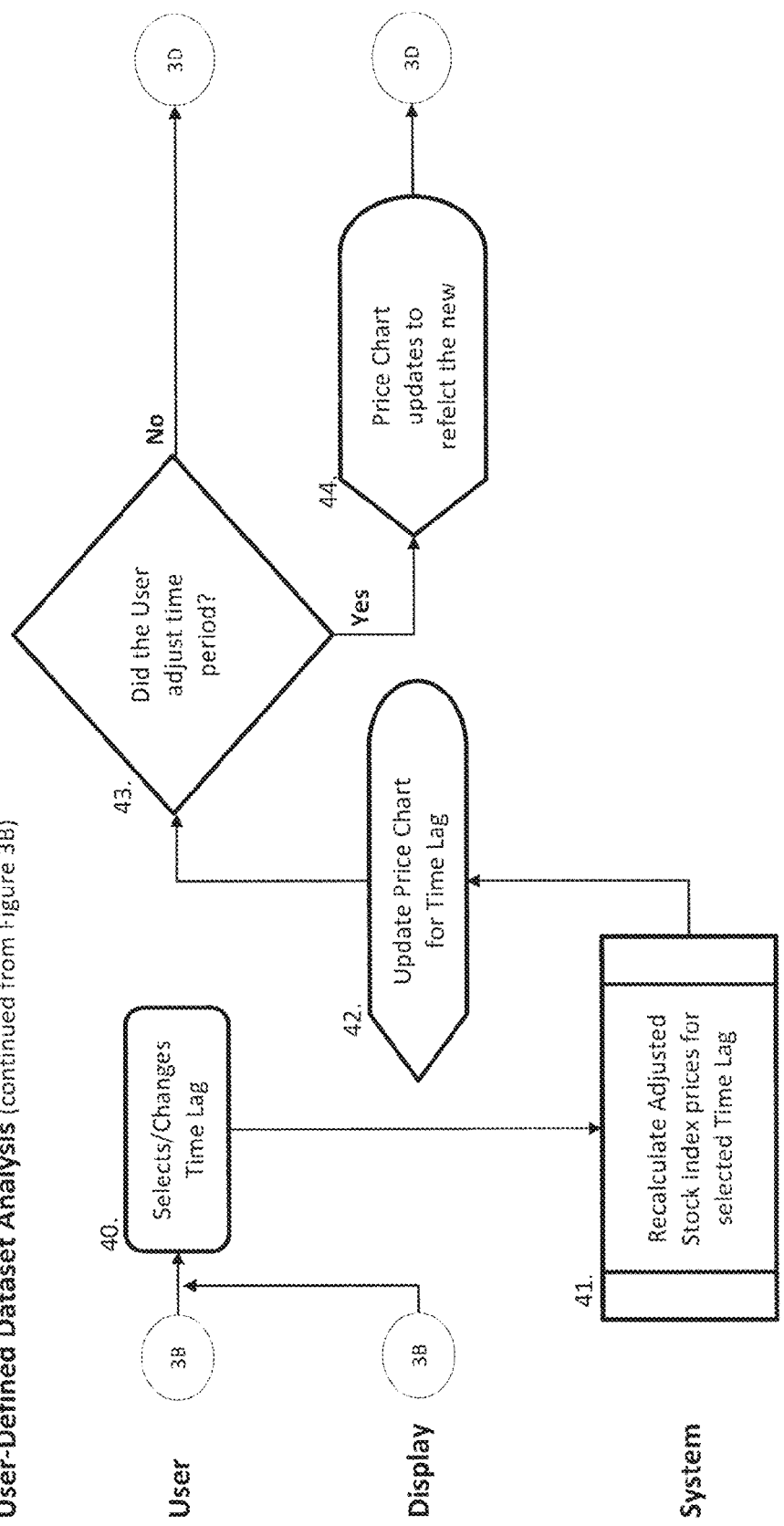

User-Defined Dataset Analysis (continued from Figure 3C)

DataFall Effect

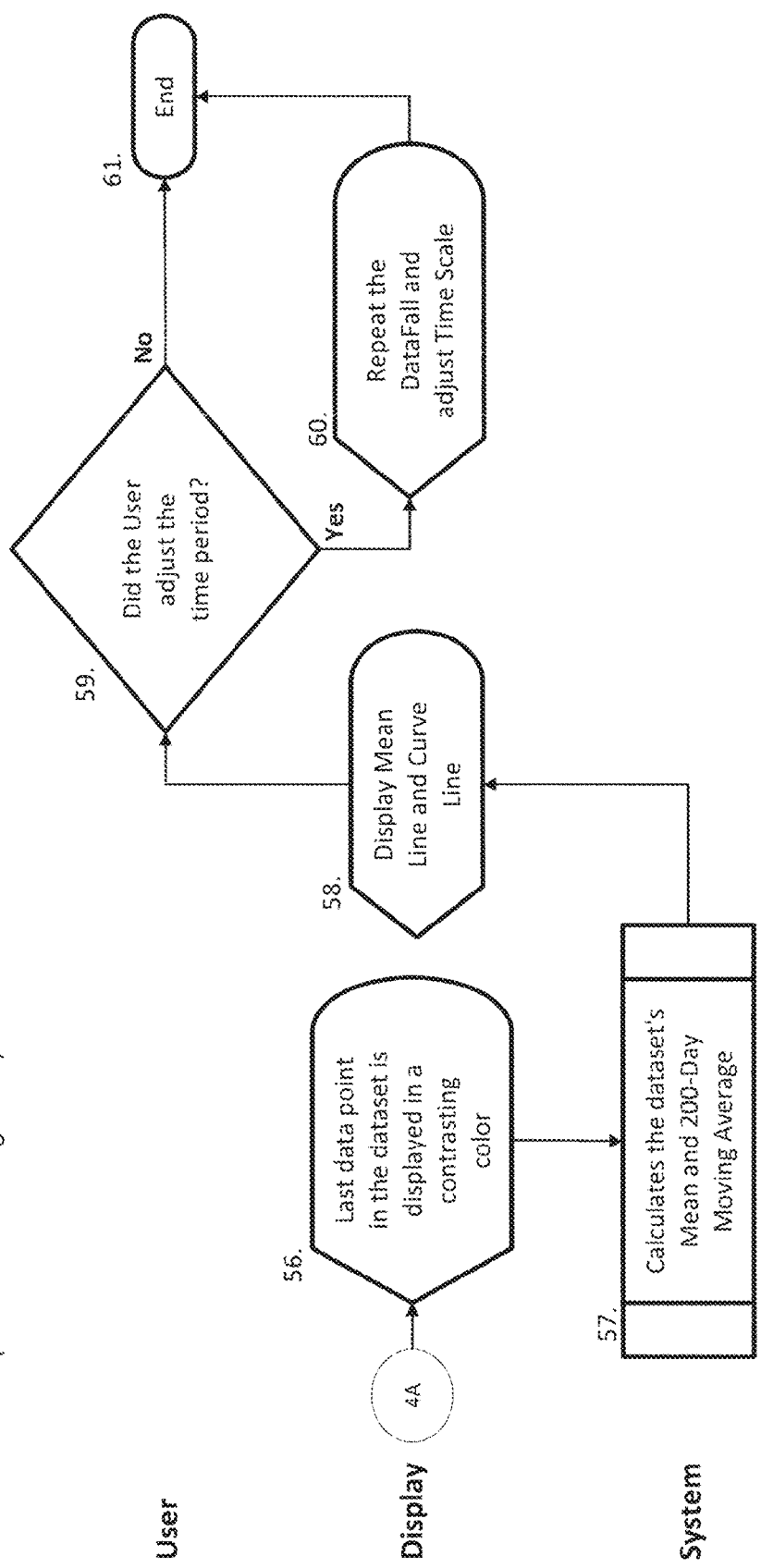

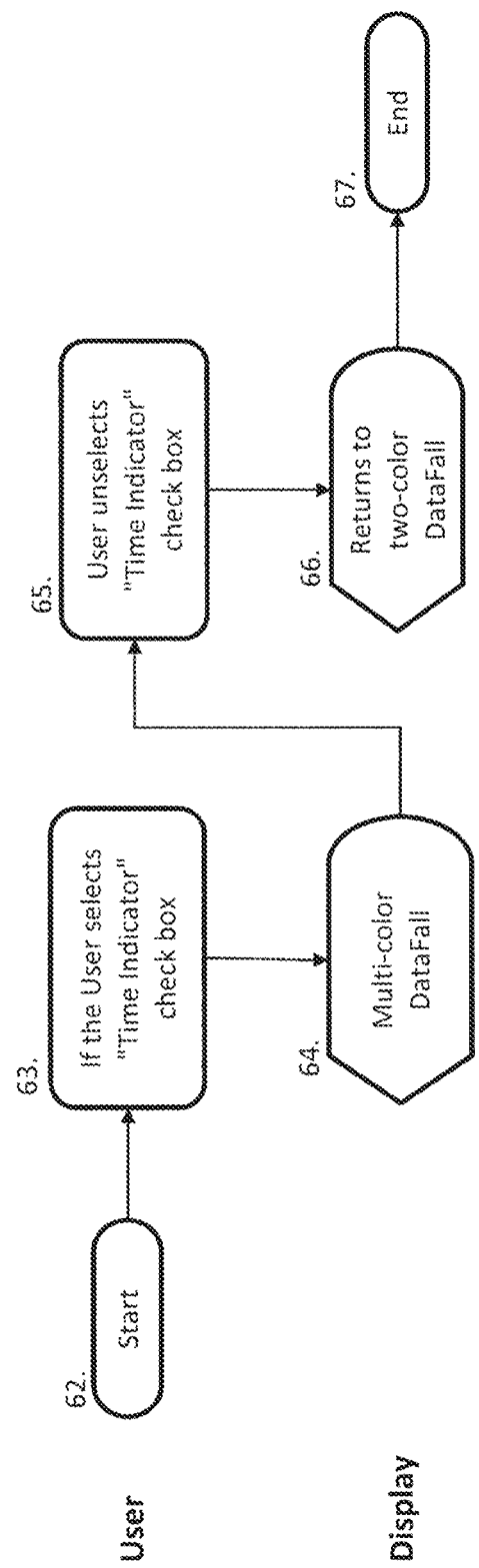

Curve Morphing

Curve Morphing (continued from Figure 6A)

Trade Execution

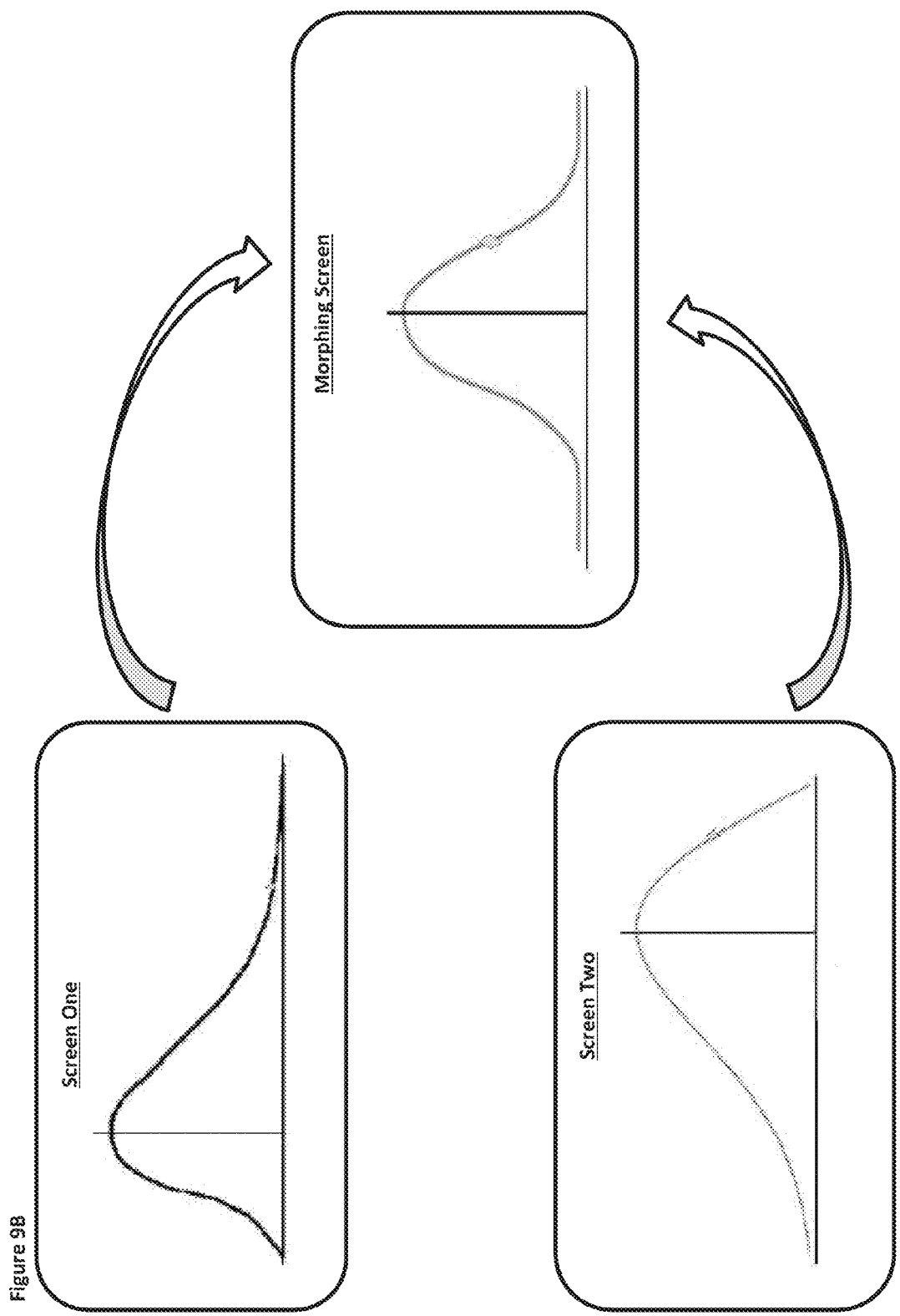

Figure 10A  Dataset Example
Stock Index = S&P 500
Macroeconomic Indicator = Consumer Price Index for All Urban Consumers: All Items, Index 2007-12=100
Time Lag = None

|  | Column a | Column b | Column c | Column d |
|---|---|---|---|---|
| Date | Stock Index Close | Macroeconomic Indicator | Macroeconomic Adjustment Factor Formula | Adjustment Factor |
| 1/20/1997 | 776.70 | 159.4065 | = (Macroeconomic Indicator for 7/23/2014) / (Macroeconomic Indicator for 1/20/1997) | 1.5015 |
| 1/21/1997 | 782.72 | 159.4226 | = (Macroeconomic Indicator for 7/23/2014) / (Macroeconomic Indicator for 1/21/1997) | 1.5014 |
| 1/22/1997 | 786.23 | 159.4387 | = (Macroeconomic Indicator for 7/23/2014) / (Macroeconomic Indicator for 1/22/1997) | 1.5012 |
| 1/23/1997 | 777.56 | 159.4548 | = (Macroeconomic Indicator for 7/23/2014) / (Macroeconomic Indicator for 1/23/1997) | 1.5011 |
| 1/24/1997 | 770.52 | 159.4710 | = (Macroeconomic Indicator for 7/23/2014) / (Macroeconomic Indicator for 1/24/1997) | 1.5009 |
| 1/27/1997 | 765.02 | 159.5194 | = (Macroeconomic Indicator for 7/23/2014) / (Macroeconomic Indicator for 1/27/1997) | 1.5005 |
| 1/28/1997 | 765.02 | 159.5355 | = (Macroeconomic Indicator for 7/23/2014) / (Macroeconomic Indicator for 1/28/1997) | 1.5003 |
| 1/29/1997 | 772.50 | 159.5516 | = (Macroeconomic Indicator for 7/23/2014) / (Macroeconomic Indicator for 1/29/1997) | 1.5002 |
| 1/30/1997 | 784.17 | 159.5677 | = (Macroeconomic Indicator for 7/23/2014) / (Macroeconomic Indicator for 1/30/1997) | 1.5000 |
| 1/31/1997 | 786.16 | 159.5839 | = (Macroeconomic Indicator for 7/23/2014) / (Macroeconomic Indicator for 1/31/1997) | 1.4999 |
| 2/3/1997 | 786.73 | 159.6286 | = (Macroeconomic Indicator for 7/23/2014) / (Macroeconomic Indicator for 2/1/1997) | 1.4994 |
| 2/4/1997 | 789.26 | 159.6429 | = (Macroeconomic Indicator for 7/23/2014) / (Macroeconomic Indicator for 2/2/1997) | 1.4993 |
| ⋮ | ⋮ | ⋮ | ⋮ | ⋮ |
| 6/27/2014 | 1,960.96 | 238.9124 | = (Macroeconomic Indicator for 7/23/2014) / (Macroeconomic Indicator for 6/27/1997) | 1.0019 |
| 6/30/2014 | 1,960.23 | 238.9781 | = (Macroeconomic Indicator for 7/23/2014) / (Macroeconomic Indicator for 6/30/1997) | 1.0016 |
| 7/1/2014 | 1,973.32 | 239.0000 | = (Macroeconomic Indicator for 7/23/2014) / (Macroeconomic Indicator for 7/1/1997) | 1.0015 |
| 7/2/2014 | 1,974.62 | 239.0161 | = (Macroeconomic Indicator for 7/23/2014) / (Macroeconomic Indicator for 7/2/1997) | 1.0014 |
| 7/3/2014 | 1,985.44 | 239.0323 | = (Macroeconomic Indicator for 7/23/2014) / (Macroeconomic Indicator for 7/3/1997) | 1.0013 |
| 7/7/2014 | 1,977.65 | 239.0968 | = (Macroeconomic Indicator for 7/23/2014) / (Macroeconomic Indicator for 7/7/1997) | 1.0011 |
| 7/8/2014 | 1,963.71 | 239.1129 | = (Macroeconomic Indicator for 7/23/2014) / (Macroeconomic Indicator for 7/8/1997) | 1.0010 |
| 7/9/2014 | 1,972.83 | 239.1290 | = (Macroeconomic Indicator for 7/23/2014) / (Macroeconomic Indicator for 7/9/1997) | 1.0009 |
| 7/10/2014 | 1,964.68 | 239.1452 | = (Macroeconomic Indicator for 7/23/2014) / (Macroeconomic Indicator for 7/10/1997) | 1.0009 |
| 7/11/2014 | 1,967.57 | 239.1613 | = (Macroeconomic Indicator for 7/23/2014) / (Macroeconomic Indicator for 7/11/1997) | 1.0008 |
| 7/14/2014 | 1,977.10 | 239.2097 | = (Macroeconomic Indicator for 7/23/2014) / (Macroeconomic Indicator for 7/14/1997) | 1.0006 |
| 7/15/2014 | 1,973.28 | 239.2258 | = (Macroeconomic Indicator for 7/23/2014) / (Macroeconomic Indicator for 7/15/1997) | 1.0005 |
| 7/16/2014 | 1,981.57 | 239.2419 | = (Macroeconomic Indicator for 7/23/2014) / (Macroeconomic Indicator for 7/16/1997) | 1.0005 |
| 7/17/2014 | 1,958.12 | 239.2581 | = (Macroeconomic Indicator for 7/23/2014) / (Macroeconomic Indicator for 7/17/1997) | 1.0004 |
| 7/18/2014 | 1,978.22 | 239.2742 | = (Macroeconomic Indicator for 7/23/2014) / (Macroeconomic Indicator for 7/18/1997) | 1.0003 |
| 7/21/2014 | 1,973.63 | 239.3226 | = (Macroeconomic Indicator for 7/23/2014) / (Macroeconomic Indicator for 7/21/1997) | 1.0001 |
| 7/22/2014 | 1,983.53 | 239.3387 | = (Macroeconomic Indicator for 7/23/2014) / (Macroeconomic Indicator for 7/22/1997) | 1.0001 |
| 7/23/2014 | 1,987.01 | 239.3548 | = (Macroeconomic Indicator for 7/23/2014) / (Macroeconomic Indicator for 7/23/1997) | 1.0000 |

Figure 10B Dataset Example

Stock Index = S&P 500
Macroeconomic Indicator = Consumer Price Index for All Urban Consumers: All Items, Index 2007-12=100
Time Lag = None

| Date | Stock Index Adjustment Factor Formula | Adjusted Stock Index Close |
|---|---|---|
| | Column e | Column f |
| 1/20/1997 | = (Stock Index Closing Price on 1/20/1997) * (Adjustment Factor for 1/20/1997) | 1166.24 |
| 1/21/1997 | = (Stock Index Closing Price on 1/21/1997) * (Adjustment Factor for 1/21/1997) | 1175.16 |
| 1/22/1997 | = (Stock Index Closing Price on 1/22/1997) * (Adjustment Factor for 1/22/1997) | 1180.32 |
| 1/23/1997 | = (Stock Index Closing Price on 1/23/1997) * (Adjustment Factor for 1/23/1997) | 1167.18 |
| 1/24/1997 | = (Stock Index Closing Price on 1/24/1997) * (Adjustment Factor for 1/24/1997) | 1156.50 |
| 1/27/1997 | = (Stock Index Closing Price on 1/27/1997) * (Adjustment Factor for 1/27/1997) | 1147.89 |
| 1/28/1997 | = (Stock Index Closing Price on 1/28/1997) * (Adjustment Factor for 1/28/1997) | 1147.78 |
| 1/29/1997 | = (Stock Index Closing Price on 1/29/1997) * (Adjustment Factor for 1/29/1997) | 1158.88 |
| 1/30/1997 | = (Stock Index Closing Price on 1/30/1997) * (Adjustment Factor for 1/30/1997) | 1176.27 |
| 1/31/1997 | = (Stock Index Closing Price on 1/31/1997) * (Adjustment Factor for 1/31/1997) | 1179.14 |
| 2/3/1997 | = (Stock Index Closing Price on 2/3/1997) * (Adjustment Factor for 2/3/1997) | 1179.56 |
| 2/4/1997 | = (Stock Index Closing Price on 2/4/1997) * (Adjustment Factor for 2/4/1997) | 1183.35 |
| ⋮ | ⋮ | |
| 6/27/2014 | = (Stock Index Closing Price on 6/27/2014) * (Adjustment Factor for 6/27/2014) | 1964.69 |
| 6/30/2014 | = (Stock Index Closing Price on 6/30/2014) * (Adjustment Factor for 6/30/2014) | 1963.37 |
| 7/1/2014 | = (Stock Index Closing Price on 7/1/2014) * (Adjustment Factor for 7/1/2014) | 1976.28 |
| 7/2/2014 | = (Stock Index Closing Price on 7/2/2014) * (Adjustment Factor for 7/2/2014) | 1977.38 |
| 7/3/2014 | = (Stock Index Closing Price on 7/3/2014) * (Adjustment Factor for 7/3/2014) | 1988.02 |
| 7/7/2014 | = (Stock Index Closing Price on 7/7/2014) * (Adjustment Factor for 7/7/2014) | 1979.83 |
| 7/8/2014 | = (Stock Index Closing Price on 7/8/2014) * (Adjustment Factor for 7/8/2014) | 1965.67 |
| 7/9/2014 | = (Stock Index Closing Price on 7/9/2014) * (Adjustment Factor for 7/9/2014) | 1974.61 |
| 7/10/2014 | = (Stock Index Closing Price on 7/10/2014) * (Adjustment Factor for 7/10/2014) | 1966.45 |
| 7/11/2014 | = (Stock Index Closing Price on 7/11/2014) * (Adjustment Factor for 7/11/2014) | 1969.14 |
| 7/14/2014 | = (Stock Index Closing Price on 7/14/2014) * (Adjustment Factor for 7/14/2014) | 1978.29 |
| 7/15/2014 | = (Stock Index Closing Price on 7/15/2014) * (Adjustment Factor for 7/15/2014) | 1974.27 |
| 7/16/2014 | = (Stock Index Closing Price on 7/16/2014) * (Adjustment Factor for 7/16/2014) | 1982.56 |
| 7/17/2014 | = (Stock Index Closing Price on 7/17/2014) * (Adjustment Factor for 7/17/2014) | 1958.90 |
| 7/18/2014 | = (Stock Index Closing Price on 7/18/2014) * (Adjustment Factor for 7/18/2014) | 1978.81 |
| 7/21/2014 | = (Stock Index Closing Price on 7/21/2014) * (Adjustment Factor for 7/21/2014) | 1973.83 |
| 7/22/2014 | = (Stock Index Closing Price on 7/22/2014) * (Adjustment Factor for 7/22/2014) | 1983.73 |
| 7/23/2014 | = (Stock Index Closing Price on 7/23/2014) * (Adjustment Factor for 7/23/2014) | 1987.01 |

Frequency Distribution Table

Figure 11

Stock Index = S&P 500
Macroeconomic Indicator = Consumer Price Index for All Urban Consumers: All Items, Index 2007-12=100
Time Lag = None

| | |
|---:|---:|
| Min. | 760.76 |
| Max. | 2134.63 |
| Median | 1475.03 |

| X-Axis Value | Frequency |
|---:|---:|
| 761 | 1 |
| 762 | 0 |
| 763 | 0 |
| 764 | 0 |
| 765 | 0 |
| ... | ... |
| 1470 | 13 |
| 1471 | 6 |
| 1472 | 8 |
| 1473 | 7 |
| 1474 | 9 |
| 1475 | 12 |
| 1476 | 11 |
| 1477 | 9 |
| 1478 | 8 |
| 1479 | 10 |
| ... | ... |
| 2129 | 1 |
| 2130 | 0 |
| 2131 | 0 |
| 2132 | 0 |
| 2133 | 0 |
| 2134 | 1 |
| 2135 | 1 |

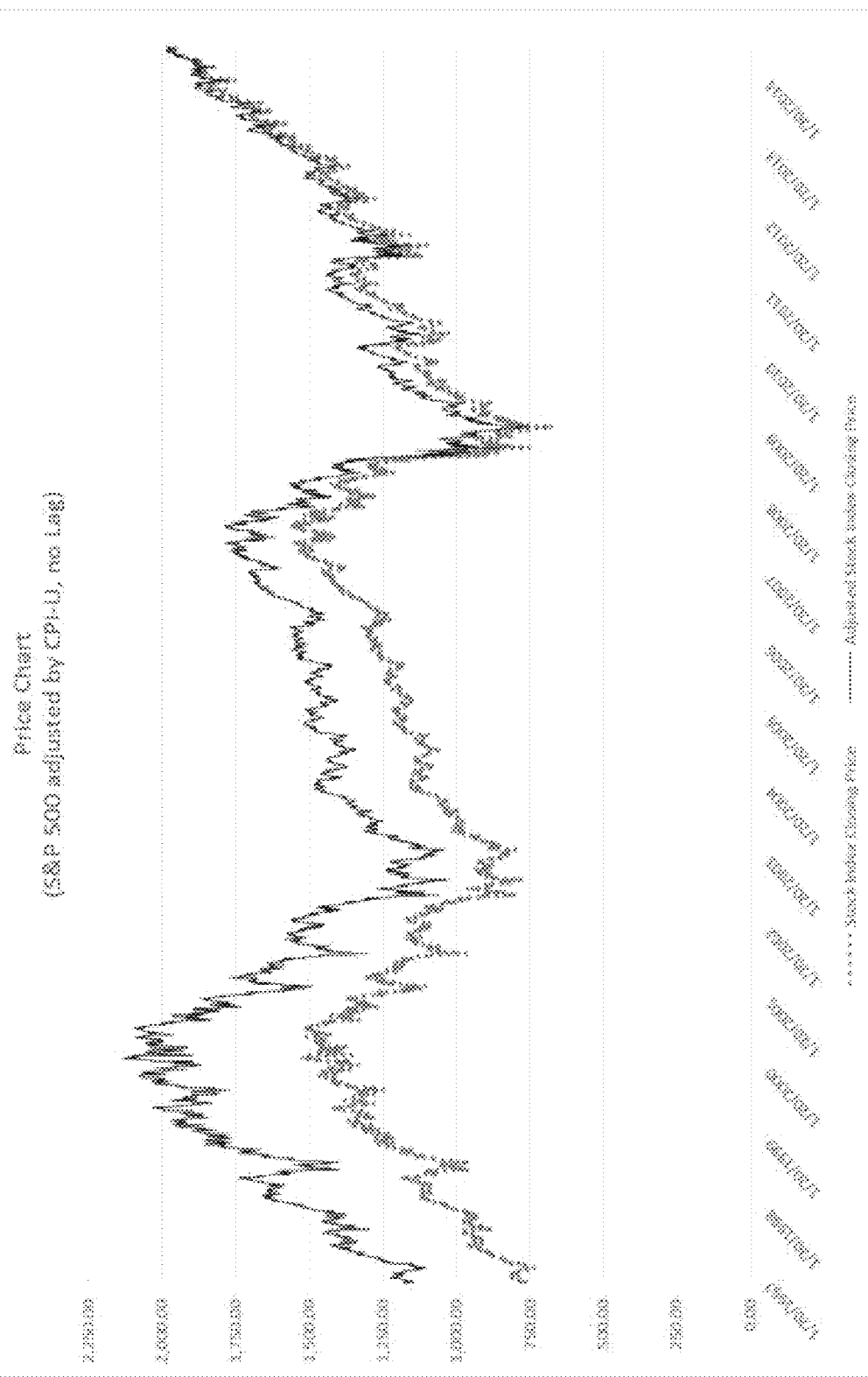

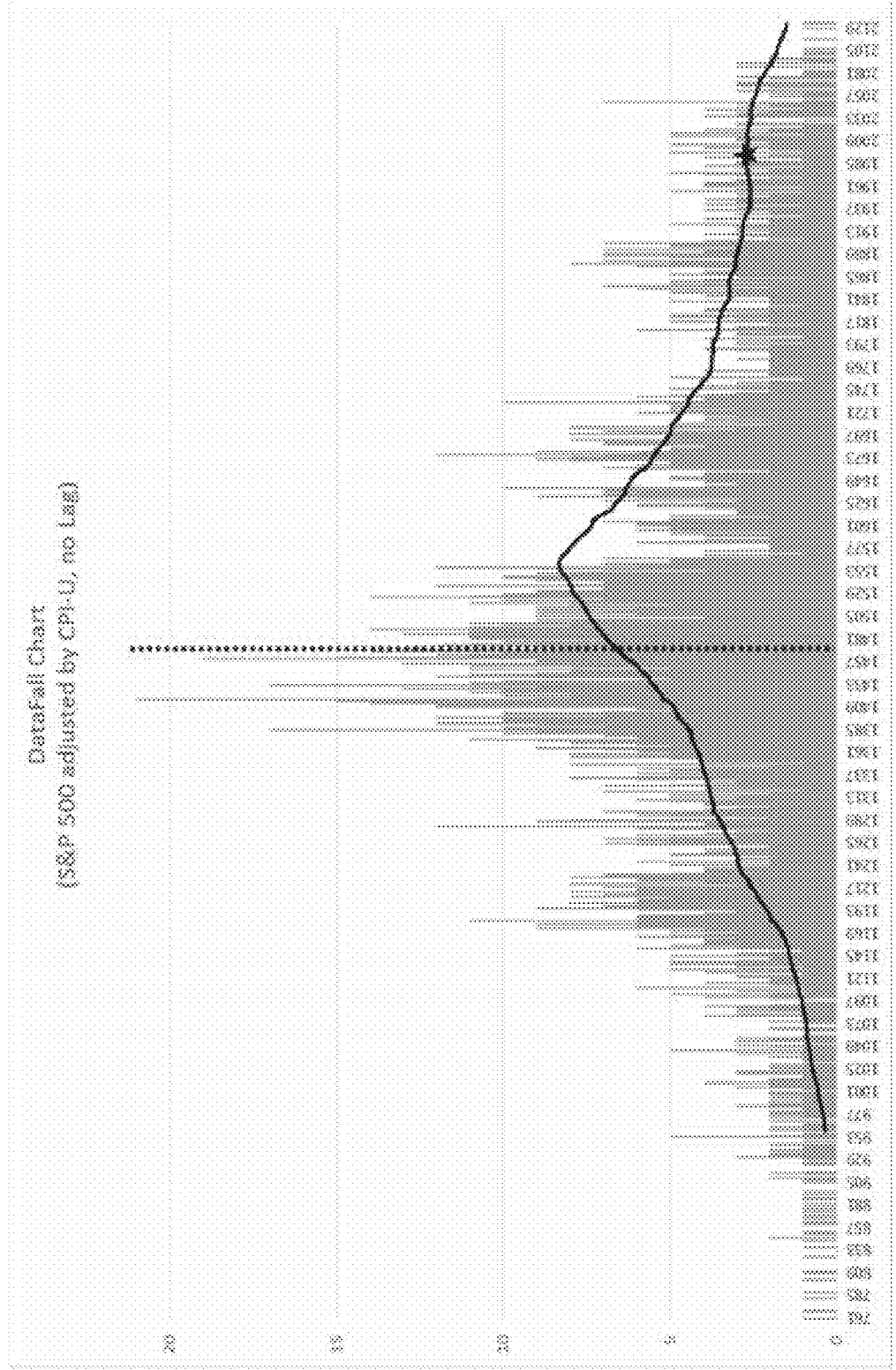

Figure 14A  Dataset Example
Stock Index = S&P 500
Macroeconomic Indicator = CBOE DJIA Volatility Index©
Time Lag = None

| Date | Column a<br>Stock Index<br>Close | Column b<br>Macroeconomic<br>Indicator | Column c<br>Macroeconomic Adjustment Factor Formula | Column d<br>Adjustment<br>Factor |
|---|---|---|---|---|
| 10/7/1997 | 983.12 | 21.48 | = {Macroeconomic Indicator for 7/23/2014} / {Macroeconomic Indicator for 1/20/1997} | 0.5261 |
| 10/8/1997 | 973.84 | 21.62 | = {Macroeconomic Indicator for 7/23/2014} / {Macroeconomic Indicator for 1/21/1997} | 0.5227 |
| 10/9/1997 | 970.62 | 21.76 | = {Macroeconomic Indicator for 7/23/2014} / {Macroeconomic Indicator for 1/22/1997} | 0.5193 |
| 10/10/1997 | 966.98 | 21.63 | = {Macroeconomic Indicator for 7/23/2014} / {Macroeconomic Indicator for 1/23/1997} | 0.5224 |
| 10/13/1997 | 968.10 | 22.33 | = {Macroeconomic Indicator for 7/23/2014} / {Macroeconomic Indicator for 1/24/1997} | 0.5060 |
| 10/14/1997 | 970.28 | 22.15 | = {Macroeconomic Indicator for 7/23/2014} / {Macroeconomic Indicator for 1/27/1997} | 0.5102 |
| 10/15/1997 | 965.72 | 22.09 | = {Macroeconomic Indicator for 7/23/2014} / {Macroeconomic Indicator for 1/28/1997} | 0.5115 |
| 10/16/1997 | 955.25 | 22.18 | = {Macroeconomic Indicator for 7/23/2014} / {Macroeconomic Indicator for 1/29/1997} | 0.5095 |
| 10/17/1997 | 944.16 | 22.37 | = {Macroeconomic Indicator for 7/23/2014} / {Macroeconomic Indicator for 1/30/1997} | 0.5051 |
| 10/20/1997 | 955.61 | 22.12 | = {Macroeconomic Indicator for 7/23/2014} / {Macroeconomic Indicator for 1/31/1997} | 0.5108 |
| 10/21/1997 | 972.28 | 21.44 | = {Macroeconomic Indicator for 7/23/2014} / {Macroeconomic Indicator for 2/1/1997} | 0.5271 |
| 10/22/1997 | 968.49 | 21.39 | = {Macroeconomic Indicator for 7/23/2014} / {Macroeconomic Indicator for 2/2/1997} | 0.5283 |
| ... | ... | ... | ... | ... |
| 6/27/2014 | 1,960.96 | 11.02 | = {Macroeconomic Indicator for 7/23/2014} / {Macroeconomic Indicator for 6/27/1997} | 1.0254 |
| 6/30/2014 | 1,960.23 | 11.06 | = {Macroeconomic Indicator for 7/23/2014} / {Macroeconomic Indicator for 6/30/1997} | 1.0217 |
| 7/1/2014 | 1,973.32 | 10.47 | = {Macroeconomic Indicator for 7/23/2014} / {Macroeconomic Indicator for 7/1/1997} | 1.0793 |
| 7/2/2014 | 1,974.62 | 10.18 | = {Macroeconomic Indicator for 7/23/2014} / {Macroeconomic Indicator for 7/2/1997} | 1.1100 |
| 7/3/2014 | 1,985.44 | 9.71 | = {Macroeconomic Indicator for 7/23/2014} / {Macroeconomic Indicator for 7/3/1997} | 1.1637 |
| 7/7/2014 | 1,977.65 | 10.75 | = {Macroeconomic Indicator for 7/23/2014} / {Macroeconomic Indicator for 7/7/1997} | 1.0512 |
| 7/8/2014 | 1,963.71 | 11.21 | = {Macroeconomic Indicator for 7/23/2014} / {Macroeconomic Indicator for 7/8/1997} | 1.0080 |
| 7/9/2014 | 1,972.83 | 10.79 | = {Macroeconomic Indicator for 7/23/2014} / {Macroeconomic Indicator for 7/9/1997} | 1.0473 |
| 7/10/2014 | 1,964.68 | 11.75 | = {Macroeconomic Indicator for 7/23/2014} / {Macroeconomic Indicator for 7/10/1997} | 0.9617 |
| 7/11/2014 | 1,967.57 | 11.21 | = {Macroeconomic Indicator for 7/23/2014} / {Macroeconomic Indicator for 7/11/1997} | 1.0080 |
| 7/14/2014 | 1,977.10 | 10.82 | = {Macroeconomic Indicator for 7/23/2014} / {Macroeconomic Indicator for 7/14/1997} | 1.0444 |
| 7/15/2014 | 1,973.28 | 11.16 | = {Macroeconomic Indicator for 7/23/2014} / {Macroeconomic Indicator for 7/15/1997} | 1.0125 |
| 7/16/2014 | 1,981.57 | 10.30 | = {Macroeconomic Indicator for 7/23/2014} / {Macroeconomic Indicator for 7/16/1997} | 1.0971 |
| 7/17/2014 | 1,958.12 | 13.35 | = {Macroeconomic Indicator for 7/23/2014} / {Macroeconomic Indicator for 7/17/1997} | 0.8464 |
| 7/18/2014 | 1,978.22 | 11.59 | = {Macroeconomic Indicator for 7/23/2014} / {Macroeconomic Indicator for 7/18/1997} | 0.9750 |
| 7/21/2014 | 1,973.63 | 12.01 | = {Macroeconomic Indicator for 7/23/2014} / {Macroeconomic Indicator for 7/21/1997} | 0.9409 |
| 7/22/2014 | 1,983.53 | 11.43 | = {Macroeconomic Indicator for 7/23/2014} / {Macroeconomic Indicator for 7/22/1997} | 0.9886 |
| 7/23/2014 | 1,987.01 | 11.30 | = {Macroeconomic Indicator for 7/23/2014} / {Macroeconomic Indicator for 7/23/1997} | 1.0000 |

Figure 14B Dataset Example
Stock Index = S&P 500
Macroeconomic Indicator = CBOE DJIA Volatility Index©
Time Lag = None

| Date | Column e<br>Stock Index Adjustment Factor Formula | Column f<br>Adjusted Stock Index Close |
|---|---|---|
| 10/7/1997 | = (Stock Index Closing Price on 1/20/1997) * (Adjustment Factor for 1/20/1997) | 517.22 |
| 10/8/1997 | = (Stock Index Closing Price on 1/21/1997) * (Adjustment Factor for 1/21/1997) | 509.03 |
| 10/9/1997 | = (Stock Index Closing Price on 1/22/1997) * (Adjustment Factor for 1/22/1997) | 504.04 |
| 10/10/1997 | = (Stock Index Closing Price on 1/23/1997) * (Adjustment Factor for 1/23/1997) | 505.15 |
| 10/13/1997 | = (Stock Index Closing Price on 1/24/1997) * (Adjustment Factor for 1/24/1997) | 489.86 |
| 10/14/1997 | = (Stock Index Closing Price on 1/27/1997) * (Adjustment Factor for 1/27/1997) | 495.04 |
| 10/15/1997 | = (Stock Index Closing Price on 1/28/1997) * (Adjustment Factor for 1/28/1997) | 493.97 |
| 10/16/1997 | = (Stock Index Closing Price on 1/29/1997) * (Adjustment Factor for 1/29/1997) | 486.70 |
| 10/17/1997 | = (Stock Index Closing Price on 1/30/1997) * (Adjustment Factor for 1/30/1997) | 476.90 |
| 10/20/1997 | = (Stock Index Closing Price on 1/31/1997) * (Adjustment Factor for 1/31/1997) | 488.13 |
| 10/21/1997 | = (Stock Index Closing Price on 2/1/1997) * (Adjustment Factor for 2/1/1997) | 512.49 |
| 10/22/1997 | = (Stock Index Closing Price on 2/2/1997) * (Adjustment Factor for 2/2/1997) | 511.65 |
| ... | ... | ... |
| 6/27/2014 | = (Stock Index Closing Price on 6/27/2014) * (Adjustment Factor for 6/27/2014) | 2010.77 |
| 6/30/2014 | = (Stock Index Closing Price on 6/30/2014) * (Adjustment Factor for 6/30/2014) | 2002.77 |
| 7/1/2014 | = (Stock Index Closing Price on 7/1/2014) * (Adjustment Factor for 7/1/2014) | 2129.80 |
| 7/2/2014 | = (Stock Index Closing Price on 7/2/2014) * (Adjustment Factor for 7/2/2014) | 2191.83 |
| 7/3/2014 | = (Stock Index Closing Price on 7/3/2014) * (Adjustment Factor for 7/3/2014) | 2310.46 |
| 7/7/2014 | = (Stock Index Closing Price on 7/7/2014) * (Adjustment Factor for 7/7/2014) | 2078.91 |
| 7/8/2014 | = (Stock Index Closing Price on 7/8/2014) * (Adjustment Factor for 7/8/2014) | 1979.42 |
| 7/9/2014 | = (Stock Index Closing Price on 7/9/2014) * (Adjustment Factor for 7/9/2014) | 2066.14 |
| 7/10/2014 | = (Stock Index Closing Price on 7/10/2014) * (Adjustment Factor for 7/10/2014) | 1889.43 |
| 7/11/2014 | = (Stock Index Closing Price on 7/11/2014) * (Adjustment Factor for 7/11/2014) | 1983.31 |
| 7/14/2014 | = (Stock Index Closing Price on 7/14/2014) * (Adjustment Factor for 7/14/2014) | 2064.88 |
| 7/15/2014 | = (Stock Index Closing Price on 7/15/2014) * (Adjustment Factor for 7/15/2014) | 1997.95 |
| 7/16/2014 | = (Stock Index Closing Price on 7/16/2014) * (Adjustment Factor for 7/16/2014) | 2173.98 |
| 7/17/2014 | = (Stock Index Closing Price on 7/17/2014) * (Adjustment Factor for 7/17/2014) | 1657.35 |
| 7/18/2014 | = (Stock Index Closing Price on 7/18/2014) * (Adjustment Factor for 7/18/2014) | 1928.76 |
| 7/21/2014 | = (Stock Index Closing Price on 7/21/2014) * (Adjustment Factor for 7/21/2014) | 1856.99 |
| 7/22/2014 | = (Stock Index Closing Price on 7/22/2014) * (Adjustment Factor for 7/22/2014) | 1960.92 |
| 7/23/2014 | = (Stock Index Closing Price on 7/23/2014) * (Adjustment Factor for 7/23/2014) | 1987.01 |

Frequency Distribution Table

Figure 15

Stock Index = S&P 500
Macroeconomic Indicator = CBOE DJIA Volatility Index©
Time Lag = None Min. 113.99
Max. 2310.46
Median 725.69

| X-Axis Value | Frequency |
| --- | --- |
| 114 | 1 |
| 115 | 0 |
| 116 | 0 |
| 117 | 0 |
| 118 | 0 |
| 119 | 0 |
| 120 | 0 |
| ... | ... |
| 720 | 6 |
| 721 | 3 |
| 722 | 4 |
| 723 | 3 |
| 724 | 8 |
| 725 | 10 |
| 726 | 5 |
| 727 | 5 |
| 728 | 3 |
| 729 | 7 |
| 730 | 6 |
| ... | ... |
| 2300 | 0 |
| 2301 | 0 |
| 2302 | 0 |
| 2303 | 0 |
| 2304 | 0 |
| 2305 | 0 |
| 2306 | 0 |
| 2307 | 0 |
| 2308 | 0 |
| 2309 | 0 |
| 2310 | 1 |

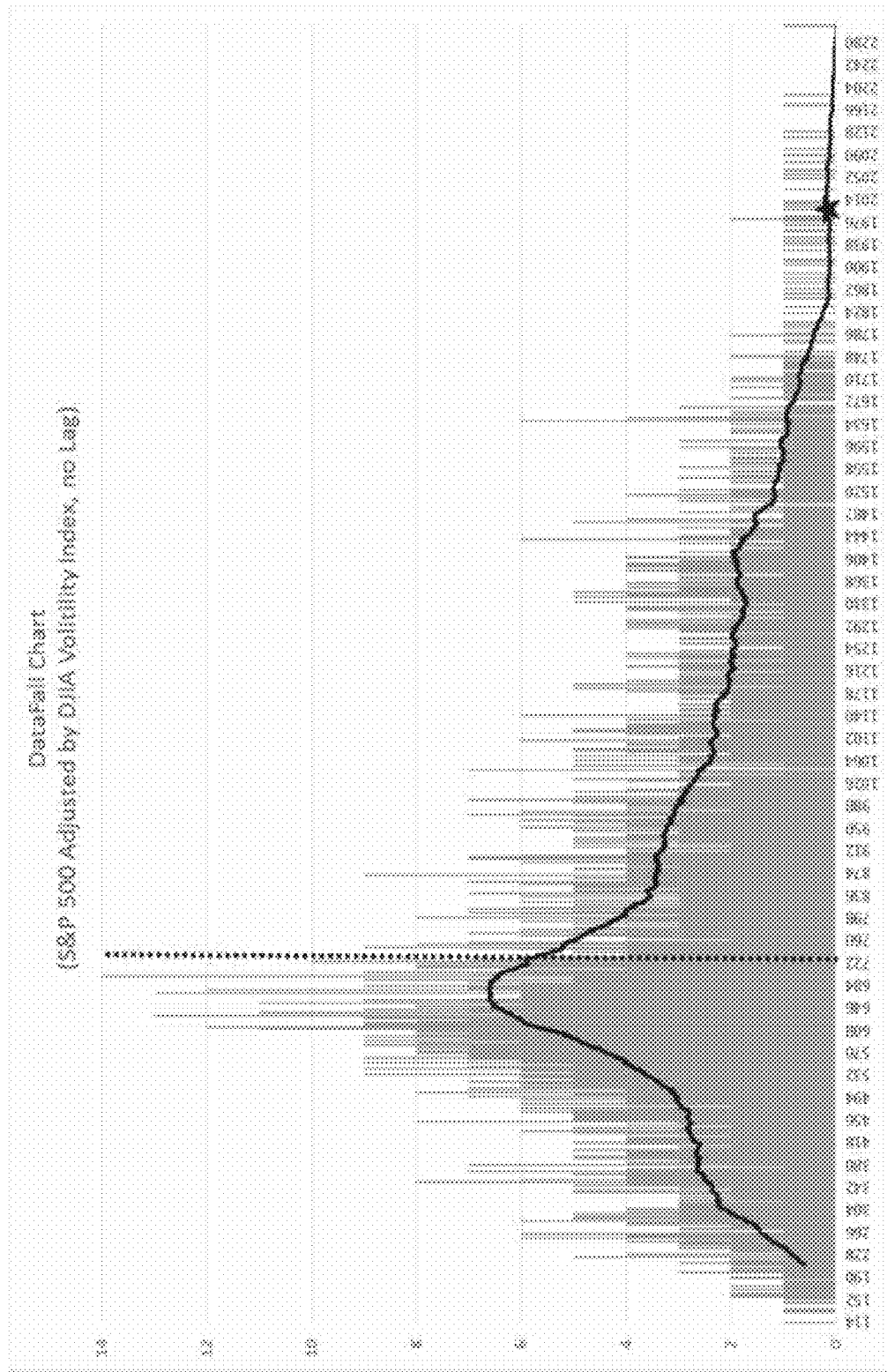

Figure 18A Dataset Example
Stock Index = S&P 500
Macroeconomic Indicator = CBOE DJIA Volatility Index©
Time Lag = 6 Months

| Date | Column a<br>Stock Index<br>Close | Column b<br>Macroeconomic<br>Indicator | Column c<br>Macroeconomic Adjustment Factor Formula | Column d<br>Adjustment<br>Factor |
|---|---|---|---|---|
| 10/7/1997 | 983.12 | 21.48 | = (Macroeconomic Indicator for 7/23/2014) / (Macroeconomic Indicator for 1/20/1997) | 0.5261 |
| 10/8/1997 | 973.84 | 21.62 | = (Macroeconomic Indicator for 7/23/2014) / (Macroeconomic Indicator for 1/21/1997) | 0.5227 |
| 10/9/1997 | 970.62 | 21.76 | = (Macroeconomic Indicator for 7/23/2014) / (Macroeconomic Indicator for 1/22/1997) | 0.5193 |
| 10/10/1997 | 966.98 | 21.63 | = (Macroeconomic Indicator for 7/23/2014) / (Macroeconomic Indicator for 1/23/1997) | 0.5224 |
| 10/13/1997 | 968.10 | 22.33 | = (Macroeconomic Indicator for 7/23/2014) / (Macroeconomic Indicator for 1/24/1997) | 0.5060 |
| 10/14/1997 | 970.28 | 22.15 | = (Macroeconomic Indicator for 7/23/2014) / (Macroeconomic Indicator for 1/27/1997) | 0.5102 |
| 10/15/1997 | 965.72 | 22.09 | = (Macroeconomic Indicator for 7/23/2014) / (Macroeconomic Indicator for 1/28/1997) | 0.5115 |
| 10/16/1997 | 955.25 | 22.18 | = (Macroeconomic Indicator for 7/23/2014) (Macroeconomic Indicator for 1/29/1997) | 0.5095 |
| 10/17/1997 | 944.16 | 22.37 | = (Macroeconomic Indicator for 7/23/2014) / (Macroeconomic Indicator for 1/30/1997) | 0.5051 |
| 10/20/1997 | 955.61 | 22.12 | = (Macroeconomic Indicator for 7/23/2014) / (Macroeconomic Indicator for 1/31/1997) | 0.5108 |
| 10/21/1997 | 972.28 | 21.44 | = (Macroeconomic Indicator for 7/23/2014) / (Macroeconomic Indicator for 2/1/1997) | 0.5271 |
| 10/22/1997 | 968.49 | 21.39 | = (Macroeconomic Indicator for 7/23/2014) / (Macroeconomic Indicator for 2/2/1997) | 0.5283 |
| ... | ... | ... | ... | ... |
| 6/27/2014 | 1,960.96 | 11.02 | = (Macroeconomic Indicator for 7/23/2014) / (Macroeconomic Indicator for 6/27/1997) | 1.0254 |
| 6/30/2014 | 1,960.23 | 11.06 | = (Macroeconomic Indicator for 7/23/2014) / (Macroeconomic Indicator for 6/30/1997) | 1.0217 |
| 7/1/2014 | 1,973.32 | 10.47 | = (Macroeconomic Indicator for 7/23/2014) / (Macroeconomic Indicator for 7/1/1997) | 1.0793 |
| 7/2/2014 | 1,974.62 | 10.18 | = (Macroeconomic Indicator for 7/23/2014) / (Macroeconomic Indicator for 7/2/1997) | 1.1100 |
| 7/3/2014 | 1,985.44 | 9.71 | = (Macroeconomic Indicator for 7/23/2014) / (Macroeconomic Indicator for 7/3/1997) | 1.1637 |
| 7/7/2014 | 1,977.65 | 10.75 | = (Macroeconomic Indicator for 7/23/2014) / (Macroeconomic Indicator for 7/7/1997) | 1.0512 |
| 7/8/2014 | 1,963.71 | 11.21 | = (Macroeconomic Indicator for 7/23/2014) / (Macroeconomic Indicator for 7/8/1997) | 1.0080 |
| 7/9/2014 | 1,972.83 | 10.79 | = (Macroeconomic Indicator for 7/23/2014) / (Macroeconomic Indicator for 7/9/1997) | 1.0473 |
| 7/10/2014 | 1,964.68 | 11.75 | = (Macroeconomic Indicator for 7/23/2014) / (Macroeconomic Indicator for 7/10/1997) | 0.9617 |
| 7/11/2014 | 1,967.57 | 11.21 | = (Macroeconomic Indicator for 7/23/2014) / (Macroeconomic Indicator for 7/11/1997) | 1.0080 |
| 7/14/2014 | 1,977.10 | 10.82 | = (Macroeconomic Indicator for 7/23/2014) / (Macroeconomic Indicator for 7/14/1997) | 1.0444 |
| 7/15/2014 | 1,973.28 | 11.16 | = (Macroeconomic Indicator for 7/23/2014) / (Macroeconomic Indicator for 7/15/1997) | 1.0125 |
| 7/16/2014 | 1,981.57 | 10.30 | = (Macroeconomic Indicator for 7/23/2014) / (Macroeconomic Indicator for 7/16/1997) | 1.0971 |
| 7/17/2014 | 1,958.12 | 13.35 | = (Macroeconomic Indicator for 7/23/2014) / (Macroeconomic Indicator for 7/17/1997) | 0.8464 |
| 7/18/2014 | 1,978.22 | 11.59 | = (Macroeconomic Indicator for 7/23/2014) / (Macroeconomic Indicator for 7/18/1997) | 0.9750 |
| 7/21/2014 | 1,973.63 | 12.01 | = (Macroeconomic Indicator for 7/23/2014) / (Macroeconomic Indicator for 7/21/1997) | 0.9409 |
| 7/22/2014 | 1,983.53 | 11.43 | = (Macroeconomic Indicator for 7/23/2014) / (Macroeconomic Indicator for 7/22/1997) | 0.9886 |
| 7/23/2014 | 1,987.01 | 11.30 | = (Macroeconomic Indicator for 7/23/2014) / (Macroeconomic Indicator for 7/23/1997) | 1.0000 |

Figure 18B  Dataset Example
Stock Index = S&P 500
Macroeconomic Indicator = CBOE DJIA Volatility Index©
Time Lag = 6 Months

| Date | Column e<br>Stock Index Adjustment Factor Formula | Column f<br>Adjusted Stock<br>Index Close |
|---|---|---|
| 10/7/1997 | = (Stock Index Closing Price on 1/20/1997) * (Adjustment Factor for 7/21/1997) | 458.82 |
| 10/8/1997 | = (Stock Index Closing Price on 1/21/1997) * (Adjustment Factor for 7/22/1997) | 495.00 |
| 10/9/1997 | = (Stock Index Closing Price on 1/22/1997) * (Adjustment Factor for 7/23/1997) | 488.51 |
| 10/10/1997 | = (Stock Index Closing Price on 1/23/1997) * (Adjustment Factor for 7/24/1997) | 533.00 |
| 10/13/1997 | = (Stock Index Closing Price on 1/24/1997) * (Adjustment Factor for 7/25/1997) | 523.94 |
| 10/14/1997 | = (Stock Index Closing Price on 1/27/1997) * (Adjustment Factor for 7/28/1997) | 490.77 |
| 10/15/1997 | = (Stock Index Closing Price on 1/28/1997) * (Adjustment Factor for 7/29/1997) | 538.87 |
| 10/16/1997 | = (Stock Index Closing Price on 1/29/1997) * (Adjustment Factor for 7/30/1997) | 519.46 |
| 10/17/1997 | = (Stock Index Closing Price on 1/30/1997) * (Adjustment Factor for 7/31/1997) | 542.42 |
| 10/20/1997 | = (Stock Index Closing Price on 1/31/1997) * (Adjustment Factor for 8/1/1997) | 554.92 |
| 10/21/1997 | = (Stock Index Closing Price on 2/1/1997) * (Adjustment Factor for 8/4/1997) | 531.06 |
| 10/22/1997 | = (Stock Index Closing Price on 2/2/1997) * (Adjustment Factor for 8/5/1997) | 487.93 |
| ... | ... | ... |
| 6/27/2014 | = (Stock Index Closing Price on 6/27/2014) * (Adjustment Factor for 7/23/2014) | 1960.96 |
| 6/30/2014 | = (Stock Index Closing Price on 6/30/2014) * (Adjustment Factor for 7/23/2014) | 1950.23 |
| 7/1/2014 | = (Stock Index Closing Price on 7/1/2014) * (Adjustment Factor for 7/23/2014) | 1973.32 |
| 7/2/2014 | = (Stock Index Closing Price on 7/2/2014) * (Adjustment Factor for 7/23/2014) | 1974.62 |
| 7/3/2014 | = (Stock Index Closing Price on 7/3/2014) * (Adjustment Factor for 7/23/2014) | 1985.44 |
| 7/7/2014 | = (Stock Index Closing Price on 7/7/2014) * (Adjustment Factor for 7/23/2014) | 1977.65 |
| 7/8/2014 | = (Stock Index Closing Price on 7/8/2014) * (Adjustment Factor for 7/23/2014) | 1963.71 |
| 7/9/2014 | = (Stock Index Closing Price on 7/9/2014) * (Adjustment Factor for 7/23/2014) | 1972.83 |
| 7/10/2014 | = (Stock Index Closing Price on 7/10/2014) * (Adjustment Factor for 7/23/2014) | 1964.68 |
| 7/11/2014 | = (Stock Index Closing Price on 7/11/2014) * (Adjustment Factor for 7/23/2014) | 1967.57 |
| 7/14/2014 | = (Stock Index Closing Price on 7/14/2014) * (Adjustment Factor for 7/23/2014) | 1977.10 |
| 7/15/2014 | = (Stock Index Closing Price on 7/15/2014) * (Adjustment Factor for 7/23/2014) | 1973.28 |
| 7/16/2014 | = (Stock Index Closing Price on 7/16/2014) * (Adjustment Factor for 7/23/2014) | 1981.57 |
| 7/17/2014 | = (Stock Index Closing Price on 7/17/2014) * (Adjustment Factor for 7/23/2014) | 1958.12 |
| 7/18/2014 | = (Stock Index Closing Price on 7/18/2014) * (Adjustment Factor for 7/23/2014) | 1978.22 |
| 7/21/2014 | = (Stock Index Closing Price on 7/21/2014) * (Adjustment Factor for 7/23/2014) | 1973.63 |
| 7/22/2014 | = (Stock Index Closing Price on 7/22/2014) * (Adjustment Factor for 7/23/2014) | 1983.53 |
| 7/23/2014 | = (Stock Index Closing Price on 7/23/2014) * (Adjustment Factor for 7/23/2014) | 1987.01 |

Frequency Distribution Table  Figure 19

Stock Index = S&P 500
Macroeconomic Indicator = CBOE DJIA Volatility Index©
Time Lag = 6 Months

| | |
|---|---|
| Min. | 208.45 |
| Max. | 2131.88 |
| Median | 744.53 |

| X-Axis Value | Frequency |
|---|---|
| 208 | 1 |
| 209 | 0 |
| 210 | 0 |
| 211 | 0 |
| 212 | 0 |
| ... | ... |
| 740 | 6 |
| 741 | 2 |
| 742 | 5 |
| 743 | 5 |
| 744 | 1 |
| 745 | 5 |
| 746 | 7 |
| 747 | 3 |
| 748 | 4 |
| 749 | 5 |
| 750 | 2 |
| ... | ... |
| 2128 | 0 |
| 2129 | 0 |
| 2130 | 0 |
| 2131 | 0 |
| 2132 | 1 |

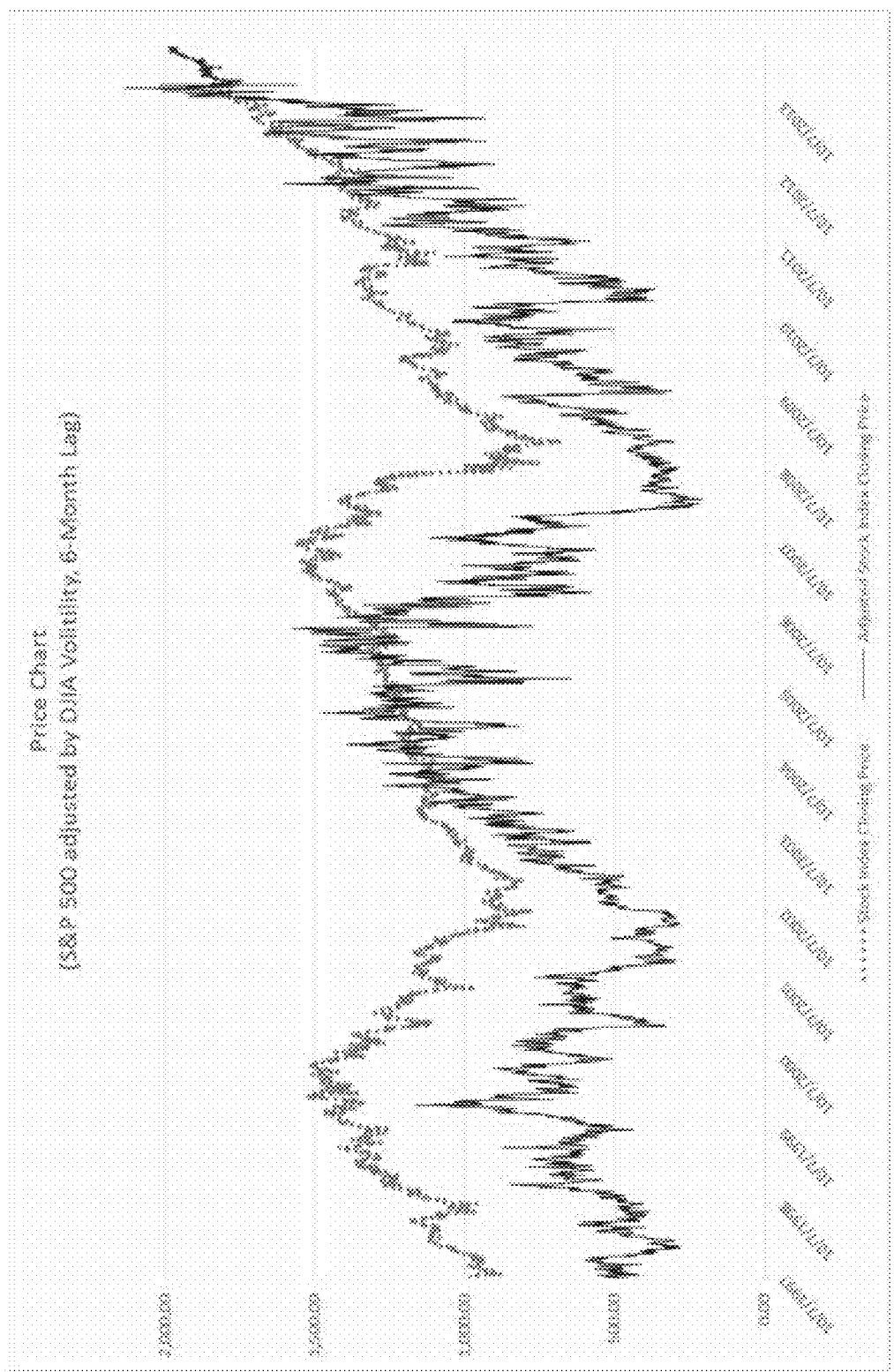

Figure 22A  Dataset Example
Stock Index = NASDAQ Composite
Macroeconomic Indicator = Consumer Price Index for All Urban Consumers: All Items, Index 2007-12=100
Time Lag = None

| Date | Column a Stock Index Close | Column b Macroeconomic Indicator | Column c Macroeconomic Adjustment Factor Formula | Column d Adjustment Factor |
|---|---|---|---|---|
| 1/20/1997 | 1,364.28 | 159.4065 | = (Macroeconomic Indicator for 7/23/2014) / (Macroeconomic Indicator for 1/20/1997) | 1.5015 |
| 1/21/1997 | 1,376.97 | 159.4226 | = (Macroeconomic Indicator for 7/23/2014) / (Macroeconomic Indicator for 1/21/1997) | 1.5014 |
| 1/22/1997 | 1,388.06 | 159.4387 | = (Macroeconomic Indicator for 7/23/2014) / (Macroeconomic Indicator for 1/22/1997) | 1.5012 |
| 1/23/1997 | 1,378.37 | 159.4548 | = (Macroeconomic Indicator for 7/23/2014) / (Macroeconomic Indicator for 1/23/1997) | 1.5011 |
| 1/24/1997 | 1,363.83 | 159.4710 | = (Macroeconomic Indicator for 7/23/2014) / (Macroeconomic Indicator for 1/24/1997) | 1.5009 |
| 1/27/1997 | 1,352.81 | 159.5194 | = (Macroeconomic Indicator for 7/23/2014) / (Macroeconomic Indicator for 1/27/1997) | 1.5005 |
| 1/28/1997 | 1,354.37 | 159.5355 | = (Macroeconomic Indicator for 7/23/2014) / (Macroeconomic Indicator for 1/28/1997) | 1.5003 |
| 1/29/1997 | 1,355.17 | 159.5516 | = (Macroeconomic Indicator for 7/23/2014) / (Macroeconomic Indicator for 1/29/1997) | 1.5002 |
| 1/30/1997 | 1,371.02 | 159.5677 | = (Macroeconomic Indicator for 7/23/2014) / (Macroeconomic Indicator for 1/30/1997) | 1.5000 |
| 1/31/1997 | 1,379.85 | 159.5839 | = (Macroeconomic Indicator for 7/23/2014) / (Macroeconomic Indicator for 1/31/1997) | 1.4999 |
| 2/3/1997 | 1,376.05 | 159.6286 | = (Macroeconomic Indicator for 7/23/2014) / (Macroeconomic Indicator for 2/1/1997) | 1.4994 |
| 2/4/1997 | 1,373.75 | 159.6429 | = (Macroeconomic Indicator for 7/23/2014) / (Macroeconomic Indicator for 2/2/1997) | 1.4993 |
| ⋮ | ⋮ | ⋮ | ⋮ | ⋮ |
| 6/27/2014 | 4,397.93 | 238.9124 | = (Macroeconomic Indicator for 7/23/2014) / (Macroeconomic Indicator for 6/27/1997) | 1.0019 |
| 6/30/2014 | 4,408.18 | 238.9781 | = (Macroeconomic Indicator for 7/23/2014) / (Macroeconomic Indicator for 6/30/1997) | 1.0016 |
| 7/1/2014 | 4,458.65 | 239.0000 | = (Macroeconomic Indicator for 7/23/2014) / (Macroeconomic Indicator for 7/1/1997) | 1.0015 |
| 7/2/2014 | 4,457.73 | 239.0161 | = (Macroeconomic Indicator for 7/23/2014) / (Macroeconomic Indicator for 7/2/1997) | 1.0014 |
| 7/3/2014 | 4,485.93 | 239.0323 | = (Macroeconomic Indicator for 7/23/2014) / (Macroeconomic Indicator for 7/3/1997) | 1.0013 |
| 7/7/2014 | 4,451.53 | 239.0968 | = (Macroeconomic Indicator for 7/23/2014) / (Macroeconomic Indicator for 7/7/1997) | 1.0011 |
| 7/8/2014 | 4,391.46 | 239.1129 | = (Macroeconomic Indicator for 7/23/2014) / (Macroeconomic Indicator for 7/8/1997) | 1.0010 |
| 7/9/2014 | 4,419.03 | 239.1290 | = (Macroeconomic Indicator for 7/23/2014) / (Macroeconomic Indicator for 7/9/1997) | 1.0009 |
| 7/10/2014 | 4,396.20 | 239.1452 | = (Macroeconomic Indicator for 7/23/2014) / (Macroeconomic Indicator for 7/10/1997) | 1.0009 |
| 7/11/2014 | 4,415.49 | 239.1613 | = (Macroeconomic Indicator for 7/23/2014) / (Macroeconomic Indicator for 7/11/1997) | 1.0008 |
| 7/14/2014 | 4,440.42 | 239.2097 | = (Macroeconomic Indicator for 7/23/2014) / (Macroeconomic Indicator for 7/14/1997) | 1.0006 |
| 7/15/2014 | 4,416.39 | 239.2258 | = (Macroeconomic Indicator for 7/23/2014) / (Macroeconomic Indicator for 7/15/1997) | 1.0005 |
| 7/16/2014 | 4,425.97 | 239.2419 | = (Macroeconomic Indicator for 7/23/2014) / (Macroeconomic Indicator for 7/16/1997) | 1.0005 |
| 7/17/2014 | 4,363.45 | 239.2581 | = (Macroeconomic Indicator for 7/23/2014) / (Macroeconomic Indicator for 7/17/1997) | 1.0004 |
| 7/18/2014 | 4,432.15 | 239.2742 | = (Macroeconomic Indicator for 7/23/2014) / (Macroeconomic Indicator for 7/18/1997) | 1.0003 |
| 7/21/2014 | 4,424.70 | 239.3226 | = (Macroeconomic Indicator for 7/23/2014) / (Macroeconomic Indicator for 7/21/1997) | 1.0001 |
| 7/22/2014 | 4,456.02 | 239.3387 | = (Macroeconomic Indicator for 7/23/2014) / (Macroeconomic Indicator for 7/22/1997) | 1.0001 |
| 7/23/2014 | 4,473.70 | 239.3548 | = (Macroeconomic Indicator for 7/23/2014) / (Macroeconomic Indicator for 7/23/1997) | 1.0000 |

Figure 22B    Dataset Example

Stock Index = NASDAQ Composite
Macroeconomic Indicator = Consumer Price Index for All Urban Consumers: All Items, Index 2007-12=100
Time Lag = None

| Date | Column e<br>Stock Index Adjustment Factor Formula | Column f<br>Adjusted Stock Index Close |
|---|---|---|
| 1/20/1997 | = (Stock Index Closing Price on 1/20/1997) * (Adjustment Factor for 1/20/1997) | 2048.52 |
| 1/21/1997 | = (Stock Index Closing Price on 1/21/1997) * (Adjustment Factor for 1/21/1997) | 2067.36 |
| 1/22/1997 | = (Stock Index Closing Price on 1/22/1997) * (Adjustment Factor for 1/22/1997) | 2083.80 |
| 1/23/1997 | = (Stock Index Closing Price on 1/23/1997) * (Adjustment Factor for 1/23/1997) | 2069.05 |
| 1/24/1997 | = (Stock Index Closing Price on 1/24/1997) * (Adjustment Factor for 1/24/1997) | 2047.01 |
| 1/27/1997 | = (Stock Index Closing Price on 1/27/1997) * (Adjustment Factor for 1/27/1997) | 2029.86 |
| 1/28/1997 | = (Stock Index Closing Price on 1/28/1997) * (Adjustment Factor for 1/28/1997) | 2031.99 |
| 1/29/1997 | = (Stock Index Closing Price on 1/29/1997) * (Adjustment Factor for 1/29/1997) | 2032.99 |
| 1/30/1997 | = (Stock Index Closing Price on 1/30/1997) * (Adjustment Factor for 1/30/1997) | 2056.56 |
| 1/31/1997 | = (Stock Index Closing Price on 1/31/1997) * (Adjustment Factor for 1/31/1997) | 2069.59 |
| 2/3/1997 | = (Stock Index Closing Price on 2/1/1997) * (Adjustment Factor for 2/1/1997) | 2063.32 |
| 2/4/1997 | = (Stock Index Closing Price on 2/2/1997) * (Adjustment Factor for 2/2/1997) | 2059.68 |
| ... | ... | |
| 6/27/2014 | = (Stock Index Closing Price on 6/27/2014) * (Adjustment Factor for 6/27/2014) | 4406.29 |
| 6/30/2014 | = (Stock Index Closing Price on 6/30/2014) * (Adjustment Factor for 6/30/2014) | 4415.23 |
| 7/1/2014 | = (Stock Index Closing Price on 7/1/2014) * (Adjustment Factor for 7/1/2014) | 4465.34 |
| 7/2/2014 | = (Stock Index Closing Price on 7/2/2014) * (Adjustment Factor for 7/2/2014) | 4463.97 |
| 7/3/2014 | = (Stock Index Closing Price on 7/3/2014) * (Adjustment Factor for 7/3/2014) | 4491.76 |
| 7/7/2014 | = (Stock Index Closing Price on 7/7/2014) * (Adjustment Factor for 7/7/2014) | 4456.43 |
| 7/8/2014 | = (Stock Index Closing Price on 7/8/2014) * (Adjustment Factor for 7/8/2014) | 4395.85 |
| 7/9/2014 | = (Stock Index Closing Price on 7/9/2014) * (Adjustment Factor for 7/9/2014) | 4423.01 |
| 7/10/2014 | = (Stock Index Closing Price on 7/10/2014) * (Adjustment Factor for 7/10/2014) | 4400.16 |
| 7/11/2014 | = (Stock Index Closing Price on 7/11/2014) * (Adjustment Factor for 7/11/2014) | 4419.02 |
| 7/14/2014 | = (Stock Index Closing Price on 7/14/2014) * (Adjustment Factor for 7/14/2014) | 4443.08 |
| 7/15/2014 | = (Stock Index Closing Price on 7/15/2014) * (Adjustment Factor for 7/15/2014) | 4418.60 |
| 7/16/2014 | = (Stock Index Closing Price on 7/16/2014) * (Adjustment Factor for 7/16/2014) | 4428.18 |
| 7/17/2014 | = (Stock Index Closing Price on 7/17/2014) * (Adjustment Factor for 7/17/2014) | 4365.20 |
| 7/18/2014 | = (Stock Index Closing Price on 7/18/2014) * (Adjustment Factor for 7/18/2014) | 4433.48 |
| 7/21/2014 | = (Stock Index Closing Price on 7/21/2014) * (Adjustment Factor for 7/21/2014) | 4425.14 |
| 7/22/2014 | = (Stock Index Closing Price on 7/22/2014) * (Adjustment Factor for 7/22/2014) | 4456.47 |
| 7/23/2014 | = (Stock Index Closing Price on 7/23/2014) * (Adjustment Factor for 7/23/2014) | 4473.70 |

Frequency Distribution Table  Figure 23

Stock Index = NASDAQ Composite
Macroeconomic Indicator = Consumer Price Index for All Urban Consumers: All Items, Index 2007-12=100
Time Lag = None

|  |  |
|---|---|
| Min. | 1426.59 |
| Max. | 7057.47 |
| Median | 2678.38 |

| X-Axis Value | Frequency |
|---|---|
| 1427 | 1 |
| 1428 | 0 |
| 1429 | 0 |
| 1430 | 0 |
| 1431 | 0 |
| 1432 | 0 |
| ... | ... |
| 2673 | 4 |
| 2674 | 3 |
| 2675 | 7 |
| 2676 | 3 |
| 2677 | 2 |
| 2678 | 2 |
| 2679 | 4 |
| 2680 | 4 |
| 2681 | 7 |
| 2682 | 8 |
| 2683 | 1 |
| 2684 | 1 |
| 2685 | 2 |
| ... | ... |
| 7050 | 0 |
| 7051 | 0 |
| 7052 | 0 |
| 7053 | 0 |
| 7054 | 0 |
| 7055 | 1 |
| 7056 | 0 |
| 7057 | 1 |

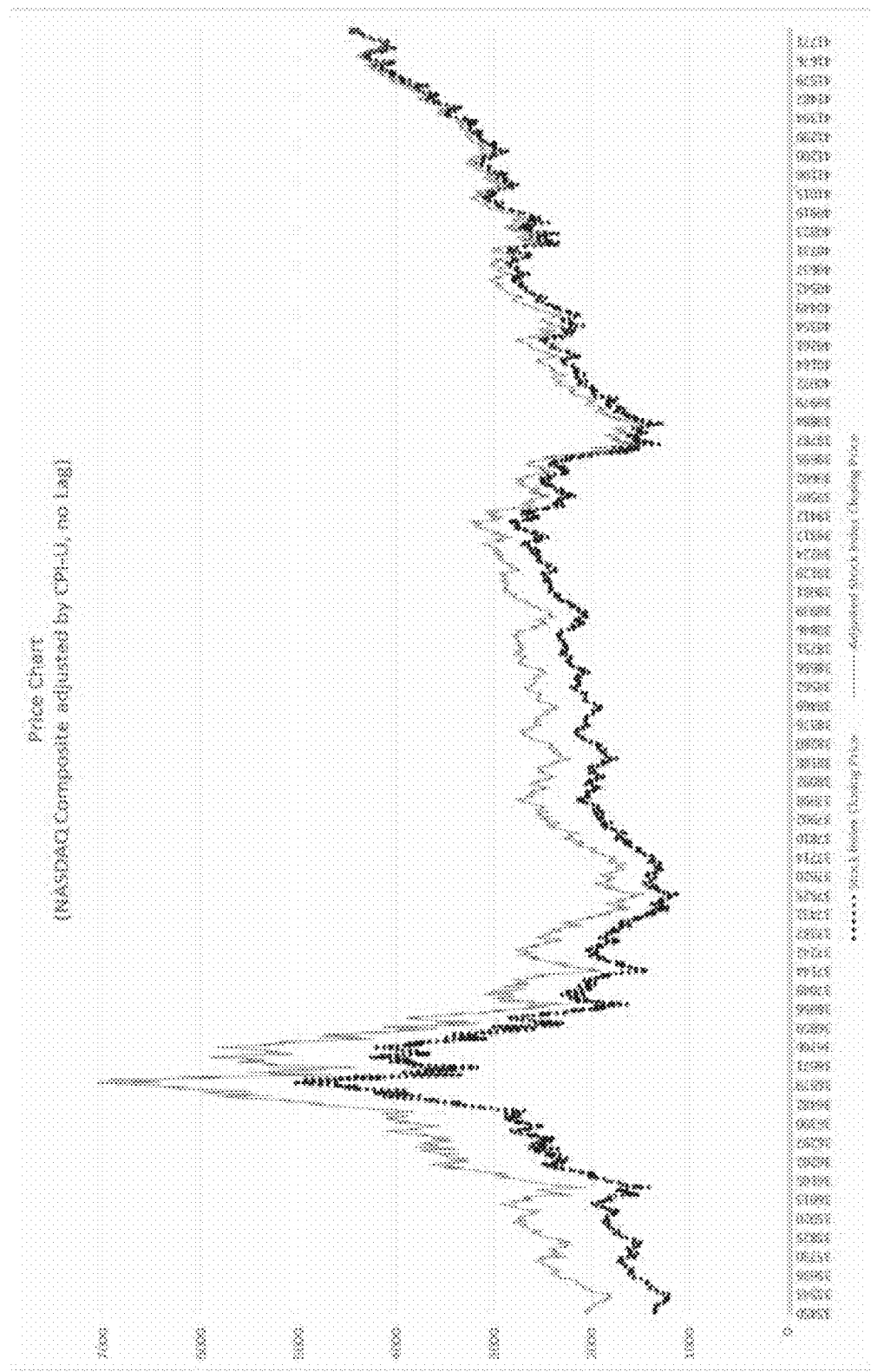

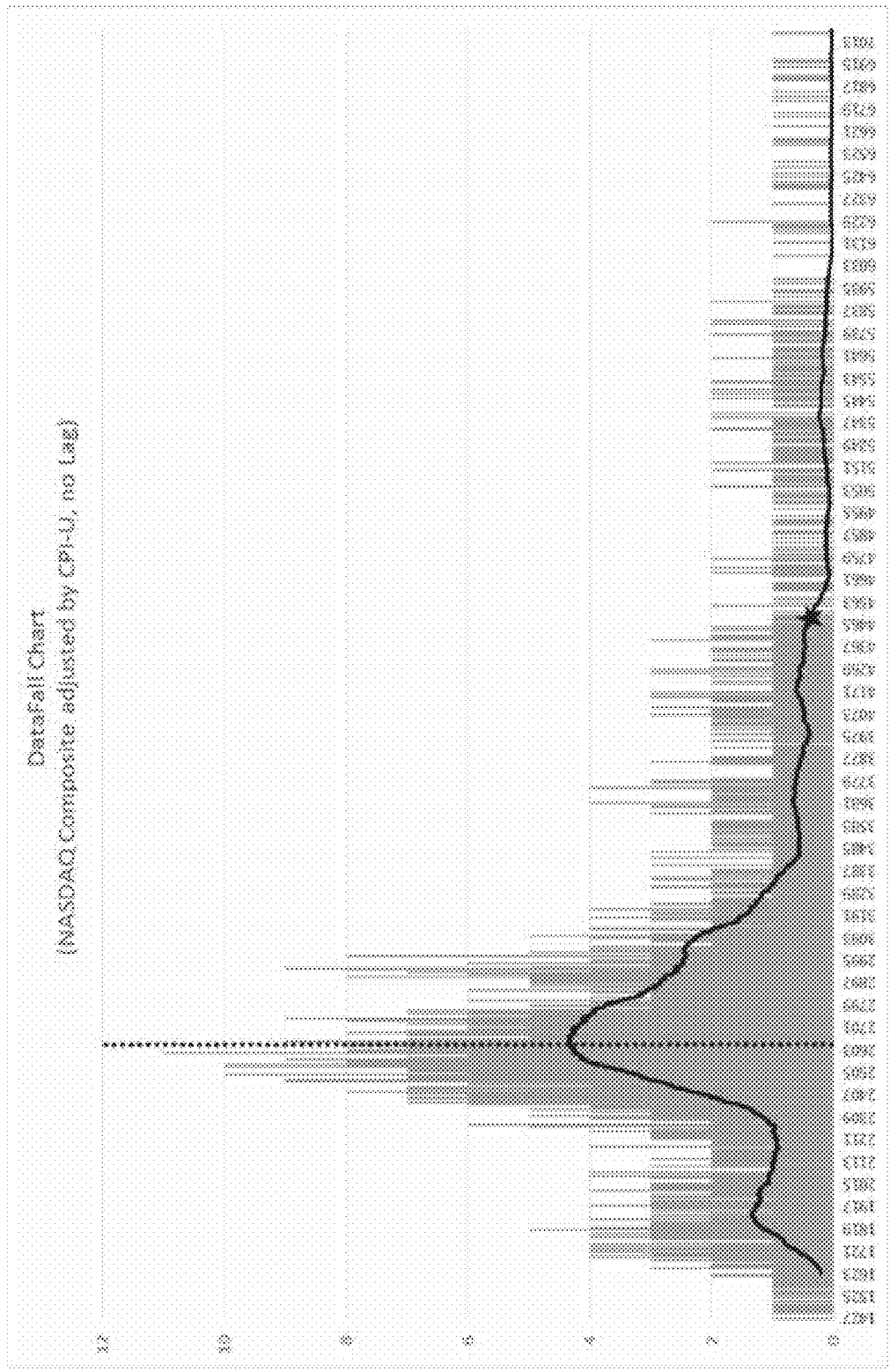

Figure 26A  Dataset Example
Stock Index = NASDAQ Composite
Macroeconomic Indicator = CBOE DJIA Volatility Index©
Time Lag = None

| Date | Column a<br>Stock Index<br>Close | Column b<br>Macroeconomic<br>Indicator | Column c<br>Macroeconomic Adjustment Factor Formula | Column d<br>Adjustment<br>Factor |
|---|---|---|---|---|
| 10/7/1997 | 1,737.27 | 21.48 | = (Macroeconomic Indicator for 7/23/2014) / (Macroeconomic Indicator for 1/20/1997) | 0.5261 |
| 10/8/1997 | 1,741.77 | 21.62 | = (Macroeconomic Indicator for 7/23/2014) / (Macroeconomic Indicator for 1/21/1997) | 0.5227 |
| 10/9/1997 | 1,745.85 | 21.76 | = (Macroeconomic Indicator for 7/23/2014) / (Macroeconomic Indicator for 1/22/1997) | 0.5193 |
| 10/10/1997 | 1,739.03 | 21.63 | = (Macroeconomic Indicator for 7/23/2014) / (Macroeconomic Indicator for 1/23/1997) | 0.5224 |
| 10/13/1997 | 1,742.12 | 22.33 | = (Macroeconomic Indicator for 7/23/2014) / (Macroeconomic Indicator for 1/24/1997) | 0.5060 |
| 10/14/1997 | 1,732.79 | 22.15 | = (Macroeconomic Indicator for 7/23/2014) / (Macroeconomic Indicator for 1/27/1997) | 0.5102 |
| 10/15/1997 | 1,723.37 | 22.09 | = (Macroeconomic Indicator for 7/23/2014) / (Macroeconomic Indicator for 1/28/1997) | 0.5115 |
| 10/16/1997 | 1,699.66 | 22.18 | = (Macroeconomic Indicator for 7/23/2014) / (Macroeconomic Indicator for 1/29/1997) | 0.5095 |
| 10/17/1997 | 1,666.85 | 22.37 | = (Macroeconomic Indicator for 7/23/2014) / (Macroeconomic Indicator for 1/30/1997) | 0.5051 |
| 10/20/1997 | 1,685.45 | 22.12 | = (Macroeconomic Indicator for 7/23/2014) / (Macroeconomic Indicator for 1/31/1997) | 0.5108 |
| 10/21/1997 | 1,712.54 | 21.44 | = (Macroeconomic Indicator for 7/23/2014) / (Macroeconomic Indicator for 2/1/1997) | 0.5271 |
| 10/22/1997 | 1,708.08 | 21.39 | = (Macroeconomic Indicator for 7/23/2014) / (Macroeconomic Indicator for 2/2/1997) | 0.5283 |
| ... | | | ... | ... |
| 6/27/2014 | 4,397.93 | 11.02 | = (Macroeconomic Indicator for 7/23/2014) / (Macroeconomic Indicator for 6/27/1997) | 1.0254 |
| 6/30/2014 | 4,408.18 | 11.06 | = (Macroeconomic Indicator for 7/23/2014) / (Macroeconomic Indicator for 6/30/1997) | 1.0217 |
| 7/1/2014 | 4,458.65 | 10.47 | = (Macroeconomic Indicator for 7/23/2014) / (Macroeconomic Indicator for 7/1/1997) | 1.0793 |
| 7/2/2014 | 4,457.73 | 10.18 | = (Macroeconomic Indicator for 7/23/2014) / (Macroeconomic Indicator for 7/2/1997) | 1.1100 |
| 7/3/2014 | 4,485.93 | 9.71 | = (Macroeconomic Indicator for 7/23/2014) / (Macroeconomic Indicator for 7/3/1997) | 1.1637 |
| 7/7/2014 | 4,451.53 | 10.75 | = (Macroeconomic Indicator for 7/23/2014) / (Macroeconomic Indicator for 7/7/1997) | 1.0512 |
| 7/8/2014 | 4,391.46 | 11.21 | = (Macroeconomic Indicator for 7/23/2014) / (Macroeconomic Indicator for 7/8/1997) | 1.0080 |
| 7/9/2014 | 4,419.03 | 10.79 | = (Macroeconomic Indicator for 7/23/2014) / (Macroeconomic Indicator for 7/9/1997) | 1.0473 |
| 7/10/2014 | 4,396.20 | 11.75 | = (Macroeconomic Indicator for 7/23/2014) / (Macroeconomic Indicator for 7/10/1997) | 0.9617 |
| 7/11/2014 | 4,415.49 | 11.21 | = (Macroeconomic Indicator for 7/23/2014) / (Macroeconomic Indicator for 7/11/1997) | 1.0080 |
| 7/14/2014 | 4,440.42 | 10.82 | = (Macroeconomic Indicator for 7/23/2014) / (Macroeconomic Indicator for 7/14/1997) | 1.0444 |
| 7/15/2014 | 4,416.39 | 11.16 | = (Macroeconomic Indicator for 7/23/2014) / (Macroeconomic Indicator for 7/15/1997) | 1.0125 |
| 7/16/2014 | 4,425.97 | 10.30 | = (Macroeconomic Indicator for 7/23/2014) / (Macroeconomic Indicator for 7/16/1997) | 1.0971 |
| 7/17/2014 | 4,363.45 | 13.35 | = (Macroeconomic Indicator for 7/23/2014) / (Macroeconomic Indicator for 7/17/1997) | 0.8464 |
| 7/18/2014 | 4,432.15 | 11.59 | = (Macroeconomic Indicator for 7/23/2014) / (Macroeconomic Indicator for 7/18/1997) | 0.9750 |
| 7/21/2014 | 4,424.70 | 12.01 | = (Macroeconomic Indicator for 7/23/2014) / (Macroeconomic Indicator for 7/21/1997) | 0.9409 |
| 7/22/2014 | 4,456.02 | 11.43 | = (Macroeconomic Indicator for 7/23/2014) / (Macroeconomic Indicator for 7/22/1997) | 0.9886 |
| 7/23/2014 | 4,473.70 | 11.30 | = (Macroeconomic Indicator for 7/23/2014) / (Macroeconomic Indicator for 7/23/1997) | 1.0000 |

Figure 26B Dataset Example
Stock Index = NASDAQ Composite
Macroeconomic Indicator = CBOE DJIA Volatility Index©
Time Lag = None

| Date | Column e<br>Stock Index Adjustment Factor Formula | Column f<br>Adjusted Stock Index Close |
|---|---|---|
| 10/7/1997 | = (Stock Index Closing Price on 1/20/1997) * (Adjustment Factor for 1/20/1997) | 913.98 |
| 10/8/1997 | = (Stock Index Closing Price on 1/21/1997) * (Adjustment Factor for 1/21/1997) | 910.42 |
| 10/9/1997 | = (Stock Index Closing Price on 1/22/1997) * (Adjustment Factor for 1/22/1997) | 906.62 |
| 10/10/1997 | = (Stock Index Closing Price on 1/23/1997) * (Adjustment Factor for 1/23/1997) | 908.47 |
| 10/13/1997 | = (Stock Index Closing Price on 1/24/1997) * (Adjustment Factor for 1/24/1997) | 881.51 |
| 10/14/1997 | = (Stock Index Closing Price on 1/27/1997) * (Adjustment Factor for 1/27/1997) | 884.07 |
| 10/15/1997 | = (Stock Index Closing Price on 1/28/1997) * (Adjustment Factor for 1/28/1997) | 881.50 |
| 10/16/1997 | = (Stock Index Closing Price on 1/29/1997) * (Adjustment Factor for 1/29/1997) | 865.98 |
| 10/17/1997 | = (Stock Index Closing Price on 1/30/1997) * (Adjustment Factor for 1/30/1997) | 841.93 |
| 10/20/1997 | = (Stock Index Closing Price on 1/31/1997) * (Adjustment Factor for 1/30/1997) | 860.93 |
| 10/21/1997 | = (Stock Index Closing Price on 2/1/1997) * (Adjustment Factor for 2/1/1997) | 902.68 |
| 10/22/1997 | = (Stock Index Closing Price on 2/2/1997) * (Adjustment Factor for 2/2/1997) | 902.38 |
| ... | ... | ... |
| 6/27/2014 | = (Stock Index Closing Price on 6/27/2014) * (Adjustment Factor for 6/27/2014) | 4509.64 |
| 6/30/2014 | = (Stock Index Closing Price on 6/30/2014) * (Adjustment Factor for 6/30/2014) | 4503.84 |
| 7/1/2014 | = (Stock Index Closing Price on 7/1/2014) * (Adjustment Factor for 7/1/2014) | 4812.22 |
| 7/2/2014 | = (Stock Index Closing Price on 7/2/2014) * (Adjustment Factor for 7/2/2014) | 4948.08 |
| 7/3/2014 | = (Stock Index Closing Price on 7/3/2014) * (Adjustment Factor for 7/3/2014) | 5220.28 |
| 7/7/2014 | = (Stock Index Closing Price on 7/7/2014) * (Adjustment Factor for 7/7/2014) | 4679.45 |
| 7/8/2014 | = (Stock Index Closing Price on 7/8/2014) * (Adjustment Factor for 7/8/2014) | 4426.59 |
| 7/9/2014 | = (Stock Index Closing Price on 7/9/2014) * (Adjustment Factor for 7/9/2014) | 4628.05 |
| 7/10/2014 | = (Stock Index Closing Price on 7/10/2014) * (Adjustment Factor for 7/10/2014) | 4227.83 |
| 7/11/2014 | = (Stock Index Closing Price on 7/11/2014) * (Adjustment Factor for 7/11/2014) | 4450.81 |
| 7/14/2014 | = (Stock Index Closing Price on 7/14/2014) * (Adjustment Factor for 7/14/2014) | 4637.57 |
| 7/15/2014 | = (Stock Index Closing Price on 7/15/2014) * (Adjustment Factor for 7/15/2014) | 4471.59 |
| 7/16/2014 | = (Stock Index Closing Price on 7/16/2014) * (Adjustment Factor for 7/16/2014) | 4855.73 |
| 7/17/2014 | = (Stock Index Closing Price on 7/17/2014) * (Adjustment Factor for 7/17/2014) | 3693.22 |
| 7/18/2014 | = (Stock Index Closing Price on 7/18/2014) * (Adjustment Factor for 7/18/2014) | 4321.35 |
| 7/21/2014 | = (Stock Index Closing Price on 7/21/2014) * (Adjustment Factor for 7/21/2014) | 4163.20 |
| 7/22/2014 | = (Stock Index Closing Price on 7/22/2014) * (Adjustment Factor for 7/22/2014) | 4405.22 |
| 7/23/2014 | = (Stock Index Closing Price on 7/23/2014) * (Adjustment Factor for 7/23/2014) | 4473.70 |

Frequency Distribution Table

Figure 27

Stock Index = NASDAQ Composite
Macroeconomic Indicator = CBOE DJIA Volatility Index©
Time Lag = None Min. 199.39
Max. 5220.28
Median 1456.67

| X-Axis Value | Frequency |
| --- | --- |
| 199 | 1 |
| 200 | 0 |
| 201 | 0 |
| 202 | 0 |
| 203 | 0 |
| 204 | 0 |
| 205 | 0 |
| 206 | 0 |
| 207 | 0 |
| ... | ... |
| 1450 | 1 |
| 1451 | 4 |
| 1452 | 1 |
| 1453 | 4 |
| 1454 | 2 |
| 1455 | 0 |
| 1456 | 3 |
| 1457 | 2 |
| 1458 | 3 |
| 1459 | 2 |
| 1460 | 1 |
| ... | ... |
| 5215 | 0 |
| 5216 | 0 |
| 5217 | 0 |
| 5218 | 0 |
| 5219 | 0 |
| 5220 | 1 |

Figure 30A  Dataset Example
Stock Index = NASDAQ Composite
Macroeconomic Indicator = CBOE DJIA Volatility Index®
Time Lag = 6 Months

| Date | Column a<br>Stock Index<br>Close | Column b<br>Macroeconomic<br>Indicator | Column c<br>Macroeconomic Adjustment Factor Formula | Column d<br>Adjustment<br>Factor |
|---|---|---|---|---|
| 10/7/1997 | 1,737.27 | 21.48 | = (Macroeconomic Indicator for 7/23/2014) / (Macroeconomic Indicator for 1/20/1997) | 0.5261 |
| 10/8/1997 | 1,741.77 | 21.62 | = (Macroeconomic Indicator for 7/23/2014) / (Macroeconomic Indicator for 1/21/1997) | 0.5227 |
| 10/9/1997 | 1,745.85 | 21.76 | = (Macroeconomic Indicator for 7/23/2014) / (Macroeconomic Indicator for 1/22/1997) | 0.5193 |
| 10/10/1997 | 1,739.03 | 21.63 | = (Macroeconomic Indicator for 7/23/2014) / (Macroeconomic Indicator for 1/23/1997) | 0.5224 |
| 10/13/1997 | 1,742.12 | 22.33 | = (Macroeconomic Indicator for 7/23/2014) / (Macroeconomic Indicator for 1/24/1997) | 0.5060 |
| 10/14/1997 | 1,732.79 | 22.15 | = (Macroeconomic Indicator for 7/23/2014) / (Macroeconomic Indicator for 1/27/1997) | 0.5102 |
| 10/15/1997 | 1,723.37 | 22.09 | = (Macroeconomic Indicator for 7/23/2014) / (Macroeconomic Indicator for 1/28/1997) | 0.5115 |
| 10/16/1997 | 1,699.66 | 22.18 | = (Macroeconomic Indicator for 7/23/2014) / (Macroeconomic Indicator for 1/29/1997) | 0.5095 |
| 10/17/1997 | 1,666.85 | 22.37 | = (Macroeconomic Indicator for 7/23/2014) / (Macroeconomic Indicator for 1/30/1997) | 0.5051 |
| 10/20/1997 | 1,685.45 | 22.12 | = (Macroeconomic Indicator for 7/23/2014) / (Macroeconomic Indicator for 1/31/1997) | 0.5108 |
| 10/21/1997 | 1,712.54 | 21.44 | = (Macroeconomic Indicator for 7/23/2014) / (Macroeconomic Indicator for 2/1/1997) | 0.5271 |
| 10/22/1997 | 1,708.08 | 21.39 | = (Macroeconomic Indicator for 7/23/2014) / (Macroeconomic Indicator for 2/2/1997) | 0.5283 |
| ⋮ | ⋮ | ⋮ | ⋮ | ⋮ |
| 6/27/2014 | 4,397.93 | 11.02 | = (Macroeconomic Indicator for 7/23/2014) / (Macroeconomic Indicator for 6/27/1997) | 1.0254 |
| 6/30/2014 | 4,408.18 | 11.06 | = (Macroeconomic Indicator for 7/23/2014) / (Macroeconomic Indicator for 6/30/1997) | 1.0217 |
| 7/1/2014 | 4,458.65 | 10.47 | = (Macroeconomic Indicator for 7/23/2014) / (Macroeconomic Indicator for 7/1/1997) | 1.0793 |
| 7/2/2014 | 4,457.73 | 10.18 | = (Macroeconomic Indicator for 7/23/2014) / (Macroeconomic Indicator for 7/2/1997) | 1.1100 |
| 7/3/2014 | 4,485.93 | 9.71 | = (Macroeconomic Indicator for 7/23/2014) / (Macroeconomic Indicator for 7/3/1997) | 1.1637 |
| 7/7/2014 | 4,451.53 | 10.75 | = (Macroeconomic Indicator for 7/23/2014) / (Macroeconomic Indicator for 7/7/1997) | 1.0512 |
| 7/8/2014 | 4,391.46 | 11.21 | = (Macroeconomic Indicator for 7/23/2014) / (Macroeconomic Indicator for 7/8/1997) | 1.0080 |
| 7/9/2014 | 4,419.03 | 10.79 | = (Macroeconomic Indicator for 7/23/2014) / (Macroeconomic Indicator for 7/9/1997) | 1.0473 |
| 7/10/2014 | 4,396.20 | 11.75 | = (Macroeconomic Indicator for 7/23/2014) / (Macroeconomic Indicator for 7/10/1997) | 0.9617 |
| 7/11/2014 | 4,415.49 | 11.21 | = (Macroeconomic Indicator for 7/23/2014) / (Macroeconomic Indicator for 7/11/1997) | 1.0080 |
| 7/14/2014 | 4,440.42 | 10.82 | = (Macroeconomic Indicator for 7/23/2014) / (Macroeconomic Indicator for 7/14/1997) | 1.0444 |
| 7/15/2014 | 4,416.39 | 11.16 | = (Macroeconomic Indicator for 7/23/2014) / (Macroeconomic Indicator for 7/15/1997) | 1.0125 |
| 7/16/2014 | 4,425.97 | 10.30 | = (Macroeconomic Indicator for 7/23/2014) / (Macroeconomic Indicator for 7/16/1997) | 1.0971 |
| 7/17/2014 | 4,363.45 | 13.35 | = (Macroeconomic Indicator for 7/23/2014) / (Macroeconomic Indicator for 7/17/1997) | 0.8464 |
| 7/18/2014 | 4,432.15 | 11.59 | = (Macroeconomic Indicator for 7/23/2014) / (Macroeconomic Indicator for 7/18/1997) | 0.9750 |
| 7/21/2014 | 4,424.70 | 12.01 | = (Macroeconomic Indicator for 7/23/2014) / (Macroeconomic Indicator for 7/21/1997) | 0.9409 |
| 7/22/2014 | 4,456.02 | 11.43 | = (Macroeconomic Indicator for 7/23/2014) / (Macroeconomic Indicator for 7/22/1997) | 0.9886 |
| 7/23/2014 | 4,473.70 | 11.30 | = (Macroeconomic Indicator for 7/23/2014) / (Macroeconomic Indicator for 7/23/1997) | 1.0000 |

Figure 30B  Dataset Example

Stock Index = NASDAQ Composite
Macroeconomic Indicator = CBOE DJIA Volatility Index®
Time Lag = 6 Months

| Date | Column e<br>Stock Index Adjustment Factor Formula | Column f<br>Adjusted Stock<br>Index Close |
|---|---|---|
| 10/7/1997 | = (Stock Index Closing Price on 1/20/1997) * (Adjustment Factor for 7/21/1997) | 810.78 |
| 10/8/1997 | = (Stock Index Closing Price on 1/21/1997) * (Adjustment Factor for 7/22/1997) | 885.34 |
| 10/9/1997 | = (Stock Index Closing Price on 1/22/1997) * (Adjustment Factor for 7/23/1997) | 878.69 |
| 10/10/1997 | = (Stock Index Closing Price on 1/23/1997) * (Adjustment Factor for 7/24/1997) | 958.55 |
| 10/13/1997 | = (Stock Index Closing Price on 1/24/1997) * (Adjustment Factor for 7/25/1997) | 942.84 |
| 10/14/1997 | = (Stock Index Closing Price on 1/27/1997) * (Adjustment Factor for 7/28/1997) | 876.45 |
| 10/15/1997 | = (Stock Index Closing Price on 1/28/1997) * (Adjustment Factor for 7/29/1997) | 961.64 |
| 10/16/1997 | = (Stock Index Closing Price on 1/29/1997) * (Adjustment Factor for 7/30/1997) | 924.28 |
| 10/17/1997 | = (Stock Index Closing Price on 1/30/1997) * (Adjustment Factor for 7/31/1997) | 957.61 |
| 10/20/1997 | = (Stock Index Closing Price on 1/31/1997) * (Adjustment Factor for 8/1/1997) | 978.74 |
| 10/21/1997 | = (Stock Index Closing Price on 2/1/1997) * (Adjustment Factor for 8/4/1997) | 935.39 |
| 10/22/1997 | = (Stock Index Closing Price on 2/2/1997) * (Adjustment Factor for 8/5/1997) | 860.53 |
| ⋮ | ⋮ | ⋮ |
| 6/27/2014 | = (Stock Index Closing Price on 6/27/2014) * (Adjustment Factor for 7/23/2014) | 4397.93 |
| 6/30/2014 | = (Stock Index Closing Price on 6/30/2014) * (Adjustment Factor for 7/23/2014) | 4408.18 |
| 7/1/2014 | = (Stock Index Closing Price on 7/1/2014) * (Adjustment Factor for 7/23/2014) | 4458.65 |
| 7/2/2014 | = (Stock Index Closing Price on 7/2/2014) * (Adjustment Factor for 7/23/2014) | 4457.73 |
| 7/3/2014 | = (Stock Index Closing Price on 7/3/2014) * (Adjustment Factor for 7/23/2014) | 4485.93 |
| 7/7/2014 | = (Stock Index Closing Price on 7/7/2014) * (Adjustment Factor for 7/23/2014) | 4451.53 |
| 7/8/2014 | = (Stock Index Closing Price on 7/8/2014) * (Adjustment Factor for 7/23/2014) | 4391.46 |
| 7/9/2014 | = (Stock Index Closing Price on 7/9/2014) * (Adjustment Factor for 7/23/2014) | 4419.03 |
| 7/10/2014 | = (Stock Index Closing Price on 7/10/2014) * (Adjustment Factor for 7/23/2014) | 4396.20 |
| 7/11/2014 | = (Stock Index Closing Price on 7/11/2014) * (Adjustment Factor for 7/23/2014) | 4415.49 |
| 7/14/2014 | = (Stock Index Closing Price on 7/14/2014) * (Adjustment Factor for 7/23/2014) | 4440.42 |
| 7/15/2014 | = (Stock Index Closing Price on 7/15/2014) * (Adjustment Factor for 7/23/2014) | 4416.39 |
| 7/16/2014 | = (Stock Index Closing Price on 7/16/2014) * (Adjustment Factor for 7/23/2014) | 4425.97 |
| 7/17/2014 | = (Stock Index Closing Price on 7/17/2014) * (Adjustment Factor for 7/23/2014) | 4363.45 |
| 7/18/2014 | = (Stock Index Closing Price on 7/18/2014) * (Adjustment Factor for 7/23/2014) | 4432.15 |
| 7/21/2014 | = (Stock Index Closing Price on 7/21/2014) * (Adjustment Factor for 7/23/2014) | 4424.70 |
| 7/22/2014 | = (Stock Index Closing Price on 7/22/2014) * (Adjustment Factor for 7/23/2014) | 4456.02 |
| 7/23/2014 | = (Stock Index Closing Price on 7/23/2014) * (Adjustment Factor for 7/23/2014) | 4473.70 |

Frequency Distribution Table

Figure 31

Stock Index = NASDAQ Composite
Macroeconomic Indicator = CBOE DJIA Volatility Index©
Time Lag = 6 Months

| | |
|---|---|
| Min. | 370.37 |
| Max. | 4821.29 |
| Median | 1467.75 |

| X-Axis Value | Frequency |
|---|---|
| 370 | 1 |
| 371 | 0 |
| 372 | 0 |
| 373 | 0 |
| 374 | 0 |
| 375 | 0 |
| ... | ... |
| 1460 | 2 |
| 1461 | 1 |
| 1462 | 1 |
| 1463 | 2 |
| 1464 | 0 |
| 1465 | 2 |
| 1466 | 4 |
| 1467 | 2 |
| 1468 | 5 |
| 1469 | 1 |
| 1470 | 1 |
| ... | ... |
| 4812 | 0 |
| 4813 | 0 |
| 4814 | 0 |
| 4815 | 0 |
| 4816 | 0 |
| 4817 | 0 |
| 4818 | 0 |
| 4819 | 0 |
| 4820 | 0 |
| 4821 | 1 |

DataFall Example n = 400

Frequency Distribution Table

| X-Axis Value | Frequency | X-Axis Value | Frequency | X-Axis Value | Frequency | X-Axis Value | Frequency | X-Axis Value | Frequency |
|---|---|---|---|---|---|---|---|---|---|
| 1 | 1 | 11 | 9 | 21 | 12 | 31 | 11 | 41 | 6 |
| 2 | 0 | 12 | 6 | 22 | 14 | 32 | 11 | 42 | 6 |
| 3 | 2 | 13 | 9 | 23 | 13 | 33 | 10 | 43 | 8 |
| 4 | 3 | 14 | 10 | 24 | 13 | 34 | 9 | 44 | 5 |
| 5 | 3 | 15 | 10 | 25 | 15 | 35 | 7 | 45 | 4 |
| 6 | 5 | 16 | 12 | 26 | 14 | 36 | 9 | 46 | 3 |
| 7 | 5 | 17 | 10 | 27 | 13 | 37 | 8 | 47 | 2 |
| 8 | 7 | 18 | 12 | 28 | 13 | 38 | 8 | 48 | 0 |
| 9 | 6 | 19 | 14 | 29 | 12 | 39 | 12 | 49 | 1 |
| 10 | 8 | 20 | 12 | 30 | 9 | 40 | 7 | 50 | 1 |

Figure 34

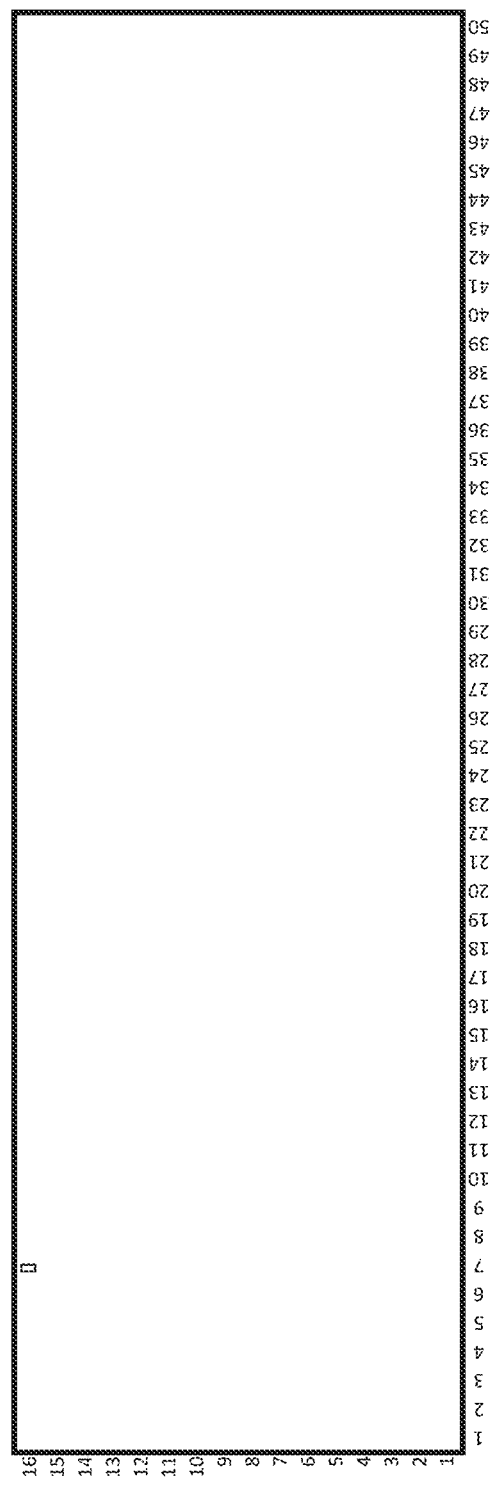

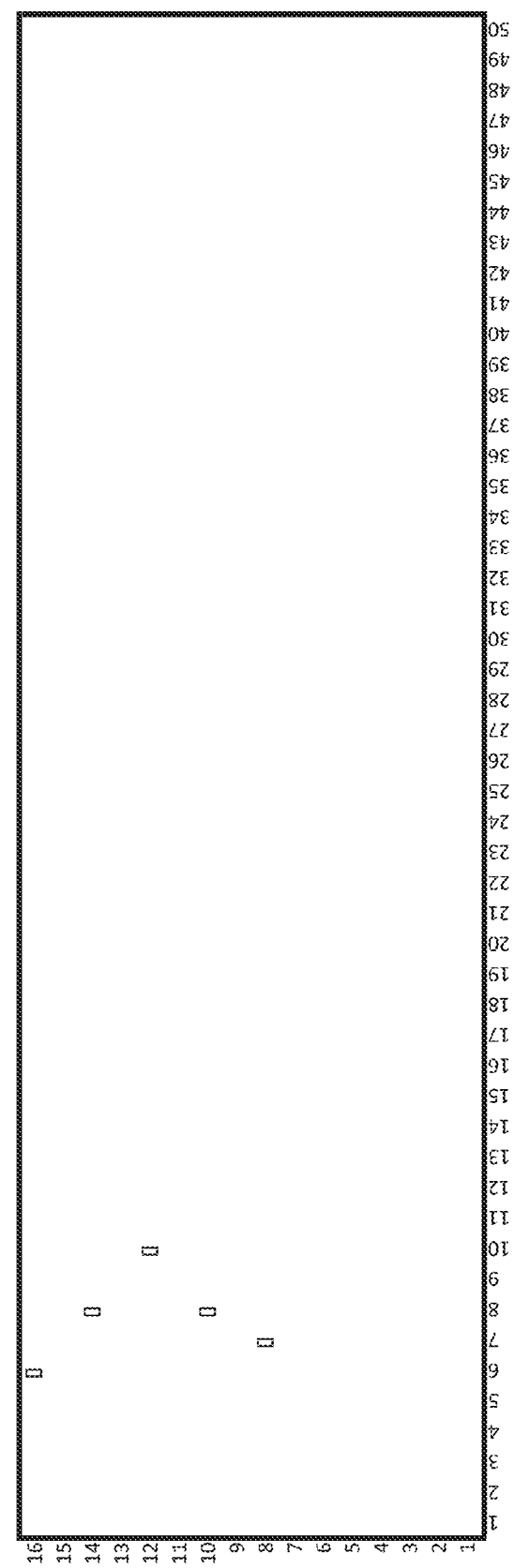

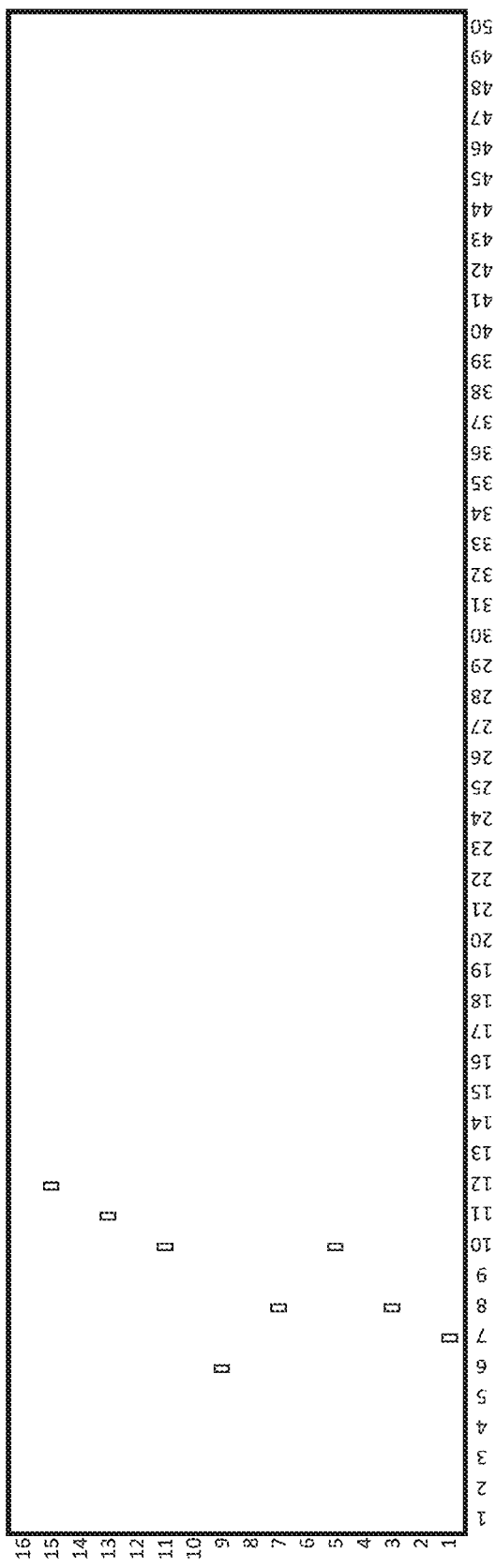

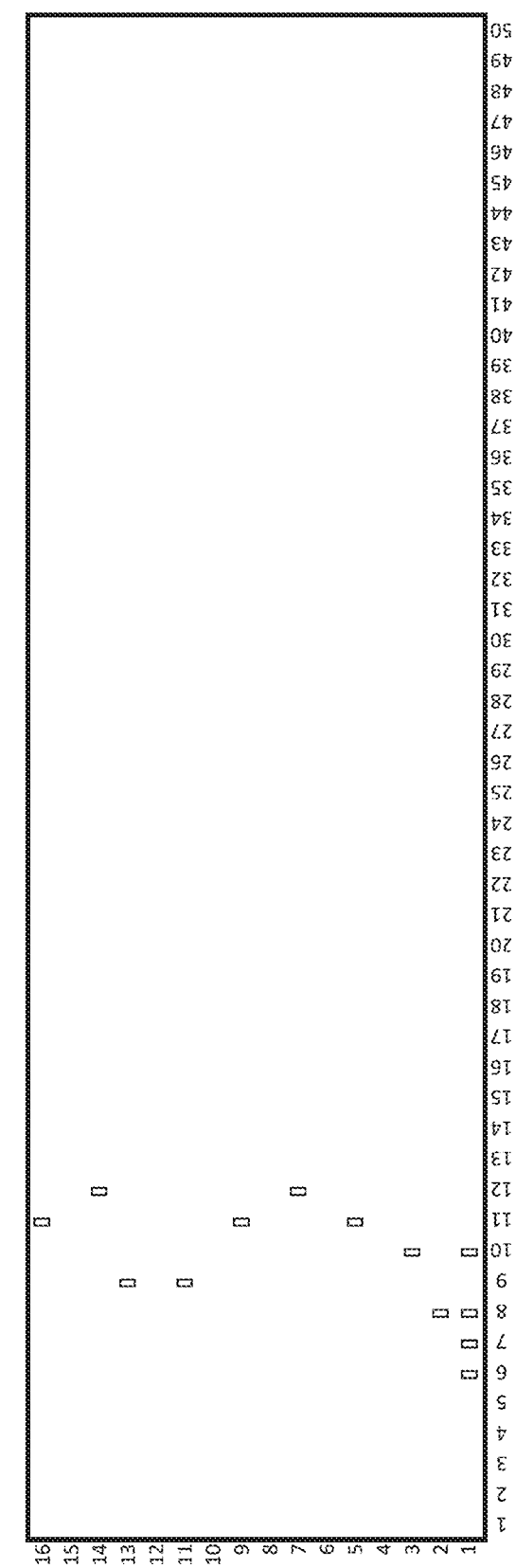

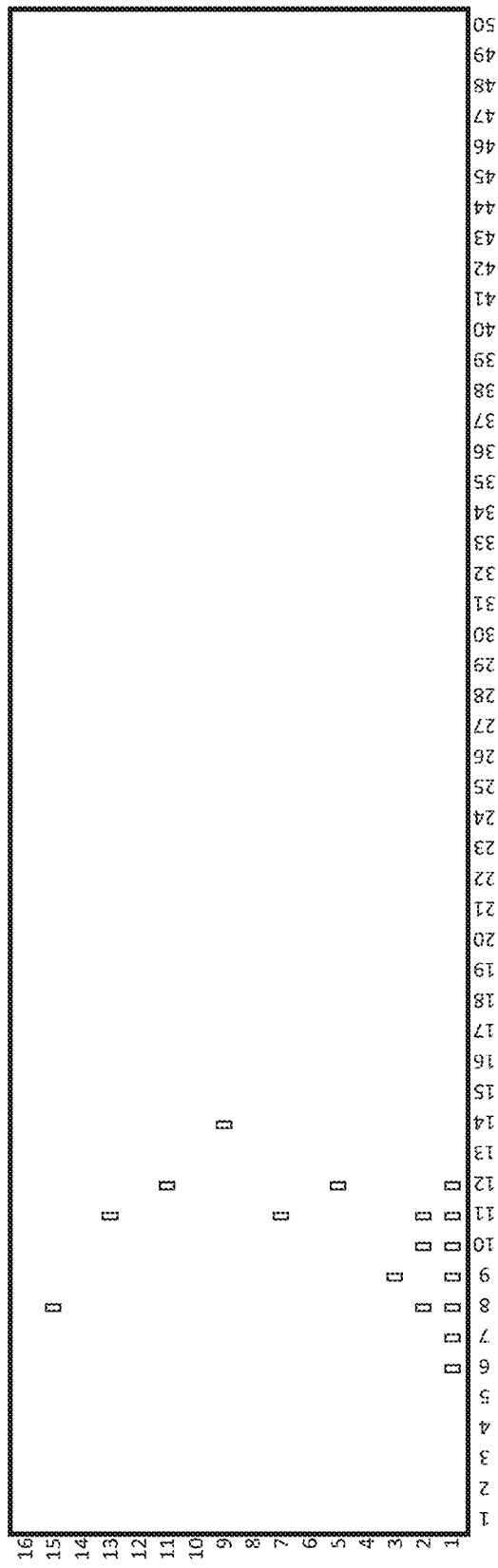

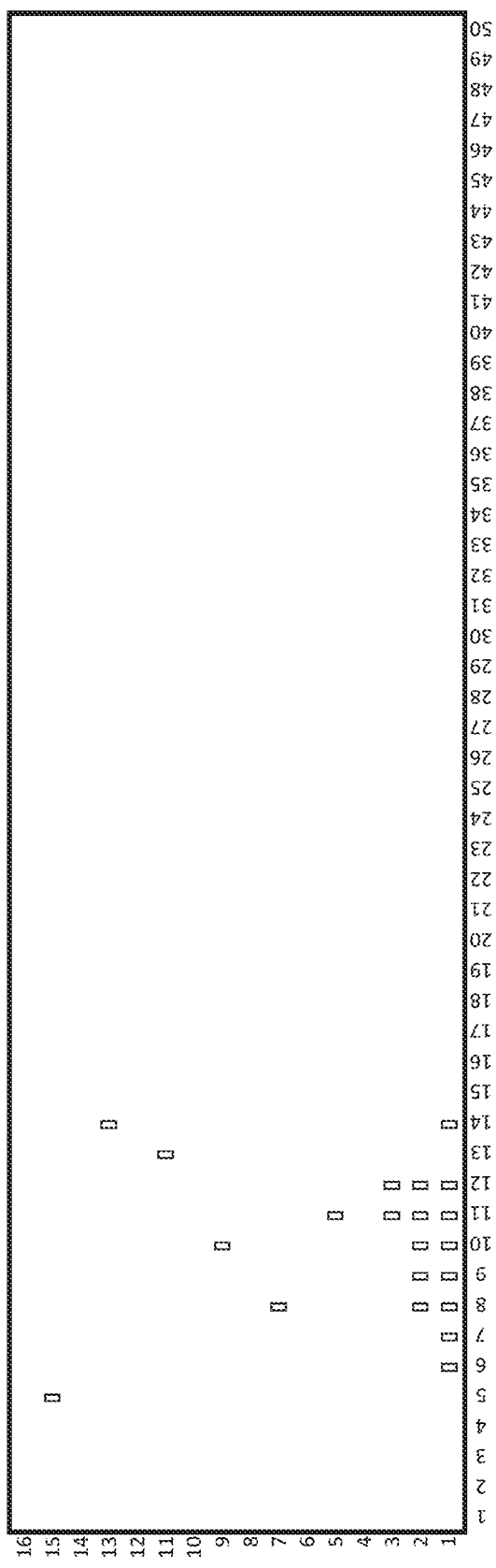

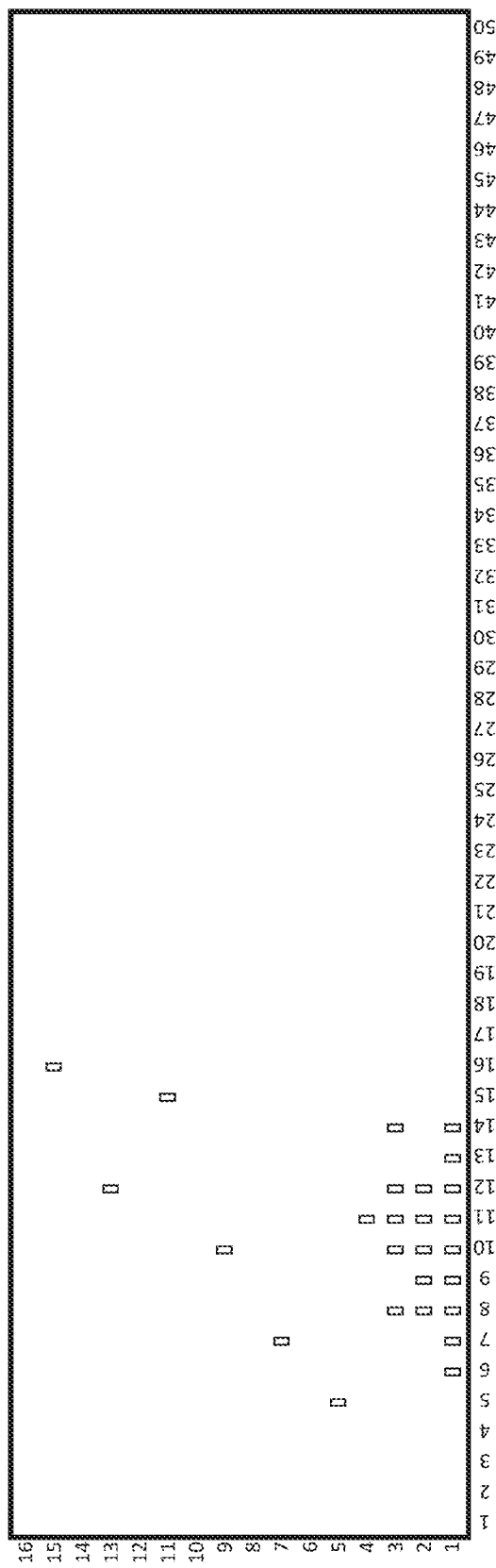

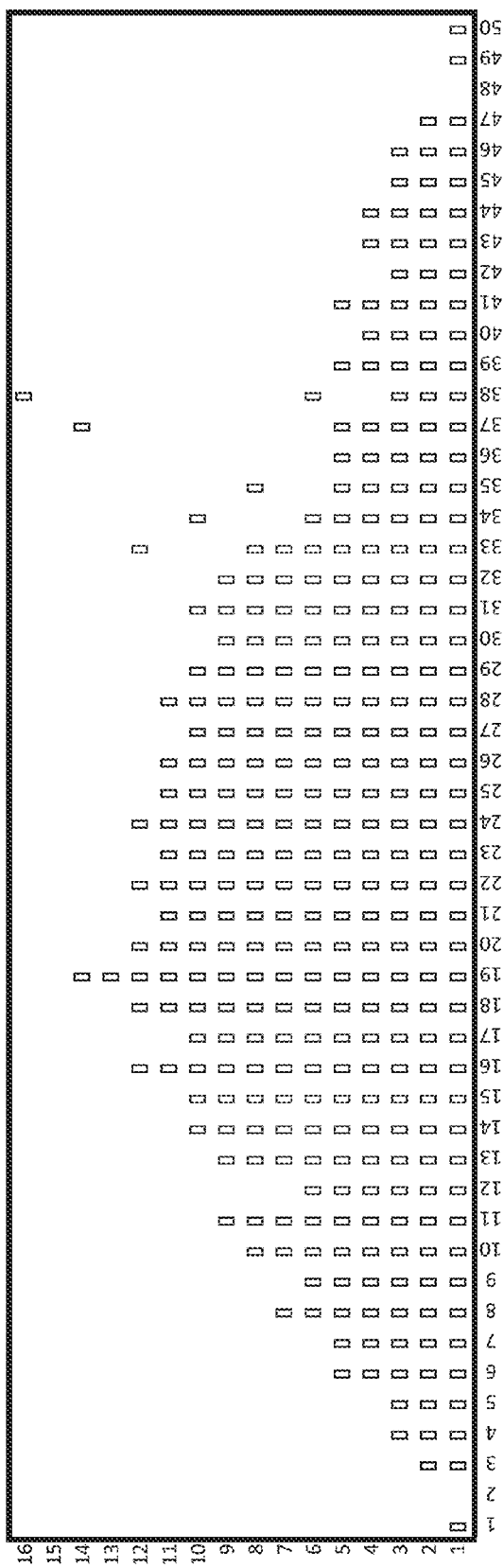

Figure 35K

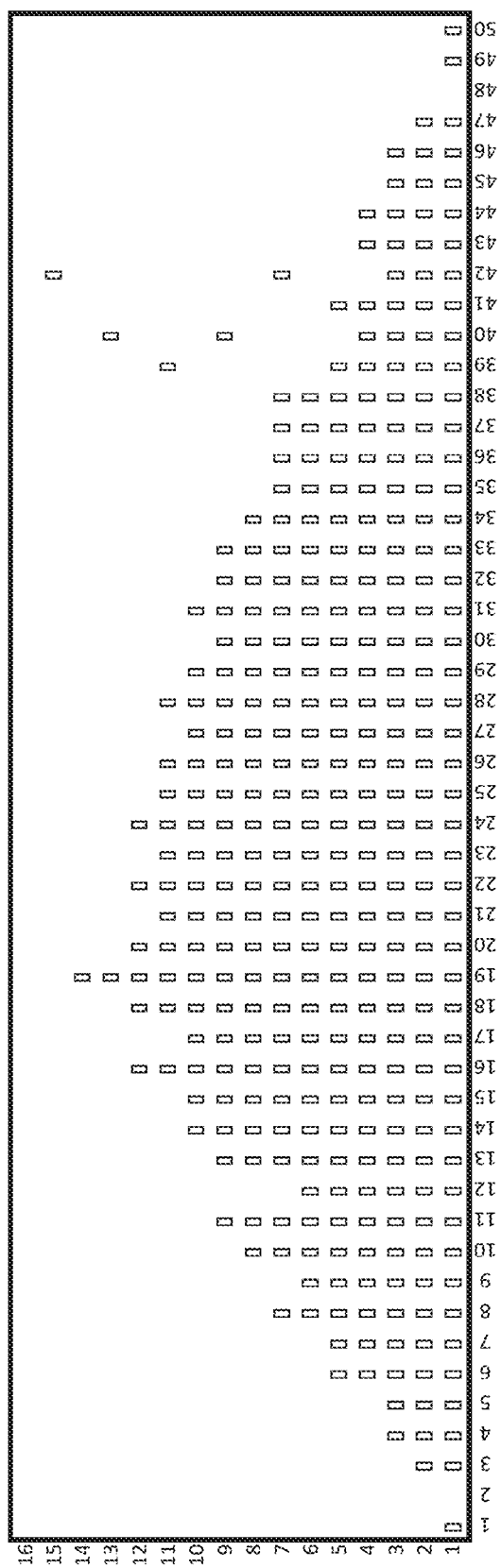

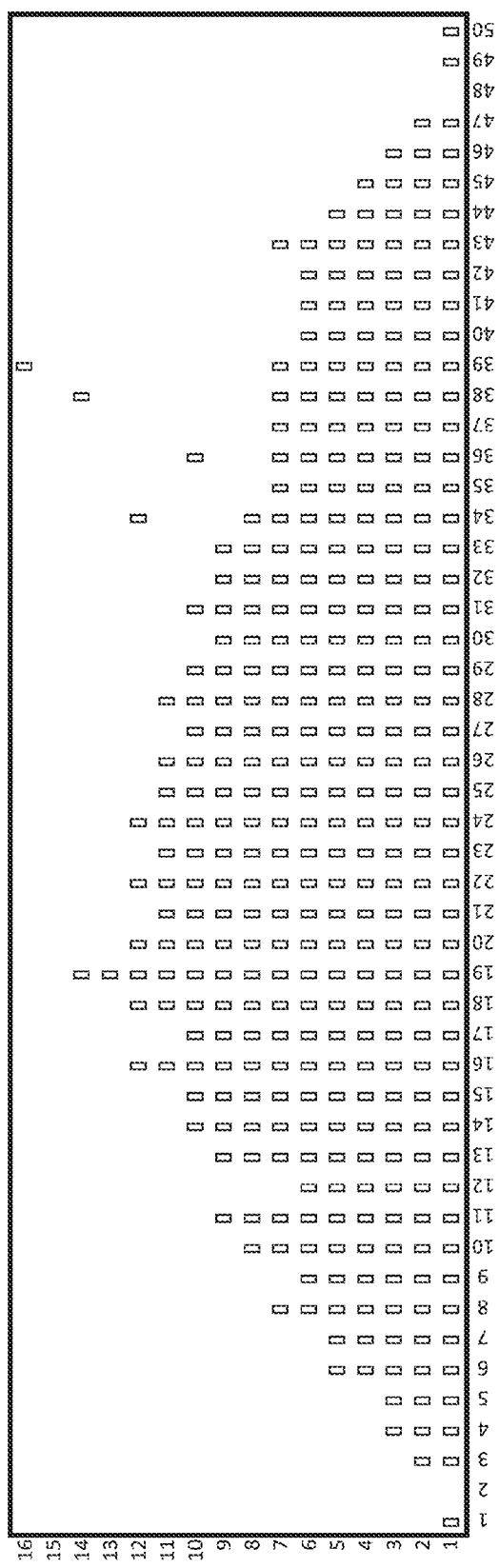

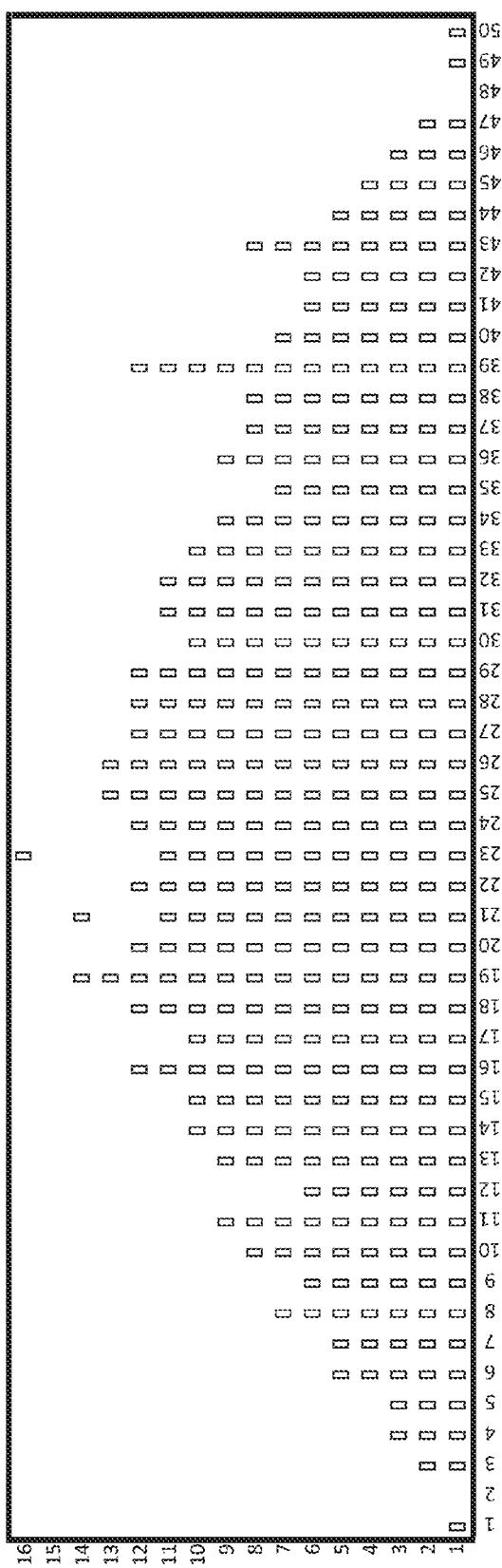

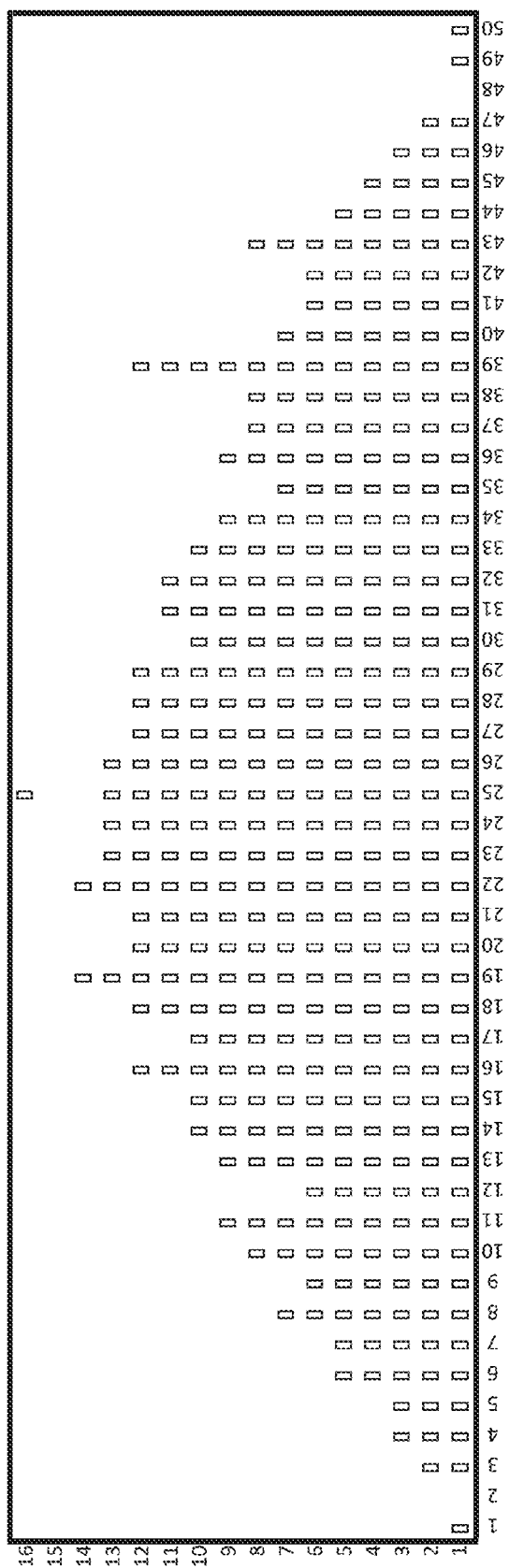

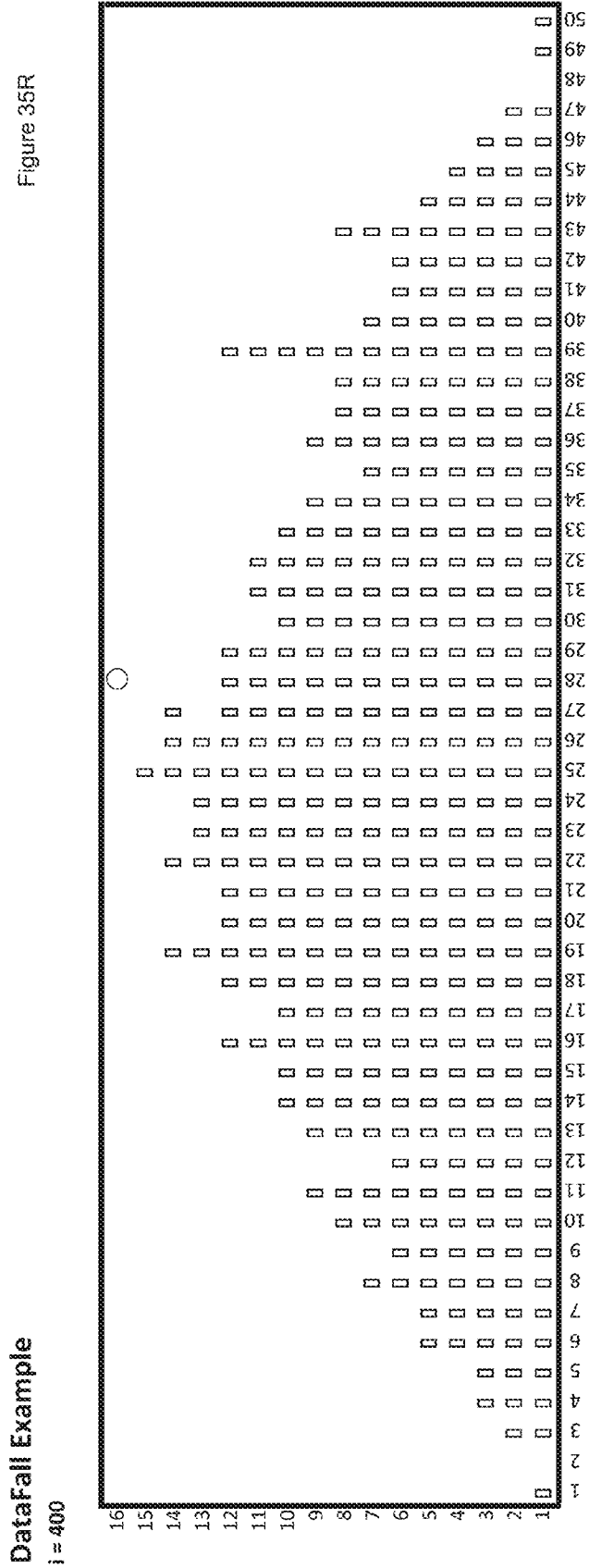

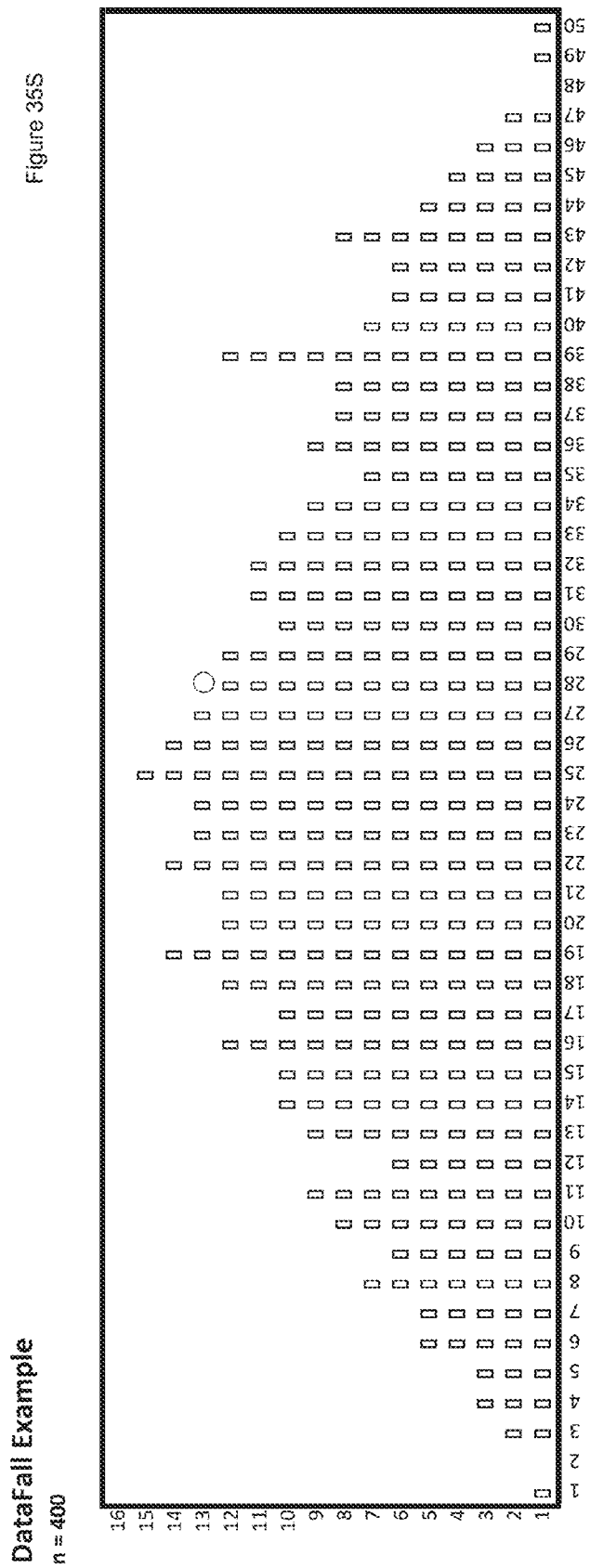

Figure 36

Hardware Configuration

AUTOMATED METHOD OF IDENTIFYING STOCK INDEXES WHICH ARE HISTORICALLY HIGH OR LOW RELATIVE TO A PLURALITY OF MACROECONOMIC INDICATORS

CROSS-REFERENCE TO RELATED APPLICATIONS

This application claims priority to U.S. Provisional Patent Application No. 61/864,696 filed Aug. 12, 2013, which is incorporated herein by reference.

BACKGROUND OF THE INVENTION

Investors and their advisors have two basic tasks, namely, to find and buy low priced assets and then to sell those assets near their highest price. However, identifying whether a given price is truly high or low is a difficult task. Logic and economic theory tells us that we shouldn't compare any two historical prices without first accounting for the change in their relative values over time (e.g., adjusting for inflation). While there are many illustrations of the need to adjust for inflation, there are no simple, fast, and interactive ways of performing such a calculation. Furthermore, the marketplace is not solely a reflection of inflationary pressures, rather there are many other economic forces at work.

SUMMARY OF THE INVENTION

Preferred embodiments of the present invention tracks hundreds of macroeconomic indicators, calculating their change over time, and using them to adjust closing stock index prices so that the historical stock index closing levels reflect the change in those macroeconomic indicators, allowing for a more useful analysis. Through the "Index Finder" feature, the present invention sorts thorough tens of thousands of datasets to find the stock indexes that are at or near either the high or low point of their historical pattern and to discover whether or not that pattern is statistically significant. The Index Finder then displays its findings as Buy or Sell Signals for the stock indexes that passes its analysis.

Preferred embodiments of the present invention also allow for the independent investigation of other relationships through the "DataFall" effect which presents the historical price data in a more intuitive form of a "frequency distribution curve." Another preferred embodiment carries out trading instructions to purchase or sell a portfolio of stock index-related financial products based upon its rankings.

The DataFall effect also has utility outside of the financial sector, performing its unique form of analysis on any large set of chronologically ordered data. While preferred embodiments of the present invention described herein assist in the analysis and purchase of financial products, other embodiments can be deployed in fields such as logistics, transportation, marketing, politics and pharmaceuticals.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings:

FIGS. 1A-7, taken together, are flowcharts of the processes for implementing preferred embodiments of the present invention.

FIGS. 8A-8C and 9A-9B show user interface display screens for implementing preferred embodiments of the present invention.

FIGS. 10A-33 illustrate the calculations that are performed on each dataset in accordance with one preferred embodiment of the present invention.

FIG. 34 is a frequency distribution table for a sample dataset in accordance with one preferred embodiment of the present invention.

FIG. 36 illustrates the final output screen of the DataFall effect shown in FIGS. 35A-35S.

DETAILED DESCRIPTION OF THE INVENTION

Certain terminology is used in the following description for convenience only and is not limiting. Additionally, the words "a" and "an", as used in the claims and in the corresponding portions of the specification, mean "at least one."

The preferred invention will be described in detail with reference to the drawings. The figures and examples below are not meant to limit the scope of the present invention to a single embodiment, but other embodiments are possible by way of interchange of some or all of the described or illustrated elements. Moreover, where some of the elements of the present invention can be partially or fully implemented using known components, only portions of such known components that are necessary for an understanding of the present invention will be described, and a detailed description of other portions of such known components will be omitted so as not to obscure the invention.

I. OVERVIEW

FIGS. 1A-7, taken together, are flowcharts of the processes for implementing preferred embodiments of the present invention. The flowcharts are also referred to herein as a Decision Tree Narrative. The flowcharts include steps 1-88 and are organized into three rows which represent the actions taken by the User (User), the user interface display (Display), and system processes (System).

Figure 1B:
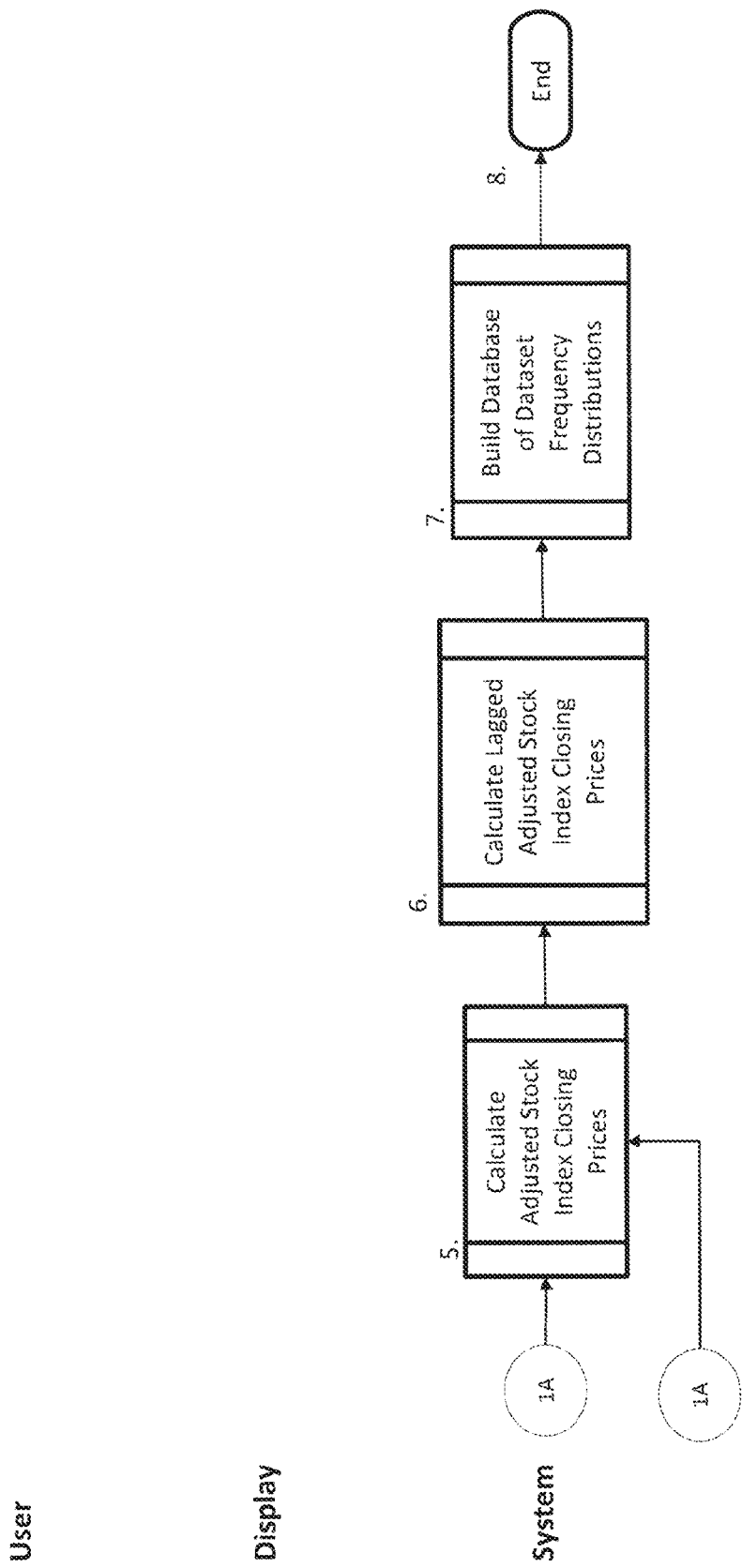

Daily Data Update (FIGS. 1A and 1B)

1. Start: Early every morning the system automatically begins the daily data update process.
2. Macro-Economic Indicator API: The system fetches specified macroeconomic data daily from the Federal Reserve of St. Louis's Economic Database (FRED) through the Application Program Interface.
3. Pro Rata Calculation: The system identifies the downloaded macroeconomic indicators as either daily, weekly, bi-weekly, monthly, quarterly or annual observations and transforms them into daily adjustment factors on a pro rata basis. The new daily adjustment factors are then added to the continuously updated Macroeconomic Database.

4. Stock Index API: System fetches the daily closing prices for specified stock indexes from publically available data sources. Save unadjusted daily closing price data on a Closing Price Database that is continuously updated with new price information.

5. Calculate Adjusted Stock Index Closing Prices: The system adjusts historical stock index closing prices by the appropriate daily macro-economic factors to create Realized Stock Index Prices. Save adjusted stock index closing price data on a temporary Realized Stock Index Database, which just lasts until the next set of datasets are calculated.

6. Calculate Lagged Adjusted Stock Index Closing Prices: The system then repeats the adjustment calculation from Step 5. on each stock index to account for a time lag between closing price and "proper" macroeconomic indicator of both a three-month and six-month delay. Save lagged, adjusted stock index closing price data on a Realized Stock Index Database, which lasts only until the next set of datasets are calculated.

7. Build Database of Dataset Frequency Distributions: Create a Frequency Distribution database table for each dataset (for each set of stock index, macroeconomic indicator & time lag variables) for the default time period (from Jan. 20, 1997 to the most recent closing price), which lasts only until the next set of datasets are calculated when a new most recent stock index closing price is calculated.

8. End: Databases are ready to perform Index Finder calculation and DataFall effect (as long as the default time period is selected).

Figure 2B:
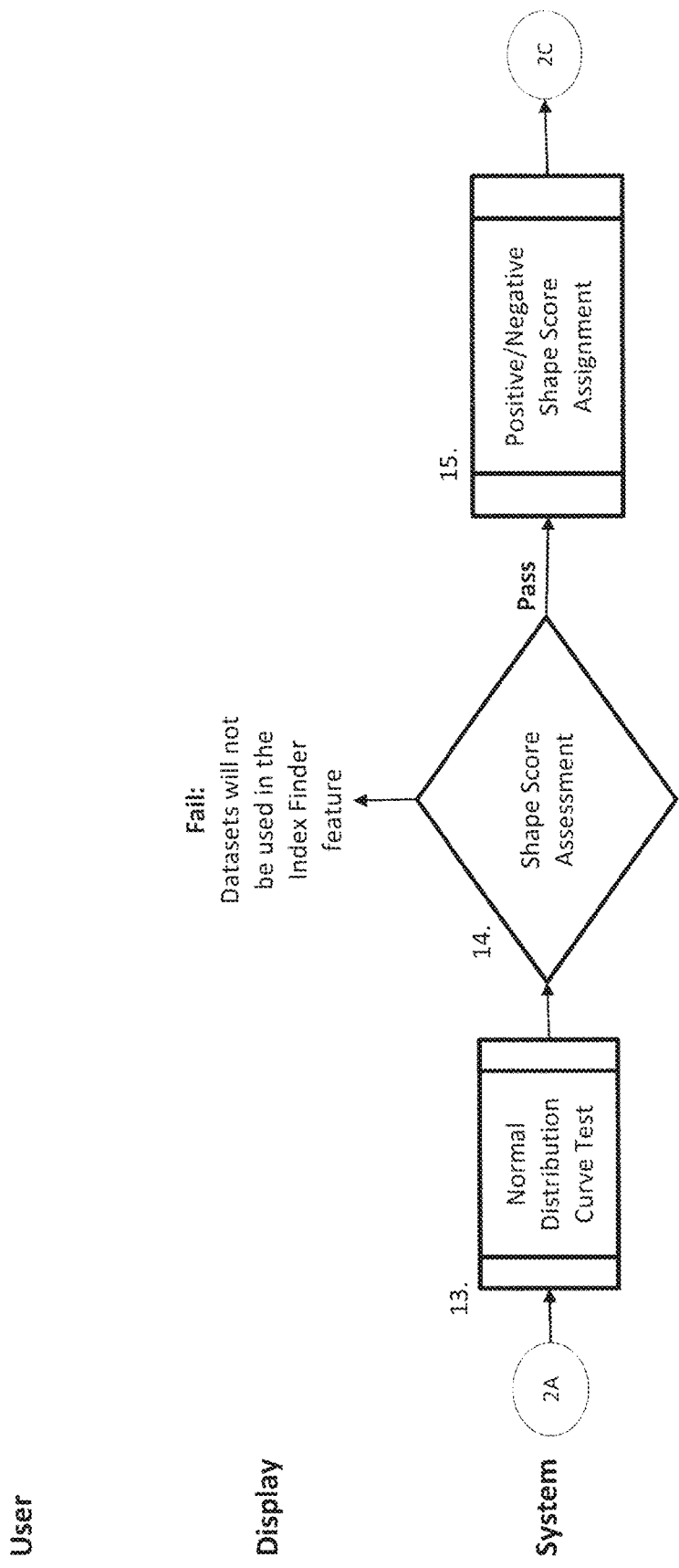
Figure 3B:
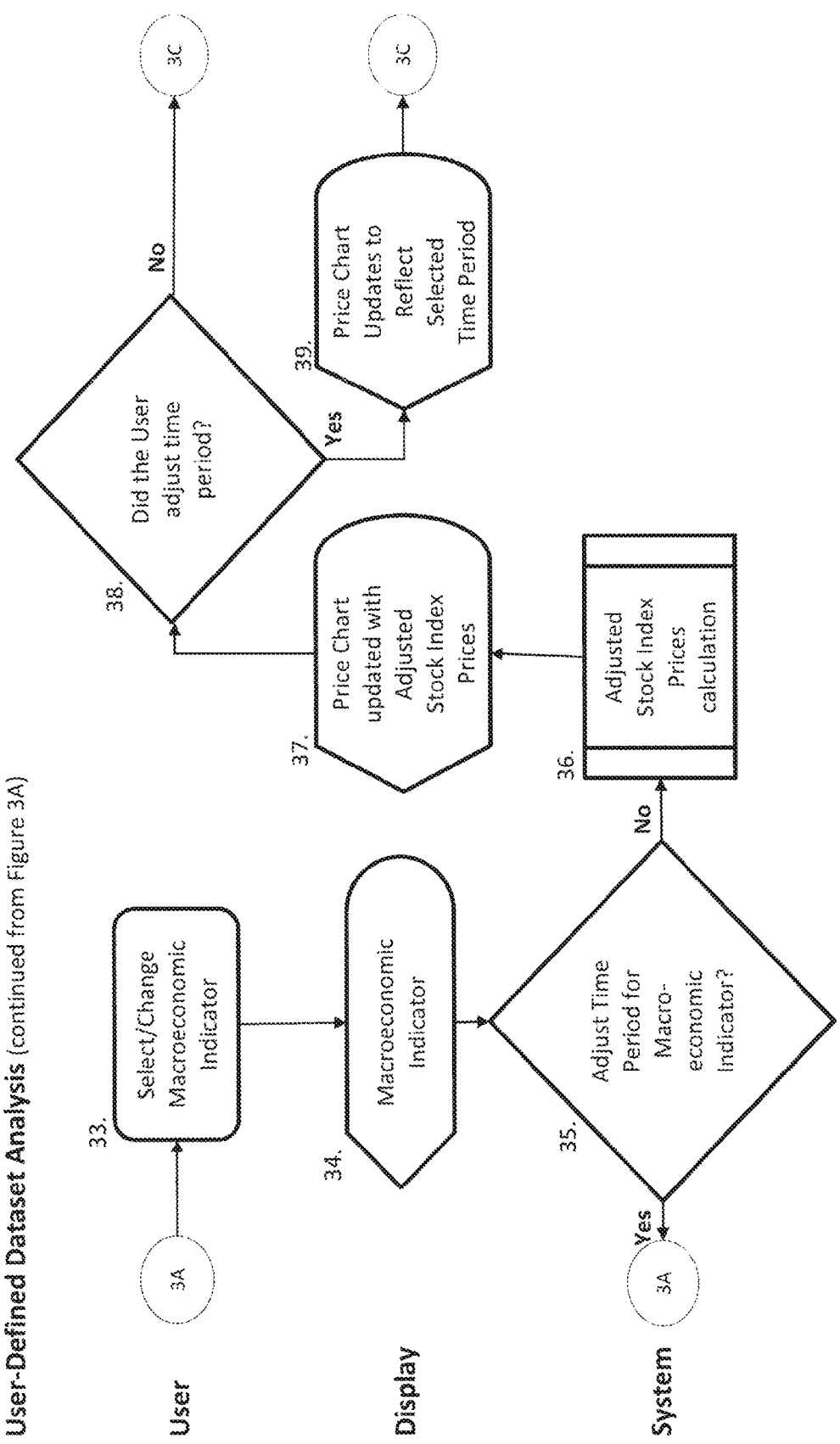
Figure 3D:
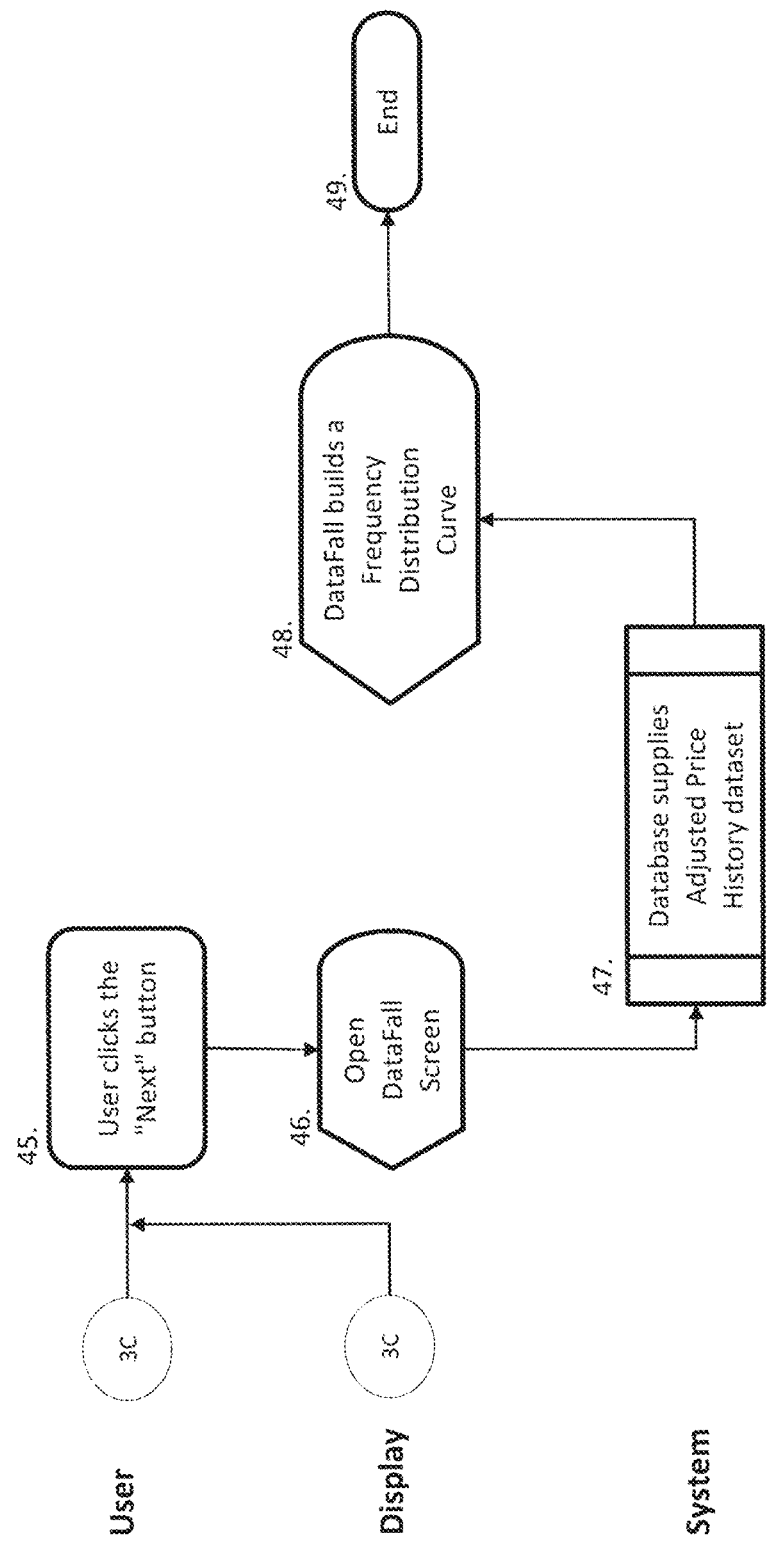

Index Finder (FIGS. 2A-2C)

9. Start: Data from prior section is calculated during the Daily Data Update and is available through the system to perform the calculations found in the Index Finder feature.

10. Single Dataset Analysis: each dataset (the Stock Index closing prices adjusted by macro-economic indicator and time lag) is first analyzed separately to check to see if it resembles a Bell Curve and if the most recent closing price is an outlier to its historical pattern.

11. Outlier Test: each dataset will be tested to see if the most recent closing price falls within a certain Administrator-defined percentage threshold which defines the highest and lowest data points in each dataset's historical price pattern.
    i. Fail: the dataset does not go on the Normal Distribution Curve Test, but skips to Step 24.
    ii. Pass: the dataset moves on to Step 12.

12. Positive/Negative Indicator: datasets with an outlier on the right-hand (Historically High) side of their frequency distribution curve will be assigned negative Shape Scores in Step 15. Outliers on the left-hand side (those that are on the Historically Low side of their price pattern), will be given positive Shape Scores in Step 15.

13. Normal Distribution Curve Test: each dataset that passes the Outlier Test will be submitted to a two-step test to see if the dataset's unique frequency distribution curve matches the idealized form of the Bell Curve, which is the basis for most standard forms of statistical analysis.
    a. Normal Probability Plot
    b. Test for Linearity In standard statistical models, the closer the dataset's frequency distribution curve comes to the ideal shape of the Bell Curve, the more credible that dataset is thought to be and the more predictive power it is believed to have.

14. Shape Score Assessment: the result of the Confidence Interval step of the Normal Distribution Curve Test will be given as a number between 0.00 & 1.00. The closer that number is to 0.00, the dataset will be revealed as randomly distributed. The closer that number is to 1.00, the dataset is said to be normally distributed. This number is the dataset's Shape Score.
    i. Fail: if the Shape Score is below an Administrator-defined threshold (e.g.: 0.5 or greater), the dataset is thought to be too randomly distributed to be credibly predictive, so it does not complete the Index Finder feature (skipping directly to Step 24).
    ii. Pass: the dataset moves on to Step 15. and becomes known as a "Qualified Dataset"

15. Positive/Negative Shape Score Assignment: the Shape Score of the dataset will become positive or negative based on where the Outlier sat on the Curve as determined in Step 12.

16. Stock Index Sorter: each Qualified Dataset are sorted according to which Stock Index it represents. Then each Stock Index's Qualified Dataset's Shape Score are added together to form a Combined Shape Score for each Stock Index. The system then ranks each Stock Index according to which Stock Index has the highest Combined Shape Score (in both the positive and negative directions).

17. Historically High/Historically Low: the highest negative Combined Shape Scores will be displayed under the "Historically High" listing in the Index Finder, which Users should interpret as a Sell Signal. The highest positive Combined Shape Score will be displayed as "Historically Low" in the Index Finder section of the website, which Users should interpret as a Buy Signal. The higher the Combined Shape Score (whether it is positive or negative), the stronger the signal to either Buy or Sell.

18. Frequency Distribution Table: all datasets, whether or not they passed the Outlier and/or Normal Distribution Curve Tests, are made available for the User to analyze in the User-Defined Dataset Analysis process.

19. User Opens Program: This is the first step that requires human intervention, Steps 1 to 18 in this process have been performed automatically by the system. This step opens the Selection Screen.

20. Selects a Stock Index from Index Finder: If the User chooses one of the Stock Indexes suggested to them by the Index Finder feature of the website, whether it is Historically High or Historically Low, move onto Step 21. If they do not chose a Stock Index through the Index Finder, move onto Step 24.

21. Dataset Selection Screen: the system displays a new screen, the Dataset Selection Screen, which presents to the User the datasets within the chosen Stock Index that have the highest Shape Score. Each dataset that is presented on this screen is clickable.

22. Selects Dataset to Analyze: if the User selects one of the suggested datasets to investigate further, they move on to step 30. If the User decides to close the Dataset Selection Screen without selecting a dataset, they will return to Step 20 (where they are able to choose either to select a new dataset or, later in the process, to create their own dataset).

23. Continue to Step 30: if the User selects a dataset from among those suggested on the Dataset Selection Screen, then the system fills in each of the Drop-Down boxes (Stock Index, Macro-Economic Indicator, and Time Lag) according the parameters of the selected suggested dataset, and the process moves ahead to Step 30.
24. End: if the User does not select a Stock from the Index Finder feature of the website, this phase of the program ends and all the Frequency Distribution Tables for the default time period (from Jan. 20, 1997 to the most recent market close) are made available to the User to analyze. These Frequency Distribution Tables only last until the next set of datasets is compiled when the next daily data update is performed.

User-Defined Dataset Analysis (FIGS. 3A-3D)

25. Start: if the User does not use the Index Finder feature of the website, they can explore any dataset that they want to investigate through choices presented to them on the Selection Screen.
26. Selects/Changes Stock Index: the User selects a (or changes a previously selected) Stock Index to analyze from a drop-down box that provides a list of Stock Indexes that the system tracks. The drop-down list includes the names of the most popular Stock Indexes, plus an option for "More . . . ". If the User selects one of the named Stock Indexes on the drop-down list, then slip Step 27 and move directly onto Step 28.
27. Stock Index Selection Screen: if the User selects the "More . . . " option on the drop-down list, it opens a new screen, the Stock Index Selection Screen, that provides information about each of the Stock Indexes that the system tracks (including those already listed by name on the drop-down list), including: name, description, style (broad index, industry sector, capitalization size, or stock style), and price chart. Once the User clicks on the "Select" button, the Stock Index Selection Screen closes and they return to the Selection Screen with the name of the selected Stock Index in the drop-down box.
28. Index Inception Date Look-Up: the system automatically looks up the inception date (the date that the Stock Index was first tracked) for the Stock Index that was selected by the User. The oldest date available on the Closing Price Database is Aug. 15, 1971 (the day that the U.S. left the Gold Standard and the value of the U.S. Dollar began to be set mostly by market/economic conditions rather than government policy). If the inception date of the Stock Index was sometime after Aug. 15, 1971, then the oldest recorded closing price will become the inception date for that Stock Index. The Inception Date will be that Stock Index's oldest possible Start Date for determining the Time Period to be analyzed.
29. Historical Closing Price Data Look-Up: the system automatically looks-up the price history for the selected Stock Index from the earliest date to the most recent closing price.
30. Price Chart displays actual Closing Prices: the system displays the actual, unadjusted daily closing prices of the selected Stock Index from the earliest/oldest date available to the most recent closing price. This data is presented as a Red Line on the Price Chart. The y-axis of the Price Chart is the price values and the x-axis are the dates for each observation. The x-axis and y-axis are scaled so that the chart only displays values that are represented in the data. The Time Slide (under the Price Chart) reflects the time period being displayed. The Time Slide runs from the Stock Index's Inception Date (with a maximum date of Aug. 15, 1971) to the most recent market close. The Start Date of the Time Period defaults to Jan. 20, 1971 (when the NASDAQ implemented new Small Order Execution System, "SOES", rules, which along with other contemporaneous rules changes, fundamentally altered the nature of the stock market), but the Start Date can be changed by the User. The End Date cannot be changed by the User, it is always the most recent market close.
31. Did the User adjust the time period?: the Index Finder feature only looks at data for closing prices between Jan. 20, 1997 and the most recent market close. However, in the User-Defined Dataset Analysis section, the User can change the time period being examined by changing the Start Date on the Time Slide. The User can select a Start Date from Aug. 15, 1971, but it defaults to Jan. 20, 1997. The End Date will always be the most recent market close. If the User changed the time period, move on to Step 32. If they did not, skip to Step 33.
32. Update Price Chart: a change in the Start Date will be reflected in a new x-axis scale and Time Slide, as well as a change in the Red Line to reflect the new time period.
33. Select/Change Macroeconomic Indicator: the User next selects a (or changes a previously selected) Macroeconomic Indicator upon which to base the analysis from a drop-down box that provides a list of Macroeconomic Indicators that the system tracks. The drop-down box is populated with a list of ten most often used Macroeconomic Indicators, along with an option for "More . . . ". If the User selects one of the Macroeconomic Indicators named on the drop-down list, then slip Step 34 and move directly onto Step 35.
34. Macroeconomic Indicator Selection Screen: if the User selects the "More . . . " option on the drop-down list, it opens a new screen that provides information about each of the Macroeconomic Indicators that the system tracks (including those already listed by name on the drop-down list), comprising: name, category, description, and a historical chart. The Macroeconomic Indicator Screen also allows the User to use Inflation-Adjusted (CPI or PPI) and/or Per Capita numbers for each Macroeconomic Indicator (if appropriate). Once the User clicks on the "Select" button, the Macroeconomic Indicator Selection Screen closes and they return to the Selection Screen with the name of the selected Macroeconomic Indicator populating the drop-down box.
35. Adjust Time Period for Macroeconomic Indicator?: the system automatically checks to ensure that the inception date of the selected Macroeconomic Indicator is older than or equal to the date range selected by the User for the Stock Index. If "yes", then return to Step 32. If "no", move on to Step 36.
36. Adjusted Stock Index Prices Calculation: the system automatically calculates the Adjusted Stock Index Closing Prices (assuming a Time Lag of "None"). For each daily closing price, the system finds the change (increase or decrease) in the concurrent Macroeconomic Indicator on the Macroeconomic Database by dividing that day's level by the current level to produce an adjustment factor. The closing price for that day is then multiplied by that day's adjustment factor, which brings the old price "up to" today's price level. This process is repeated for each daily closing price in the selected time period.
37. Price Chart Updated with Adjusted Stock Index Prices: the system displays the Adjusted Closing Prices as a Yellow Line on the same Price Chart along with the Red Line that reflects the Actual Closing Prices. The x-axis values, its scale, and the Time Slide do not change, but the y-values and its scale will change as necessary to accommodate the new range of Adjusted Closing Price data.
38. Did the User adjust the time period?: the User may choose to change the selected time period being examined. If they do change the time period, move to Step 39. If they do not change the selected time period, it moves onto Step 40.
39. Price Chart Updates to Reflect Selected Time Period: the system updates the Price Chart to reflect the revised Time Period. The Yellow Line, Red Line, x-axis, y-axis, and Time Slide are all adjusted based on the new Time Period.
40. Selects/Changes Time Lag: lastly, the User selects a Time Lag to adjust the analysis by; their choices are "None", "Three Months", or "Six Months". The purpose of this variable is to allow Users to test the concept that the stock market is a "forward-looking" pricing mechanism by comparing a historical price not to that same day's macroeconomic measure, but rather to a measure from three or six months into the future (depending on the length of the time lag).
41. Recalculate Adjusted Stock Index Prices for Selected Time Lag: if the User selects "None", then no recalculation needs to take place. If the User chooses "Three Months", then the Closing Stock Index Price for a particular day will be adjusted by the macroeconomic daily factor for the day three months in the future. If the User selects "Six Months", then the Closing Stock Index Price for a particular day will be adjusted by the macroeconomic daily factor for the day six months in the future.
42. Update Price Chart for Time Lag: the system revises the display of the Price Chart to account for the change in the Adjusted Closing Stock Index prices, updating the x-axis values and scale (if necessary).
43. Did the User adjust the time period?: the User may choose to change the selected time period being examined. If they do change the time period, move to Step 44. If they do not change the selected time period, it moves onto Step 45.
44. Price Chart Updates to Reflect Selected Time Period: the system updates the Price Chart to reflect the revised Time Period. The Yellow Line, Red Line, x-axis, y-axis, and Time Slide are all adjusted based on the new Time Period.
45. User Clicks the "Next" Button: once the User is satisfied with their choice of Stock Index, Macroeconomic Indicator, Time Lag, and Time Period, the User can click on the "Next" button to move onto the DataFall Screen. If they later want to change the Stock Index, Macroeconomic Indicator, or Time Lag for the dataset, the User will need to return to the selection Screen (Step 25). The User will be able to adjust the Time Period (if desired) from the DataFall Screen.
46. Open the DataFall Screen: the Selection Screen does not close, it remains open "under" the new DataFall Screen so that the User can click back on it to return to the Selection Screen. The DataFall Screen is prepopulated with the variables for the dataset selected on the Selection Screen. The only variable that the User is able to alter on the DataFall Screen is the Time Period, which they can change through the Time Slide feature.
47. Database Supplies Adjusted Price History: the DataFall effect is populated by the data calculated in the above steps that created the final dataset. The database presents the dataset for the DataFall Screen in chronological order.
48. DataFall builds a Frequency Distribution Curve: this process is explained in greater detail in Steps 50-59. Once the Curve is created, the User can alter the Time Period through the Time Slide or return to the Selection Screen to change any of the other variables to create a new dataset to be examined.
49. End: the DataFall Effect allows the User to see the development of the Frequency Distribution Curve for the given dataset as it either develops into a normal distribution curve (a Bell Curve) or doesn't. If the frequency distribution does not look like a Bell Curve, then the dataset is not normally distributed and it can be assumed that there is no credible statistical &/or predictive relationship between the selected variables. If the frequency distribution curve of the dataset does resemble a Bell Curve, then the variables are correlated and, likely, predictive (as long as there are no substantial changes to the structure of the marketplace; as happened, for instance, on Jan. 20, 1997 when NASDAQ changed the SOES rules).

Figure 4A:
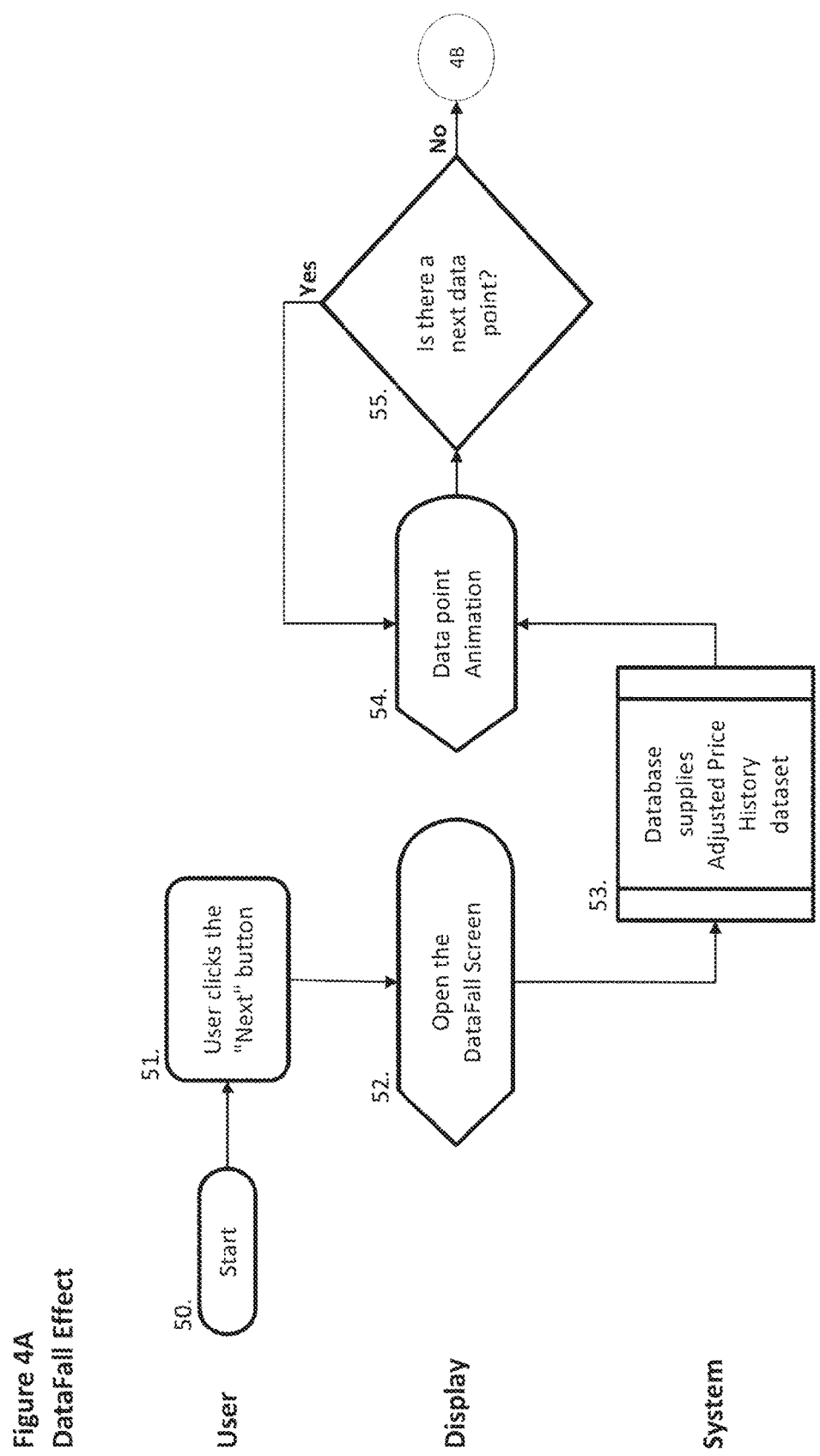

DataFall Effect (FIGS. 4A-4B)

50. Start: the DataFall effect is a new method of visualizing large amounts of chronologically ordered data. In this case, the data being analyzed/visualized is the adjusted historical prices of stock indexes, but this method of looking at Big Data is applicable in many settings and industries such as marketing (e.g., strength of brand data), logistics (e.g., package delivery time), polling (e.g., approval ratings of politicians), pharmaceutical testing (e.g., pharmaceutical trial data) and transportation (e.g., common carrier arrival/departure time data). Thus, the scope of this preferred embodiment includes using the DataFall effect to visualize chronologically ordered data in fields other than stock index research.
51. User Clicks the "Next" Button: as in Step 45, once the User is satisfied with their choice of Stock Index, Macroeconomic Indicator, Time Lag, and Time Period, the User can click on the "Next" button to move onto the DataFall Screen.
52. Open the DataFall Screen: as per Step 46, the Selection Screen does not close, it remains open "behind" the new DataFall Screen so that the User can click back on it to return to the Selection Screen. The DataFall Screen is pre-set to match the variables for the dataset selected on the Selection Screen. The only variable that the User is able to alter on the DataFall Screen is the Time Period, which can be adjusted through the Time Slide feature.
53. Database Supplies Adjusted Price History: as in Step 47, the DataFall effect is populated by the data calculated in the above steps that created the final dataset. The database presents the dataset for the DataFall Screen in chronological order.
54. Data point Animation: the oldest data point in the dataset appears on top of chart at its x-axis value and drops vertically towards the bottom of the display. If there already is a data point at the bottom of the chart at that x-axis value, the newer data point "lands" on the oldest one, accumulating into a column (the frequency distribution histogram). Each data point is like a snowflake falling from the sky to land on the ground, accumulating into a "snow drift" at the bottom of the display to form the frequency distribution curve for the dataset being analyzed. As the Curve is being built, the directionality and momentum of the stock market can be seen by the User in the movement of the data points as they fall to the bottom of the screen.

55. Is there a next data point?: as each data point appears, becomes animated, and "falls" towards the bottom of the chart, the process cycles through this step. If there is another data point in the set, then return to Step 54, and the cycle continues to "build" the frequency distribution curve. If this is the last data point in the set (if the data point represents the most recent closing price), move on to Step 56. The User is able to adjust the speed of the DataFall effect by way of the DataFall Speed Slide, even to the point of "shutting off" the DataFall effect so that the frequency distribution histogram for the dataset simply appears fully completed instead of being built up as the User watches.

56. Last data point in the dataset is displayed in a contrasting color: if the Time Indicator check-off box is unchecked, then all the earlier data points are displayed in yellow, while the most recent closing price is displayed in red. If the Time Indicator check-off box is selected/checked, then the earlier data points are colored according to their time quintile (discussed in Step 64), but the most recent closing price is displayed in red. The contrasting color allows the User see instantly where the most recent price lands onto and fits into the dataset's frequency distribution curve.

57. Calculates the dataset's Mean and 200-Day Moving Average: the system automatically calculates the displayed dataset's mean (the x-axis value which marks the spot where half of the observations are to its left and half are to its right) and its 200-day trend (the line which smooths out the volatile variations in the actual frequency distribution histogram of the dataset).

58. Display Mean Line and Curve Line: display the dataset's mean with a red Mean Line and use a black Curve Line to represent the dataset's 200-day moving average.

59. Did the User adjust the time period?: the User may choose to change the selected time period being examined. If they do change the time period, move to Step 60. If they do not change the selected time period, it moves onto Step 61.

60. Repeat the DataFall and adjust Time Slide: the data points do not need to be recalculated for a new time period, the system must only determine the new range for the dataset based on the selected time period. The system then repeats Steps 53 to 58 in order to present the User with an updated DataFall presentation. The Time Slide below the DataFall Chart is updated to reflect the revised time period.

61. End: the DataFall effect not only presents the dataset in terms of whether or not its frequency distribution curve is normally or randomly distributed (or somewhere in between), it also allows the User to instantly and intuitively see if the most recent closing price is an outlier. If the most recent closing price is on the right-hand side of a dataset's frequency distribution curve which is also normally distributed (looks like a Bell Curve), then it is on the high side of its credible and predictive historical price pattern. If the most recent closing price is on the left-hand side of a dataset's Bell Curve shaped frequency distribution curve, then it is on the low side of its credible and predictive historical price pattern.

Regression Towards the Mean is a widely accepted statistical "law" that holds that if the current observation is an outlier, then future observations are more likely to move closer to the center of the Curve than further out towards either tail. Therefore, when the most recent close is on the left-hand tail of a strongly shaped Curve, it is signal to sell or short that index; and when it's on the right-hand side of a well-formed Bell Curve, then it is a signal to buy that index. The more datasets for an index that repeat the same outlier/Bell Curve pattern, the stronger the Buy or Sell signal for that particular Stock Index.

Time Indicator Check Box (FIG. 5)

62. Start: as weather radar uses color to indicate the intensity of precipitation, the system uses color to indicate the chronology of the data points. The selected time period is divided into quintiles, with each quintile comprising of 20% of the observations (the first quintile being the oldest 20% of observations, the next 20% being the next oldest, and so on). When/if the User changes the time period being examined, the system will recalculate the time quintiles.

63. If the User selects the "Time Indicator" check: this process does not begin until the User chooses to check the "Time Indicator" check-off box. Otherwise, skip this entire process.

64. Multi-color DataFall: each time period quintile is assigned a color (the pattern of which is repeated on the Time Slide, allowing the Time Slide to also act as an interpretive guide as to the meaning of the colors). Then each data point in the DataFall animation is given the proper color for their quintile. The data points retain their color as they form the frequency distribution histogram for the dataset, allowing the User to see the time-bound patterns within the overall pattern of the price history. If the colors are evenly dispersed around the Curve, then there is no pattern to be discerned. If the colors "clump" together, then Users can take this fact into consideration.

65. User unselects "Time Indicator": if the User un-clicks the "Time Indicator" check-off box, then the data points and Time Slide revert to their normal two-color palette.

66. Returns to two-color DataFall: the data points and Time Slide revert to their usual color pattern with all the data points in the same color (yellow) except for the data point representing the most recent closing price, which is displayed in a contrasting color (red).

67. End: the purpose of the multi-colored DataFall is to allow the Users to see if/where certain time periods may have developed their own short-lived price patterns. With this knowledge, the User can change the Time Period in order to eliminate that sub-pattern from their analysis. For instance, if all the data points on one tail of the Curve are in one color (and, therefore, from a single time quintile), changing the Start Date will allow the User to remove those outliers from the dataset being examined.

Figure 6A:
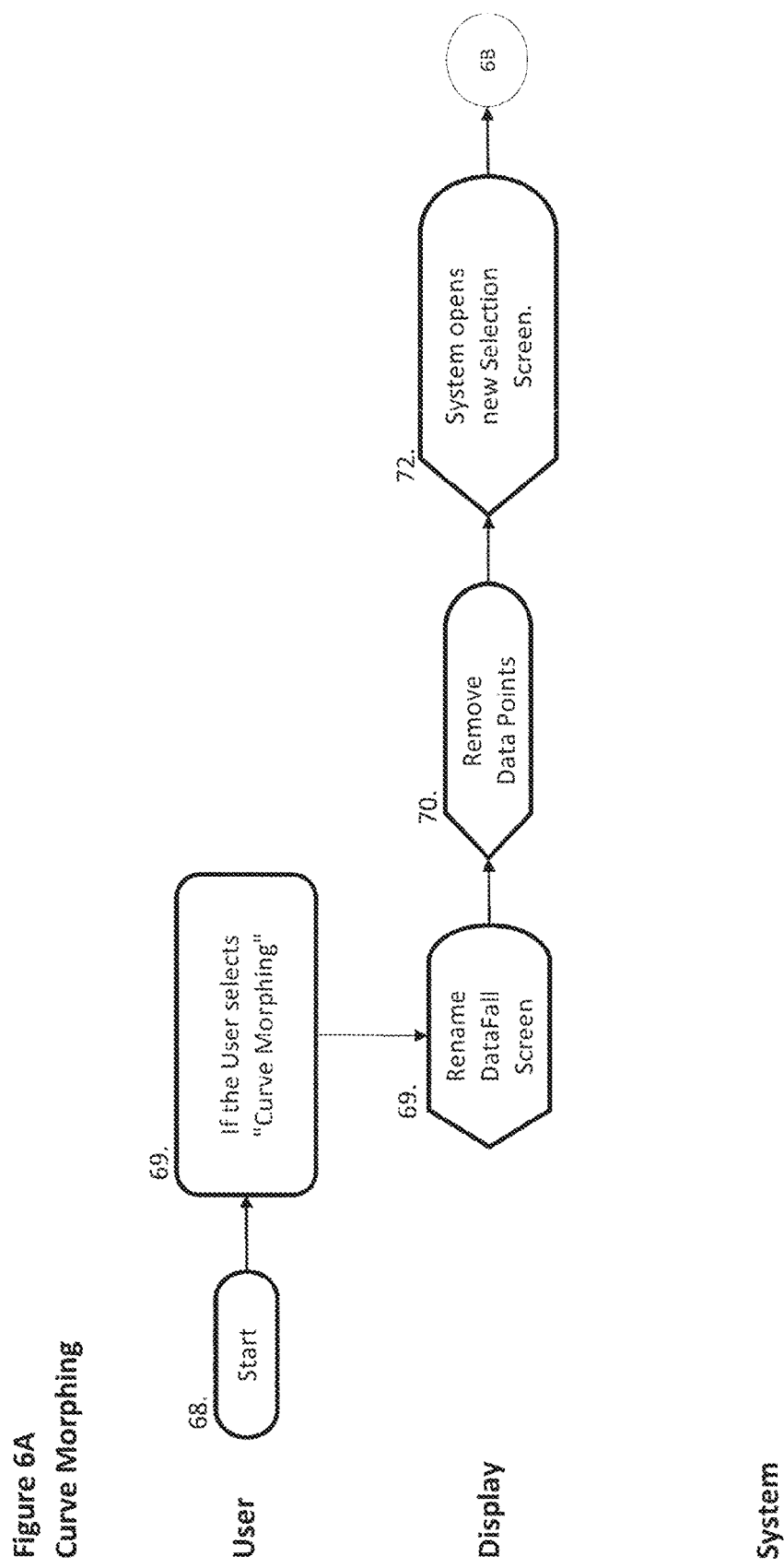
Figure 6B:
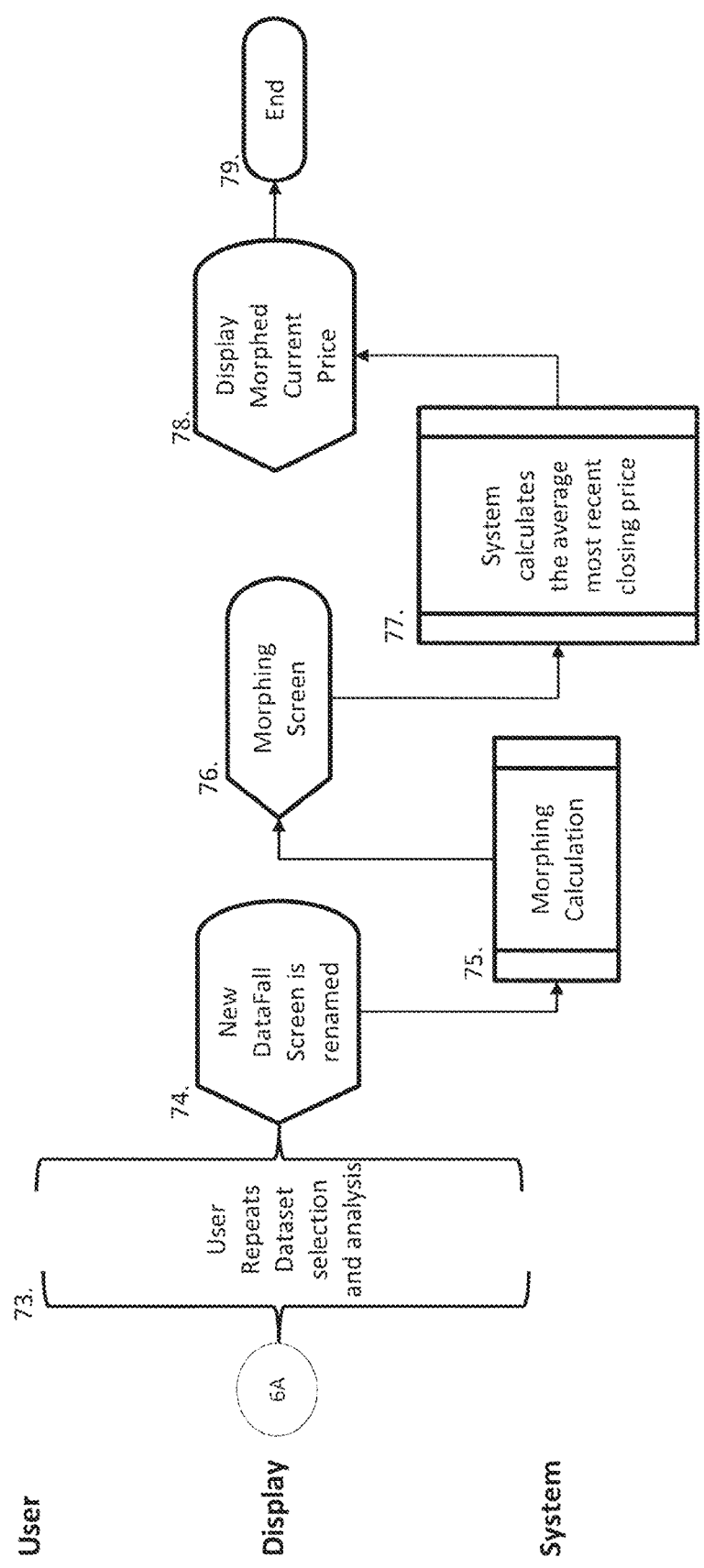

Curve Morphing (FIGS. 6A-6B)

68. Start: DataFall analysis is designed to be as simple as possible, with the main driver of variation in the dataset being the Macroeconomic Indicator because we want to focus in on one causal factor at a time. Curve Morphing allows the User to examine two Macroeconomic Indicators, thereby creating a simplified version of multivariate analysis. The inspiration for the visual effect is based upon the practice of "photo morphing", where the images of two distinct faces are merged together to form a third face that is "half-way inbetween" the original two faces.

69. If the User selects "Curve Morphing": this process does not begin until the User chooses to check the "Time Indicator" check-off box. Otherwise, skip this entire process.

70. Rename DataFall Screen: the DataFall Screen that is currently opened becomes Screen One.

71. Remove Data Points: the Frequency Distribution histogram (all the data points for the dataset) disappear from Screen One, leaving only the Curve Line, the Mean Line, and the contrasting Dot representing the most recent closing price.

72. New Selection Screen Opens: the system automatically opens a new Selection Screen to allow the User to select a new dataset to analyze. The only limitation is that the User must select the same Stock Index was used in Screen One.

73. User Repeats Dataset Selection and Analysis: the User follows Steps 20 through 61, with the proviso that they cannot use a different Stock Index as the basis for their analysis, nor can they change the Time Period. The User completes the DataFall analysis process as normal, with the same Stock Index and Time Period, but different Macroeconomic Indicator and/or Time Lag.

74. New DataFall Screen Renamed: the new DataFall Screen is renamed Screen Two. As in Step 78, the histogram disappears, leaving only the Curve Line, the Mean Line, and the contrasting Dot representing the most recent closing price.

75. Morphing Calculation: the System aligns the Mean Lines of each dataset, then for every x-axis value to the left and right of the Mean, the system calculates the point that is midway between the y-axis value for Screen One and Screen Two at that x-axis value, creating a new Curve Line that is the average of the original two.

76. Morphing Screen: in a new Screen, the Morphing Screen, the Curve Lines from Screen One & Screen Two are animated so that they can be seen moving towards each other and then combining together into the third Curve Line, which is the average of the first two Curve Lines.

77. System calculates the average Most Recent Closing Price: the system "counts" the number of x-axis values that the Most Recent Closing Price from Screen One lies away from its dataset's mean, then it does the same for Screen Two. The system then calculate the average number of x-axis values that the two Screen's Most Recent Closing Price lies away from the Mean, this is now the Morphed Current Price for the combined Curves.

78. Display Morphed Current Price: the Curve Line on the Morphing Screen is updated to display the Morphed Current Price as a red dot on the Line.

79. End: when the User closes the Morphing Screen, Screen Two closes as well.

Figure 7:
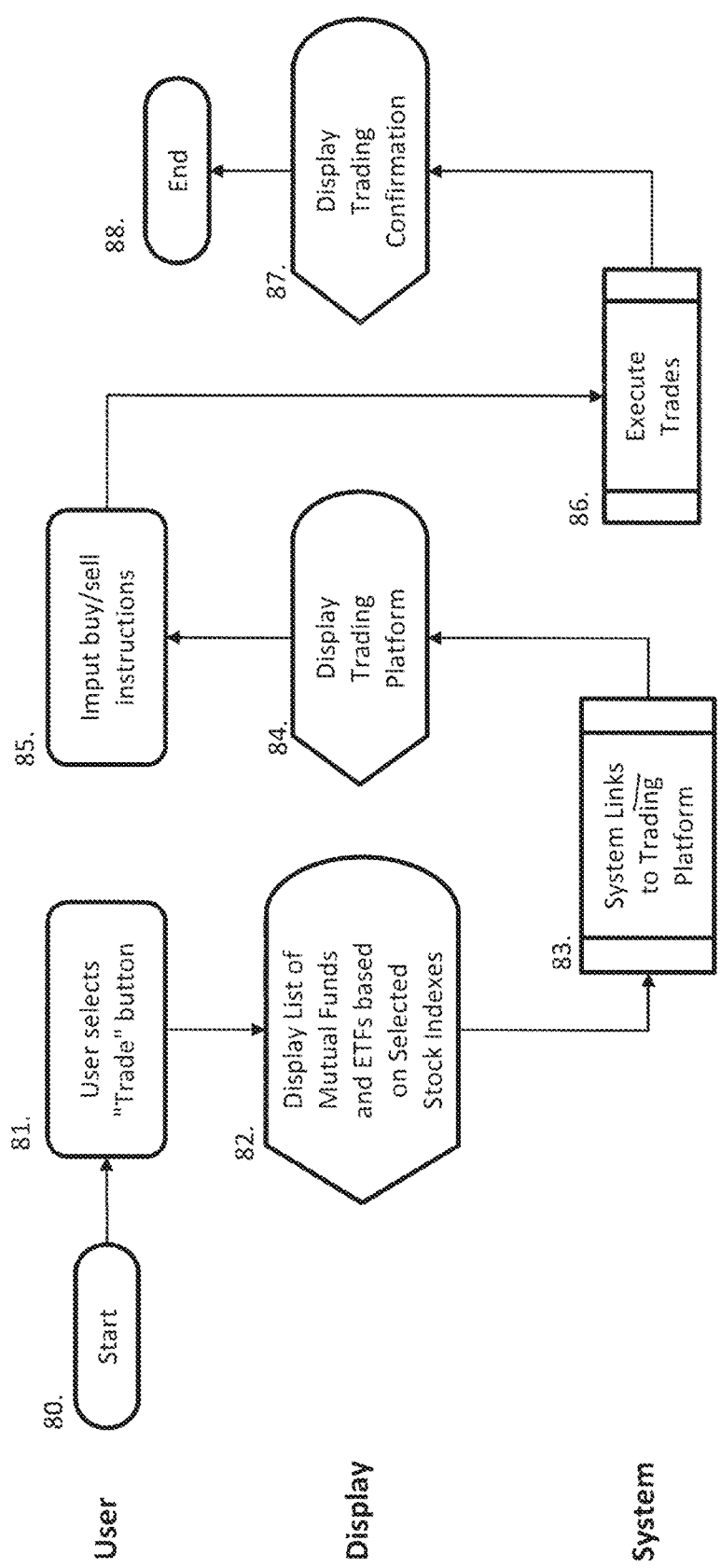
Figure 8A:
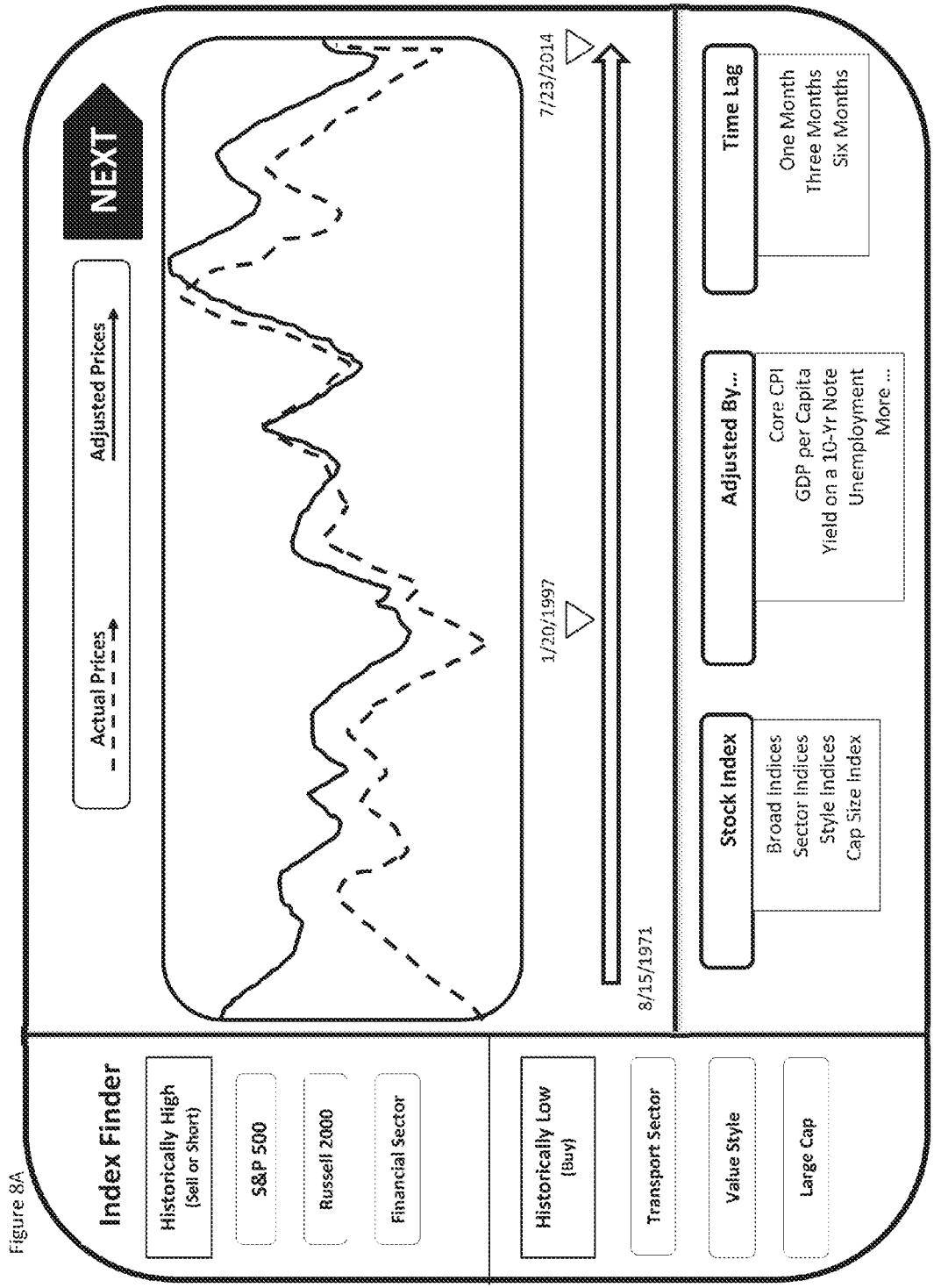
Figure 8B:
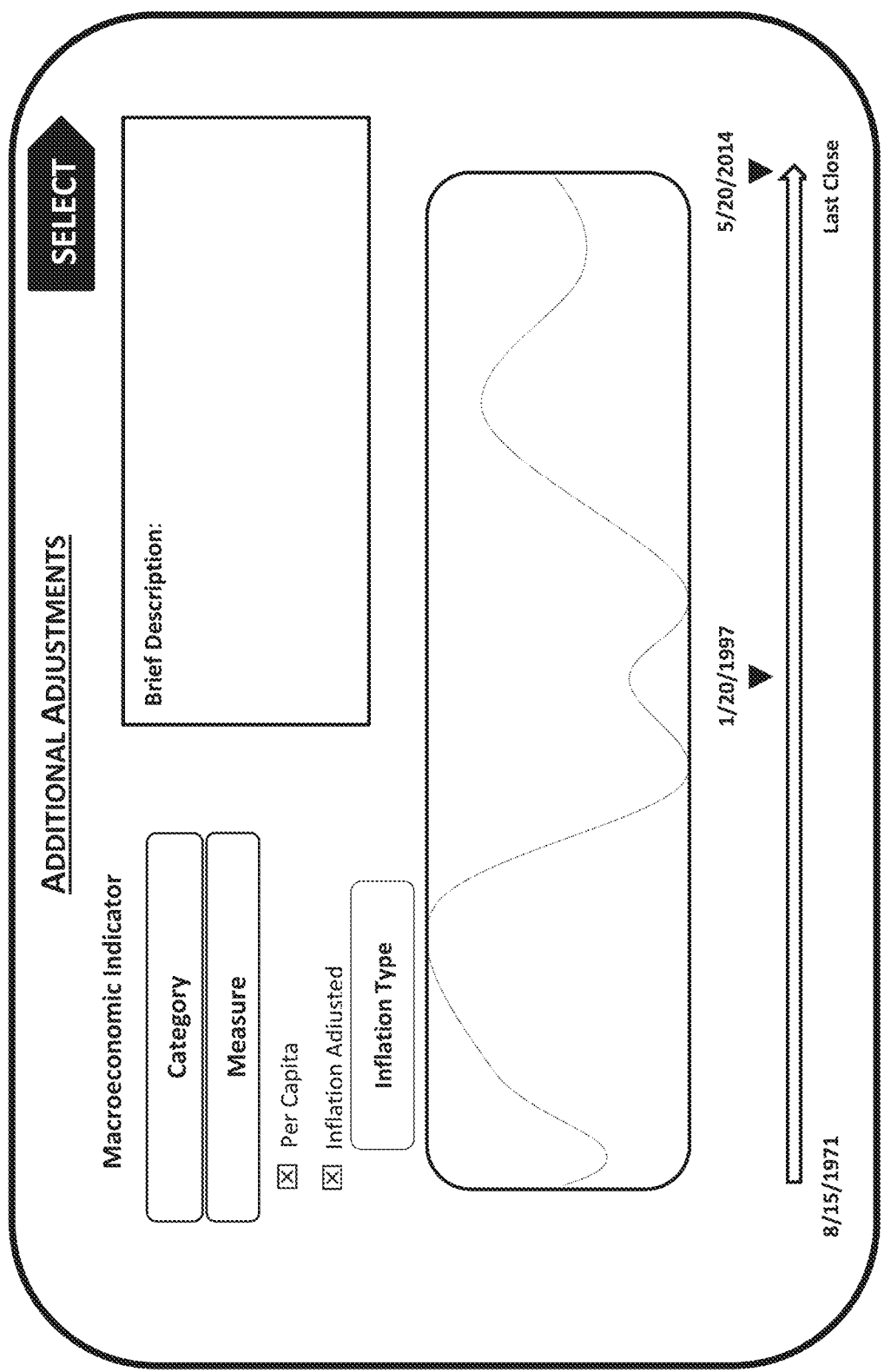
Figure 8C:
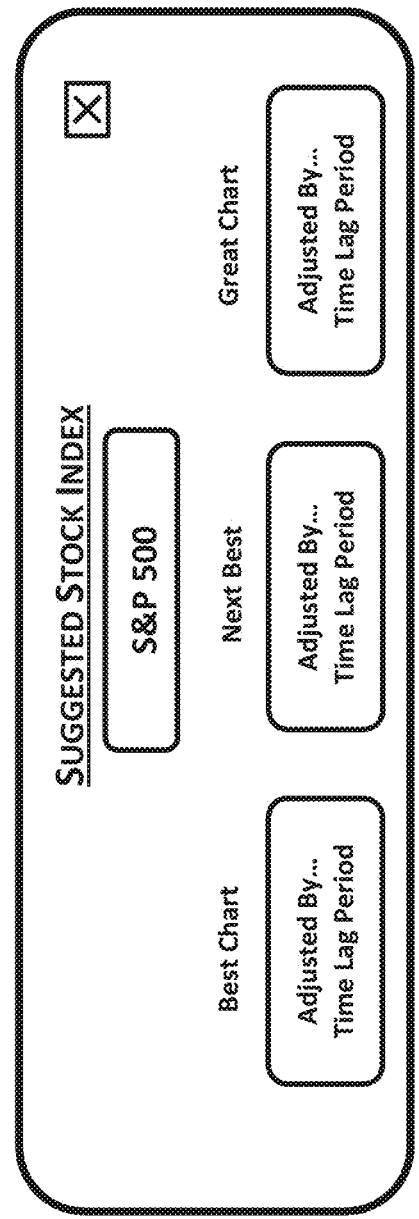
Figure 9A:
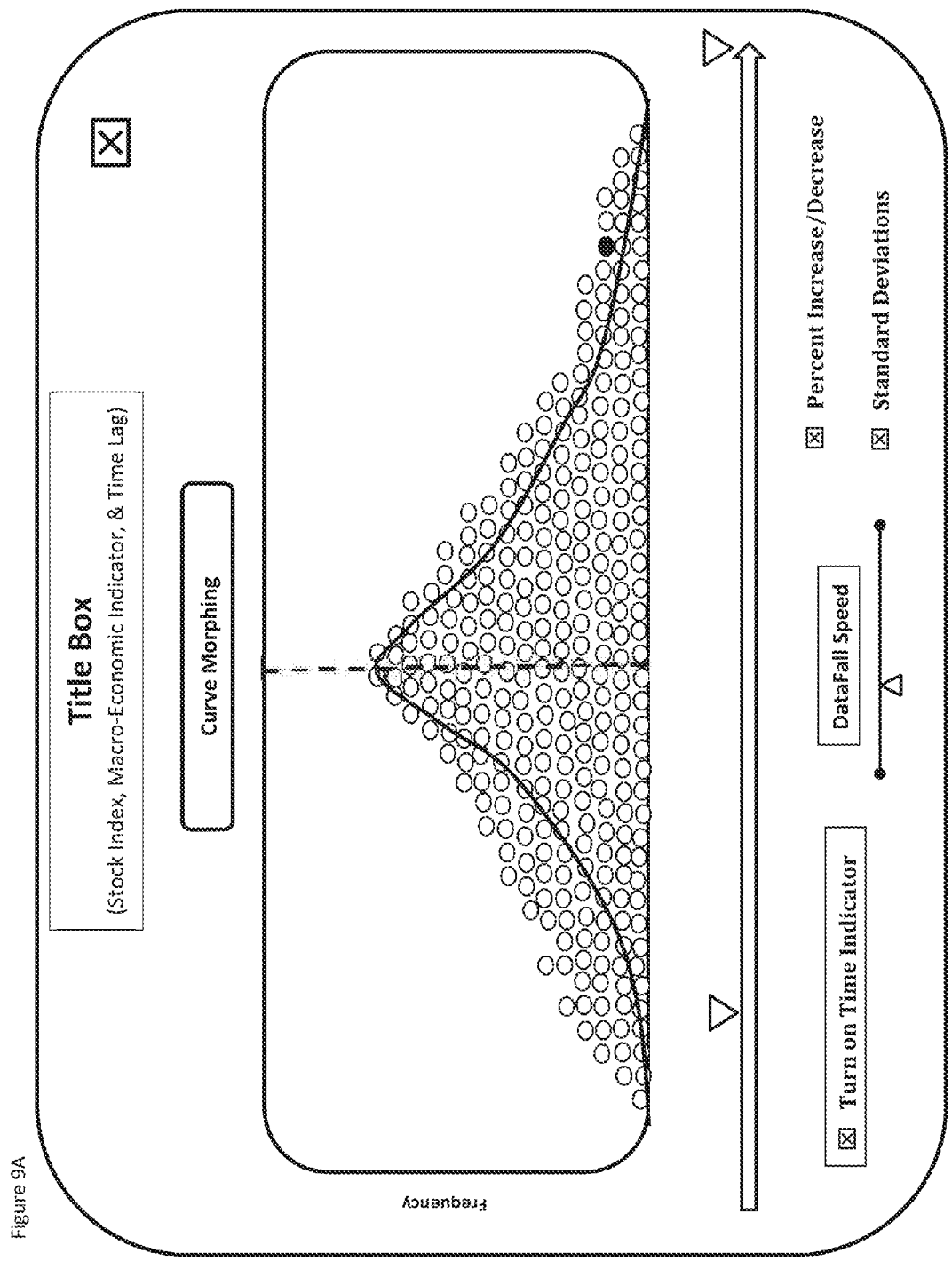
Figure 16:
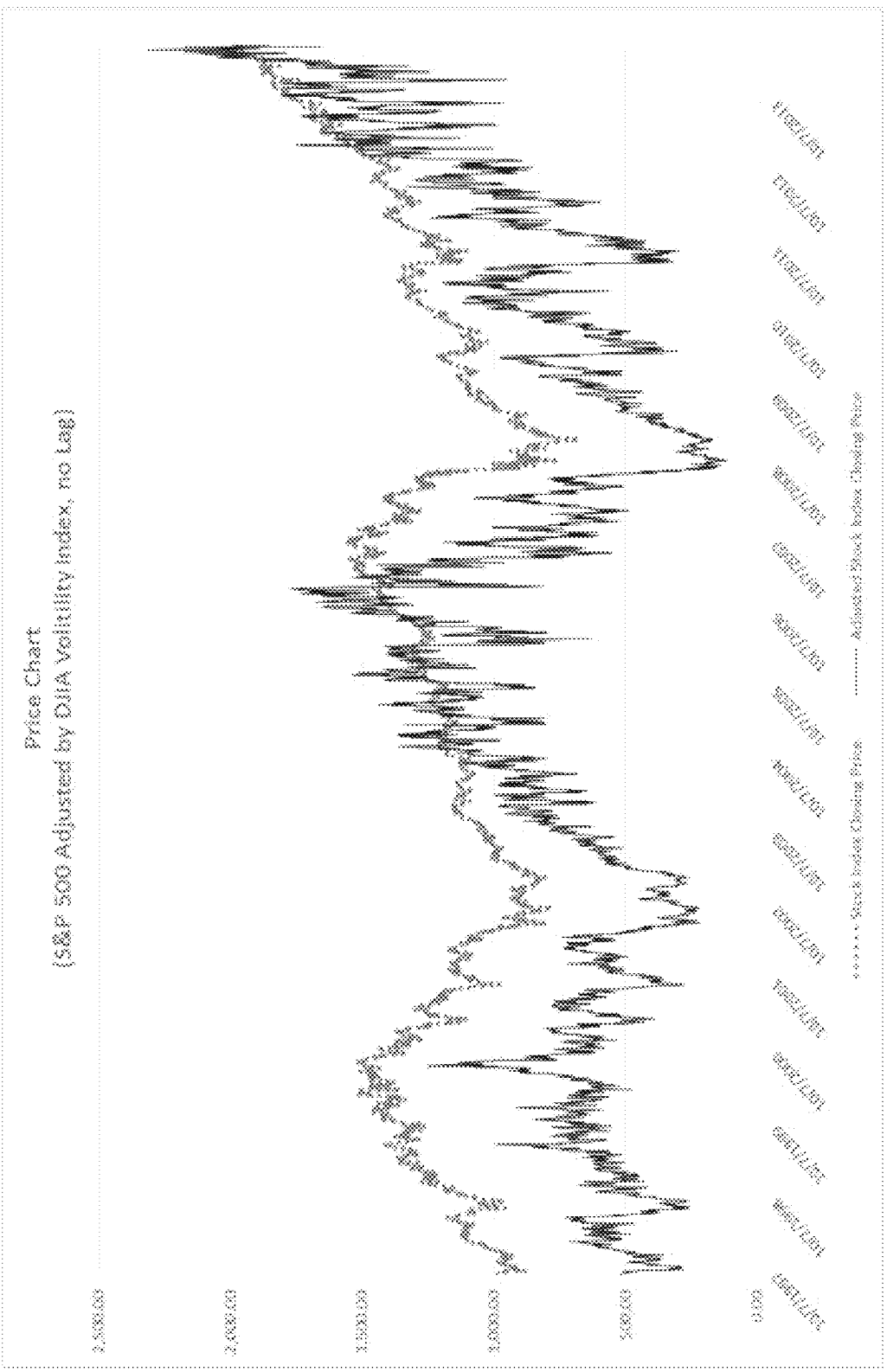
Figure 21:
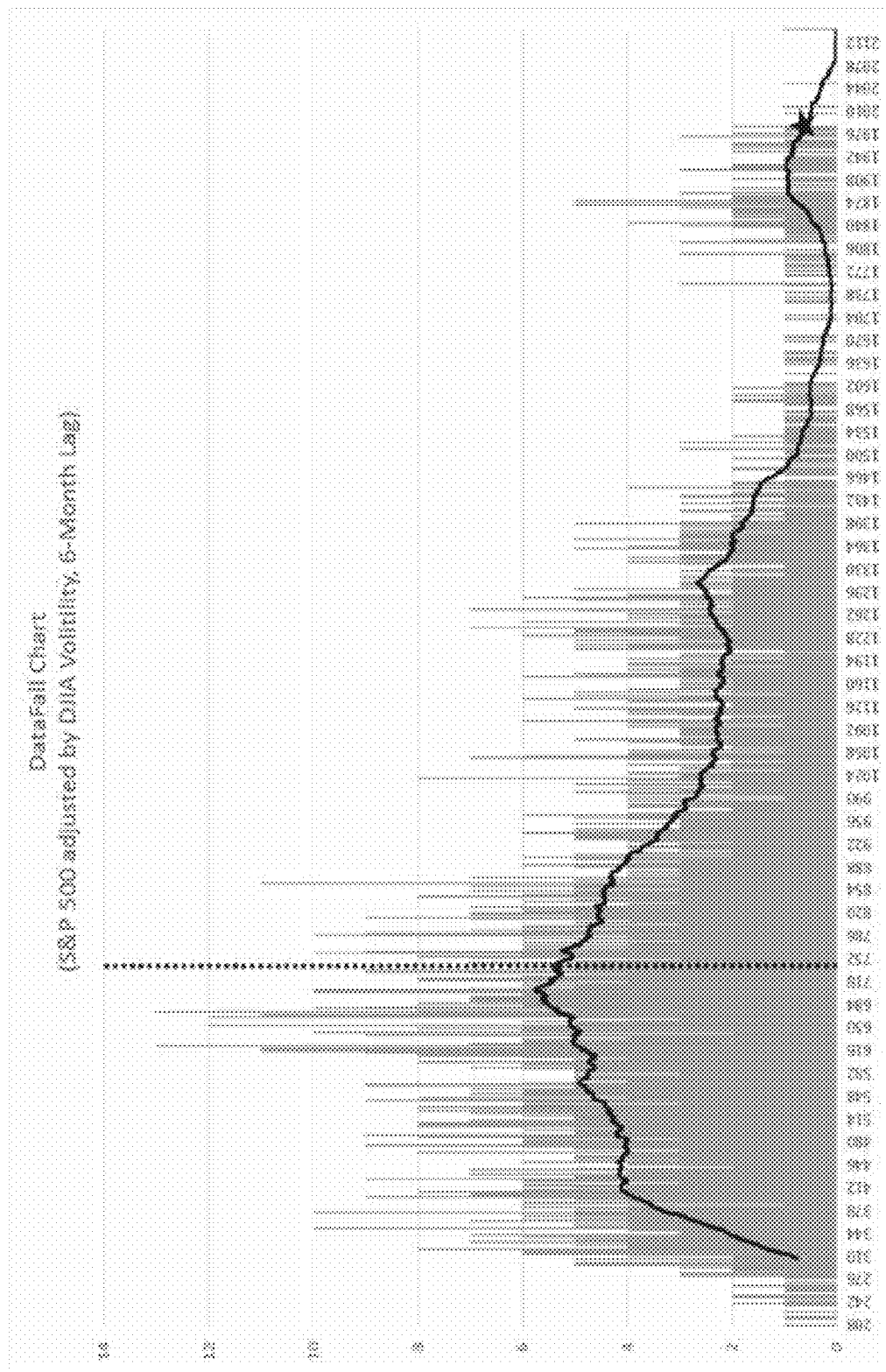
Figure 28:
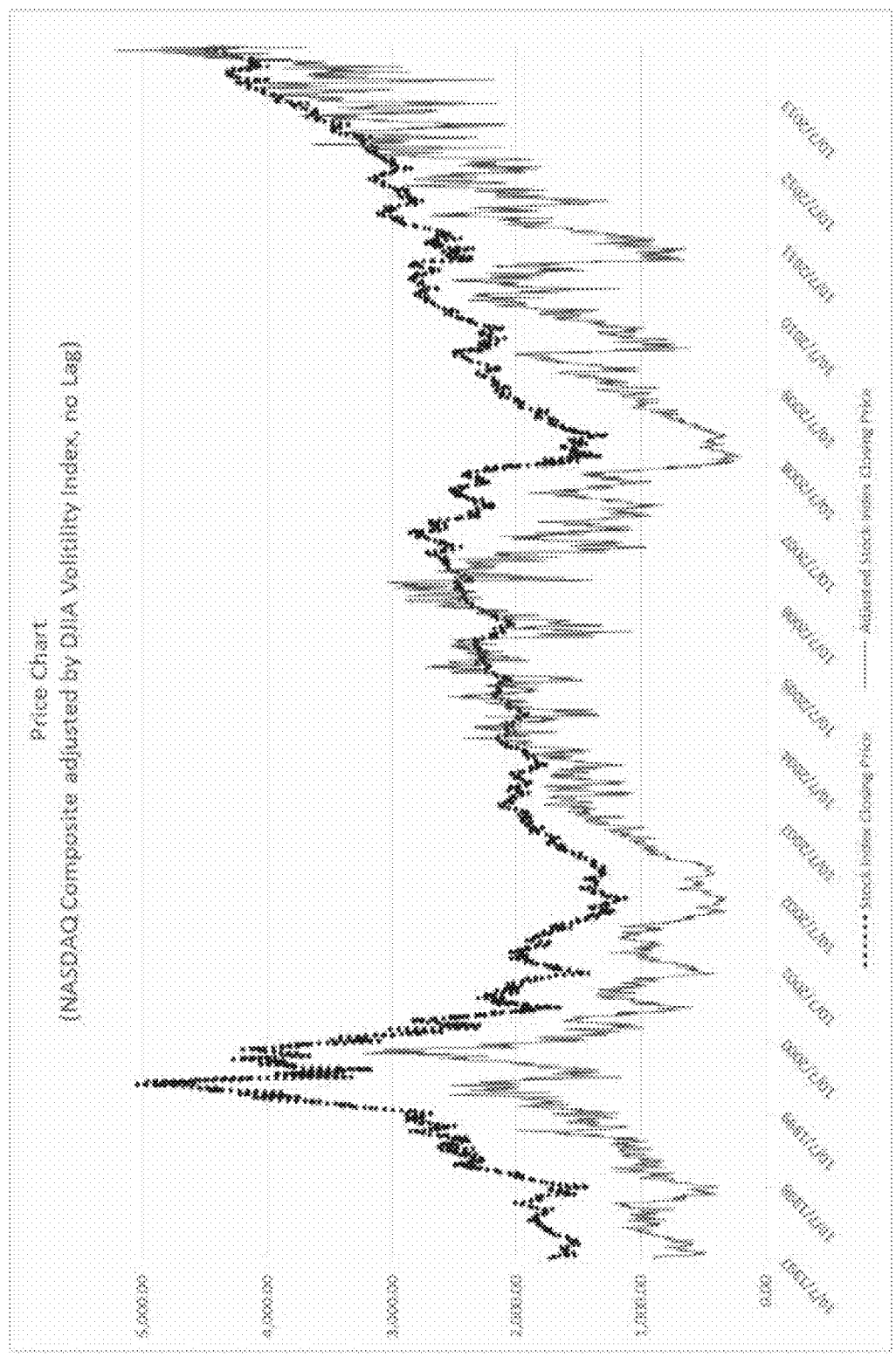
Figure 29:
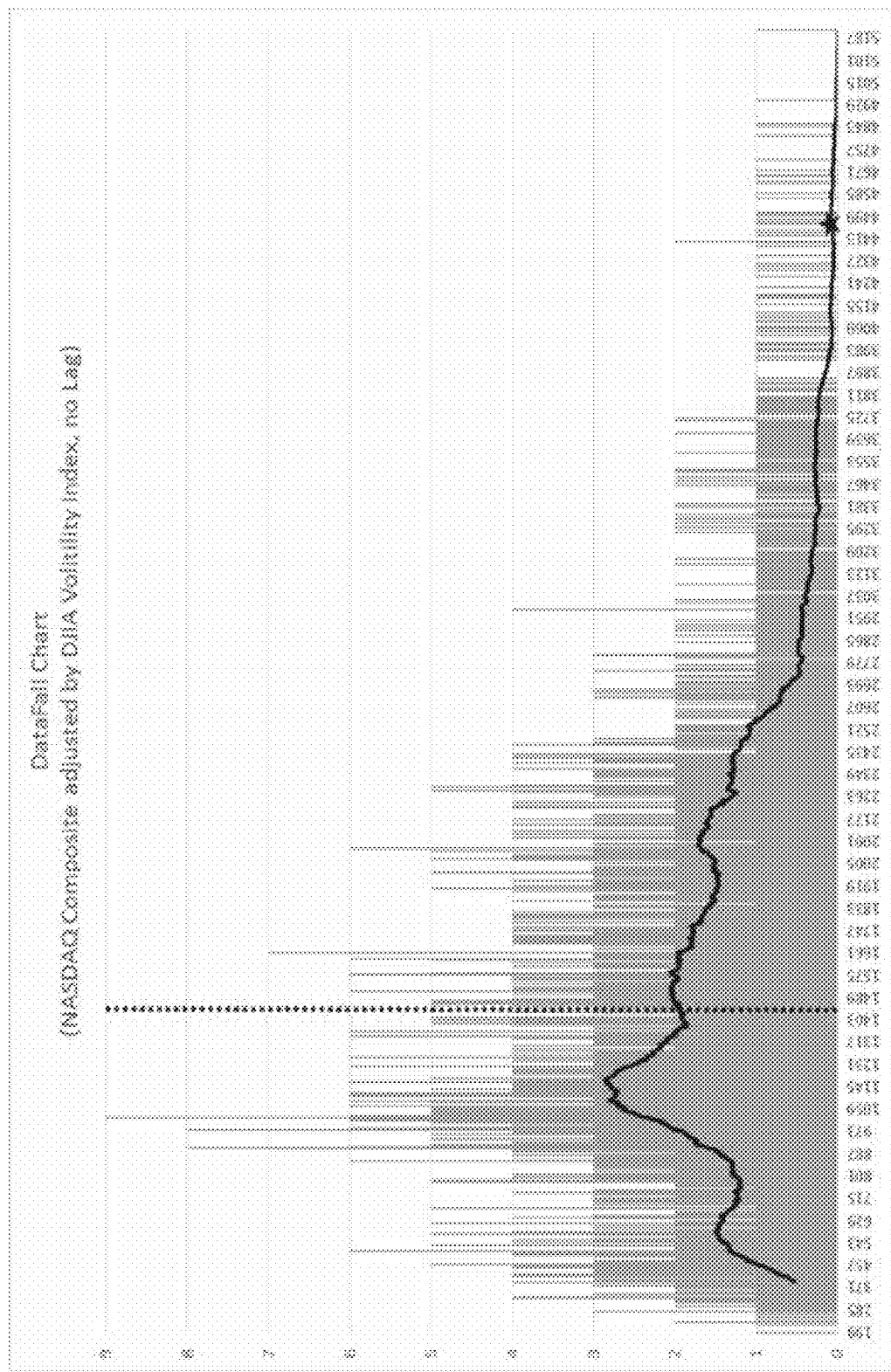
Figure 32:
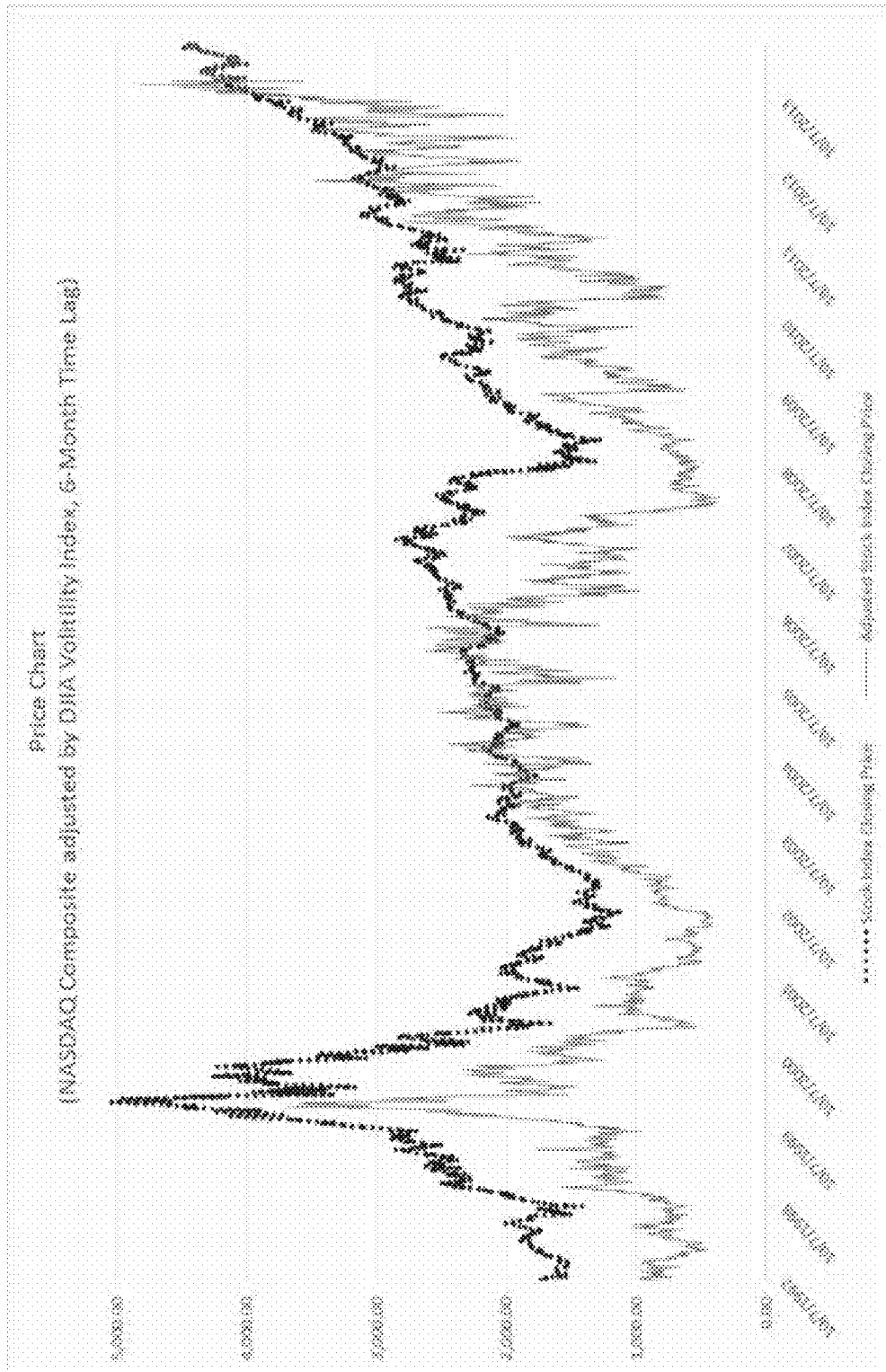
Figure 33:
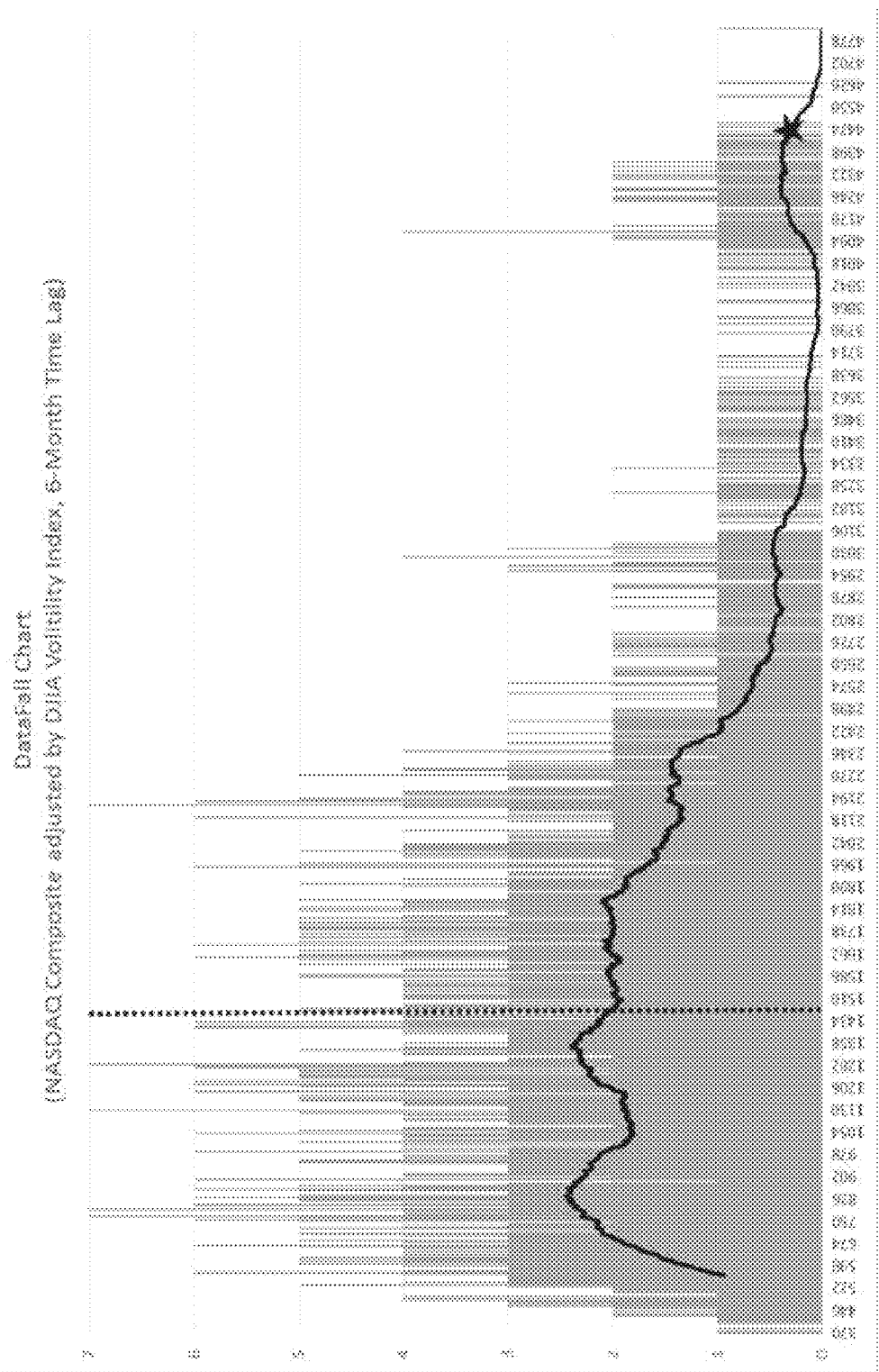

Trade Execution (FIG. 7)

80. Start: through the Index Finder, DataFall analysis, and Curve Morphing features the User is able to find Stock Indexes that are at either the high or low end of their historical price pattern. Those Stock Indexes that are historically high will, in due time, regress back to the mean of their price pattern, so they ought to be sold or shorted. Those Stock Indexes that are historically low will, in due time, regress back to the mean of their price pattern, so they ought to be bought. Thereby allowing Users to follow the only rule of investing: "Buy low, sell high."

81. User selects "Trade" button: once the User is satisfied that they have found stock indexes that are at or near either their historical high or low, the User can execute their trades based upon their analysis through the system.

82. Display Equivalent Financial Products List: stock indexes cannot be bought or sold directly, Users need to find Mutual Funds and/or ETFs based on the stock indexes that they selected. The Equivalent Financial Product List not only displays those mutual funds and ETFs that directly correspond to the selected stock indexes, but also those that are leveraged and/or inversely related. Users select a financial product by clicking on the name.

83. Link to Trading Platform: once the User selects a financial product in Step 82, the system connects to a Trading Platform as a separate window fed by the system's information.

84. Display Trading Platform: the system displays the Trading Platform pages to the User 85. Input buy/sell instructions: the User inputs their trading instructions into the Trading Platform 86. Execute Trade: the system executes the User's trading instructions through the Trading Platform. The Platform makes the trade through a marketplace and sends confirmations.

87. Display Trading Confirmation: the system displays the trade confirmation to the User.

88. End: if the time-honored rules of statistics hold true, then the Users should be able to maximize their long-term investment's profits.

II. DETAILED DISCLOSURE

FIGS. 8A-8C and 9A-9B show user interface display screens for implementing preferred embodiments of the present invention.

Selection Screen Narrative

Selection Screen (FIG. 8A): When the User logs onto the system, the first screen that is displayed is the Selection Screen, which is comprised of the following components.

1. Price Chart: The Price Chart automatically scales to fit the Start Date (which defaults to Jan. 20, 1997), and the Left-Hand Indicator/End Date (which is always set to the most recent closing day). The x-axis scale of the Display Field is based on the dates selected on the Time Slide. The y-axis scale is determined by the highest and lowest closing price, with vertical and horizontal hash marks spaced evenly between those extremes.

a) When the User selects a stock index to be analyzed, the system will display a Red Line (herein, represented by a dashed line) in the Price Chart to represent the price history of the stock index.

b) When the User selects a macroeconomic indicator to adjust the stock index (through the Adjusted By: drop-down box), a new Yellow Line (herein, represented as a solid line) appears to indicate the Adjusted Stock Index Close of the stock index. If the Adjusted By: data has not been calculated for as long as the stock index has been tracked (e.g.: The S&P 500 was created in 1957, while the Dollar Index began in 1973. Although the S&P 500 goes back to 1957, the earliest charts will be Aug. 15, 1971), then the Yellow Line will begin on the earliest date for which there is complete data. Regardless of when the Yellow Line begins, the horizontal scale will not change (unless the User adjusts the Left-Hand Indicator on the Time Slide). The vertical scale will only change if the Yellow Line has higher highs or lower lows than the Red Line.

c) The User can move the cursor arrow over the Yellow Line or Red Line to see both the actual index price (in red) and adjusted stock index price (in yellow) on that particular date.

2. Time Slide: As the User opens the Selection Screen, the Terminal Date will default to Aug. 15, 1971, Left-Hand Indicator will default to Jan. 20, 1997, and Start Date will reflect the date of the most recent market close. If the User selects a stock index from the Stock Index drop-down box that began after Aug. 15, 1971 (e.g.: the Dow Jones Financial Sector Index began on Feb. 14, 2000), the Terminal Date, Left-Hand Indicator and Start Date will change to reflect the date on which the stock index was first calculated. If the inception date of the Adjusted By: factor is earlier than either Aug. 15, 1971 or the inception date of the selected stock index, there will be no change to the Terminal Date, Left-Hand Indicator or Start Date. However, the Yellow Line can only display starting on the earliest date for which there is complete data. The Left-Hand Indicator above the Time Slide can be adjusted at any time by the User to select the Start Date of the time period being analyzed.

a) The User is not able to change to position of the Right-Hand Indicator. The End Date will always be the date of the most recent market close. The date of the most recent market close will display above the Right-Hand Indicator.

b) The User can move the Left-Hand Indicator to select the Start Date, creating the time period within which the stock index will be analyzed. As the User moves the Left-Hand Indicator, the Start Date above the Indicator will change to reflect the beginning of the time period. The Display Screen will not update until the User releases the mouse button, thereby selecting the Start Date.

3. Drop-Down Boxes: There are three drop-down boxes, one on the left to select the stock index that the User will be analyzing, one in the middle to select a macroeconomic indicator, and one on the left which allows the User to select a desired time lag. The Stock Index drop-down box will be red, the Adjusted By: drop-down box will be yellow, and the Time Lag drop-down box will be green.

a) Stock Index: An accordion drop-down box that starts with the category of stock index, then expands to reveal the individual indices that comprise each index category:
   i) Broad Indices: Dow Industrial, S&P 500, Russell 2000, Dow Jones U.S. Total Market Index, NASDAQ Composite, NASDAQ-100, Russell 3000, Russell 1000, Russell Top 200, Wilshire 5000, Wilshire 4500, etc.
   ii) Sector Indices: Dow Jones Transportation Average, Dow Jones Utility Average, Dow Jones U.S. Oil & Gas Index, Dow Jones U.S. Financials Index, Dow Jones U.S. Basic Materials Index, GSTI Semiconductor Index, GSTI Software Index, Wilshire US REIT, Wilshire US RESI, etc.
   iii) Style Indices: Dow Jones U.S. Large Cap Growth Index, Dow Jones U.S. Large Cap Value Index, Dow Jones U.S. Small Cap Growth Index, Dow Jones U.S. Small Cap Value Index, Russell 3000 Growth, Russell 3000 Value, Dow Jones U.S. Select Dividend Index, etc.
   iv) Cap Size Indices: US Large Cap 300 Index, US Mid Cap 450 Index, US Small Cap 1750 Index, Russell Midcap, S&P Midcap 400, S&P Smallcap 600, Wilshire US Large Cap, Wilshire US Mid Cap, Wilshire US Small Cap, Wilshire US Micro Cap, etc.

b) Adjusted By: This drop-down menu lists the top five macro-economic indicators (selected by the Administrator). The sixth option on the drop-down menu is "More . . . ", which opens up the Additional Adjustments pop-up screen (described below). The Additional Adjustments screen helps Users sort through the 250+ macro-economic indicators that the system tracks.
   i) Macro-Economic Indicators: Including, but not limited to: CPI-U, Core CPI, C-CPI-U, PPI, Core PPI, Gold Prices, Real Gold Prices, Silver Prices, Real Silver Prices, Copper Prices, Real Copper Prices, Oil (WTI) Prices, Real Oil (WTI) Prices, U Oil (Brett Sea) Prices, Real Oil (Brett Sea) Prices, U.S. Dollar Index, Trade-Weighted U.S. Dollar Index, U.S. GDP, Real U.S. GDP, U.S. GDP per Capita, Real U.S. GDP per Capita, Effective Federal Funds Rate, 1-Month Treasury Rate, 3-Month Treasury Rate, 6-Month Treasury Rate, 1 Year Treasury Rate, 2 Year Treasury Rate, 3 Year Treasury Rate, 5 Year Treasury Rate, 7 Year Treasury Rate, 10-Year Treasury Rate, 20-Year Treasury Rate, U.S. Federal Government Debt, U.S. Loan Delinquency Rates, New Home Permits, New Home Sales, U.S. Durable Goods Orders, Capacity Utilization: Total Industry, Total Business Inventories, University of Michigan: Consumer Sentiment, Civilian Total Unemployment Rate, U.S. Population, U.S. Productivity, Avg. Weekly Wages: Manufacturing, Corporate Profits After Tax, Personal Income, Personal Savings c) Time Lag: There is a belief among financial analysts that stock markets are forward-looking; in other words, that market prices reflect what conditions will be, not what they currently are. However, there is no consensus as to how far in the future markets are looking. This drop-down box will allow the User to select the extent to which "today's" prices reflect "tomorrow's" conditions. When the Time Lag is changed, the Realized prices will be recalculated and the Yellow Line will be updated to reflect the time lag selected by the User.

4. Index Finder: The right hand section of the Selection Screen is where the system displays the stock indices that have been selected by the algorithm as being on one of the extremes of the adjusted stock price's historical pattern by several strongly predictive charts (the process for selecting the stock indices to be displayed here is outlined below). The section is split into two sub-sections (whose size is determined by the number of stock indices that meet the system's criteria): the Historically High stock indices will be displayed in Red and the Historically Low stock indices will be listed on Green buttons. When the User hits one of these buttons, the Suggested Stock Index Screen (as described below) will pop-up.
  a. Index Finder Algorithm: If, for example, the system tracks 80 stock indexes, 250 macroeconomic indicators, over 3 time lags creates 60,000 possible datasets. Each night, the system will run a series of algorithms to determine which datasets are the most predictive (where the data forms a Bell Curve and where the most recent closing price is an outlier to the historic pattern) and which stock index has the largest number of most predictive data sets. These stock indices will have the strongest Buy or Sell Signals and will be suggested to the User in the right-hand column.
    i. Outlier Test: checking for whether the most recent closing price in a data set is an outlier is the far easier calculation, so it will be performed on all 60,000 data sets.

$$y<Q1\ 1.5 \times IQR\ \text{or}$$

$$y>Q3+1.5 \times IQR$$

The data sets that pass the above test (those that have an outlier) will move on to the next step. Data sets with an outlier in the $1^{st}$ Quartile will be called a Positive set. Data sets with an outlier in the $4^{th}$ Quartile will be called a Negative set.
    ii. Bell Curve Test: This calculation involves two steps. First a Normal Probability Plot needs to be calculated to produce a scatterplot of x- and y-axis coordinates in order to calculate Pearson's r, which measures whether the scatterplot resembles as straight line. The closer Pearson's r is to 1, the more the scatterplot resembles a line. The larger the Pearson's r is for each dataset, the closer its frequency distribution matches the idealized shape of the Bell Curve. The datasets that come closest to the Bell Curve are said to be the most predictive.
    iii. Suggested Indices: The system will then turn each Pearson's r that is connected to a dataset with an outlier in Q1 (among the lowest prices in the pattern) as a positive number and the Pearson's r score for those datasets with an outlier in Q4 (the historically high side) as a negative number. These numbers are the Shape Score for each dataset. The system will then group the datasets that pass both the Outlier and Bell Curve Tests by the stock index that it represents and their Shape Scores will be added together to form a Combined Shape Score for the stock index. The highest positive Combined Shape Score will be ranked #1 among the Historically Low stock indices, indicating a strong Buy signal. The highest negative Combined Shape Score will be ranked #1 among the Historically High stock indices, indicating a strong Sell (or Short) signal.

Additional Adjustments Screen (FIG. 8B): the screen pops up when the User selects the "More . . . " option in the Adjusted By . . . drop down menu. The screen is comprised of three sections:
  1) Macroeconomic Indicator: the User first selects the Category of macro-economic that they wish to explore (Banking, Commodities, Consumer, Corporate, Dollar, Economy, Employment, Government, Housing, Inflation, Interest Rates, Monetary Base, Population or Volatility), their selection then populates the Measure drop-down list from which they can select a macroeconomic indicator.
    (a) Per Capita: if the User selects this check off box, the selected Measure will be adjusted by the population of the United States. Not all macro-economic indicators can/should be calculated on a per Capita basis. In those cases, this box will be grayed out.
    (b) Inflation Adjusted: if the User selects this check off box, the selected Measure will be adjusted one of the several types of inflation tracked by the U.S. Government. Not all macro-economic indicators can or should be calculated on an Inflation Adjusted basis. In those cases, this box will be grayed out. When the box is active & checked off, the User will be able to use the drop-down menu to select which Inflation Type (CPI, PPI, Chained, Excluding Food & Energy, etc.) will be used.
  2. Brief Description: as the title indicates, this box will be filled by a pre-defined description of the macroeconomic indicator that the User has selected.
  3. Historic Chart: this chart displays the change in the selected macro-economic indicator selected by the User. The User can adjust the time period from Aug. 15, 1971 (or the earliest recorded observation if after Aug. 15, 1971) to the most recent observation.
  4. Select Button: when the User presses this button, they return to the Selection Screen and the Adjusted By . . . field will be pre-populated to reflect the macro-economic indicator that they selected.

Suggested Stock Index Screen (FIG. 8C): this screen allows Users to see the datasets that had the highest Shape Scores that gave the stock index the highest Combined Shape Score, which caused the stock index to appear on the Index Finder feature.
  1. Suggested Stock Index: will appear at the top of the pop-up screen to remind the User which stock index they are analyzing.
  2. Suggested Charts: The number of buttons that appear below the Suggested Stock Index title will depend upon the number of charts that meet the system's criteria for being highly predictive. The buttons will be ordered (from left to right, then from top row to bottom) according to the degree to which the charts meet the criteria. When the user selects any of these chart buttons, they will be returned to the Selection Screen with all the drop-down menus pre-populated with the appropriate factors so the User can re-create the suggested charts. If the User does not want to select one of the suggested charts, they can close the pop-up screen by clicking on the check box in the upper right-hand corner.

Behind these screens, there is a database that holds all the required information and calculates the necessary data points.
  1. The daily closing prices for each stock index are publically available on several financial sites such as Yahoo! Finance and Google Finance (the data will only go back to Aug. 15, 1971). The daily closing price data is not actually daily; it is only for the days on which the U.S. stock market is open (excluding weekends and market holidays). This is the source of the data for the Red Line in the Display Field.
  2. The best free, public source for the Adjusted By: data is on the FRED (Federal Reserve Economic Data)

database, which is maintained by the Federal Reserve Bank of St. Louis (http://research.stlouisfed.org/fred2/tags/series).
- a) The Adjusted By: data cannot be stated in terms of percent changes, we can only use data that is stated in index form or dollar figures.
- b) The Adjusted By: data is collected on several different frequency bases (daily, monthly, quarterly, annual, etc.). The system will need to convert these figures into daily data points (on a pro rata basis) in order to match them to the daily closing prices and to allow for the time lags.
  - i) Calculate the number of days between the nearest collected data points. Find the difference between the nearest data points. Divide that difference by the number of days. That is the daily incremental increase/decrease that gets added to the prior day's data point.
- c) The daily Adjusted By: data point will be turned into an Adjustment Factor by dividing that day's data point by the most recent observation, creating a Factor that ranges from 0.00 to □ (where if that day's number is larger than the most recent observation, the factor will be below 1.00; if it is smaller, then the factor grows).
- d) The adjusted stock index price is calculated by multiplying the day's closing price with that indicated day's Adjustment factor (based on the selected time lag). This is the source of the data for the Yellow Line on the Display Field.

DataFall Screen Narrative

DataFall Chart (FIG. 9A): This histogram displays the frequency distribution for the Realized stock index price (the Yellow Line) from the Selector Screen. By default, the most recent observation will be highlighted in red to place it in proper historical context.

1. Title Box: each DataFall chart will be titled at the top of the screen with the name of the stock index being displayed, the macro-economic indicator that is adjusting the index, and the time lag (if any).
2. Close Box: if the User selects this button, the DataFall Screen will close. When the User closes the screen, it will not be able to be morphed (see below) with another dataset.
3. The horizontal scale goes from the lowest observed Adjusted Stock Index Close on the left to the highest on the right, with the hash marks evenly spaced between those extremes. The data points will "fall" in chronological order (from the oldest observation to most recent) from the top of the DataFall Chart like snow and pile up to indicate which prices had the greatest observed frequencies.
   - i) The DataFall Speed slide allows the User to adjust the how fast each individual dot in the DataFall effect falls. The right-hand terminus is the maximum speed, the left-hand terminus "turns off" the DataFall effect so that the User wants to go directly to the completed histogram.
4. Curve Line: the black line that that smooths out the shape of the frequency distribution curve, the Curve Line is calculated as a 200-day moving trendline based upon the frequency at each x-axis value.
5. Median Line: the dotted line that runs vertically through the center of the frequency distribution where half of the observations are to the right and half are to the left of the line.
6. Most Recent Price Dot: the last data point to fall, the last dot, represents the most recent closing price of the stock index being analyzed. It should stand out from the rest of the data points and be immediately recognizable by the User. It may be necessary to change the shape or size of this dot. In the example above, it is a solid black dot.
   - a) As a default condition, all data points, except for the most recent one, will be in Yellow (in this example, the data points are clear bubbles). The last closing price will be in a contrasting color.
7. If the Turn on Time Indicator button is checked, then the data points will be colored in chronological order (much like weather radar uses color scale to indicate rainfall intensity). That same color scale will be duplicated on the Time Slide for the User's reference, with the Time Slide divided into time quintiles (20% time periods) with each data point in the quintile having the same color (Q1=Blue, Q2=Green, Q3=Yellow, Q4=Orange, Q5=Purple) with the most recent closing price in Red (herein, the different colors are simulated by the use of different symbols: Q1="X", Q2="#", Q3="-", Q4="+", Q5="@" with the Most Recent Closing Price being represented by a circle). As the User changes the time period, the quintiles and data point colors will change accordingly.
8. By default, the horizontal scale will indicate the adjusted stock index price. If the User checks the Percent Increase/Decrease button, then the horizontal scale will change from dollar figures to indicate the percent change in price above or below the stock index's historical mean.
9. If the User selects the Standard Deviations button, the horizontal scale will change from dollar figures to show the mean of the data and the standard deviations from the mean.

Time Slide: This feature indicates the time frame of the data being analyzed. Triangles are used as indicators to mark the Starting Date and the Ending Date selected by the User.
1) The Terminal Date is calculated in the same manner as it is on the Selection Screen. That date will be listed below the Time Slide at the left end.
2) The Right-Hand Indicator will be set at the date of the last market close (the User cannot move this indicator), the End Date will be indicated above the right-hand triangle.
3) The Left-Hand Indicator will automatically default to the Start Date selected on the Selection Screen. The User can change the Start Date at any point by moving the Left-Hand Indicator along the Time Scale. When the User releases the mouse button (setting the Left-Hand Indicator and the Start Date), the data will fall again in the Realizer Field to build a new frequency distribution histogram.
   - i) If the Time Indicator box is checked, the Time Slide will change color to indicate the chronological time-color scale (as discussed above). The section of the Time Slide between the Terminal Date and the Left-Hand Indicator will turn gray to indicate the dates not selected.

Curve Morphing (FIG. 9B): This button will allow Users to create a composite curve comprised of two datasets (as long as both are for the same stock index). The concept is based on "photo morphing" technology that combines together two peoples' photographs to build a third image, which is half way between the two original images.

1) If the User selects the Curve Morphing button, the data points on the DataFall Chart disappear, leaving only the Curve Line, Median Line, and Most Recent Price Dot for the dataset. The DataFall Screen is renamed "Screen One".
2) The system then automatically opens up a new Selection Screen and the User begins the process of analyzing a new dataset to create a new DataFall Screen, now known as "Screen Two". Once the User is satisfied with their second analysis of a dataset, the data points will disappear from Screen Two, again leaving just the Curve Line, Median Line, and Most Recent Closing Price Dot for the second dataset.
3) The system animates each chart, moving them towards each other, merging/morphing them into a third, combined chart, located on the "Morphing Screen".
4) The system aligns the two charts' Median Lines and then each x-axis value to the left and right of the Median Line will be adjusted to be half way between the two separate Curve Lines. The merged Most Recent Closing Price Dot will be located at the halfway point between the most recent data point on each of the component charts.

One set of stock indexes that may be analyzed by the present invention are as follows:

1. Amex Composite Index
2. Amex Gold Miners Index
3. Barron's 400 Index
4. Dow Industrials
5. Dow Jones Transportation Average
6. Dow Jones U.S. Financials
7. Dow Jones U.S. Large Cap Growth Index
8. Dow Jones U.S. Large Cap Value Index
9. Dow Jones U.S. Real Estate Index
10. Dow Jones U.S. Select Dividend Index
11. Dow Jones U.S. Small Cap Growth Index
12. Dow Jones U.S. Small Cap Value Index
13. Dow Jones U.S. Steel Index
14. Dow Jones U.S. Total Market Index
15. Dow Jones Utilities Average
16. GSTI Semiconductor Index
17. GSTI Software Index
18. KBW Bank Index
19. KBW Mortgage Finance Index
20. KBW Regional Banking Index
21. Morgan Stanley Commodity-related equity index
22. Morgan Stanley Consumer Index
23. Morgan Stanley Cyclical Index
24. Morgan Stanley Health Care Payers Index
25. Morgan Stanley High-Technology 35 Index
26. MSCI U.S. REIT index
27. NASDAQ Bank
28. NASDAQ Biotechnology
29. NASDAQ Biotechnology Equal Weighted Index
30. NASDAQ Capital Market Composite Index
31. NASDAQ Clean Edge Green Energy Index
32. NASDAQ Clean Edge Green Energy Total Return Index
33. NASDAQ Composite
34. NASDAQ Computer
35. NASDAQ Dividend Achievers Index
36. NASDAQ Dividend Achievers Total Return Index
37. NASDAQ Financial-100
38. NASDAQ Health Care Index
39. NASDAQ Industrial
40. NASDAQ Insurance
41. NASDAQ Internet Index
42. NASDAQ NeuroInsights Neurotech Index
43. NASDAQ OMX 100 Index
44. NASDAQ OMX AeA Illinois Tech Index
45. NASDAQ OMX Government Relief Index
46. NASDAQ Other Finance
47. NASDAQ Q-50 Index
48. NASDAQ Telecommunications
49. NASDAQ Transportation
50. NASDAQ-100
51. NASDAQ-100 Ex-Tech Sector Index
52. NASDAQ-100 Technology Sector Index
53. NYSE Arca Airline Index
54. NYSE Arca Biotechnology Index
55. NYSE Arca Computer Hardware Index
56. NYSE Arca Defense Index
57. NYSE Arca Disk Drive Index
58. NYSE ARCA Gold Bugs Index
59. NYSE Arca Natural Gas
60. NYSE Arca Networking Index
61. NYSE Arca Oil Index
62. NYSE Arca Pharmaceutical Index
63. NYSE Arca Securities/Broker Dealer index
64. NYSE Arca Tobacco Index
65. NYSE Composite
66. Philadelphia Housing Sector Index
67. Philadelphia KBW Insurance Index
68. Philadelphia Oil Service Sector Index
69. Philadelphia Semiconductor Index
70. PHLX Chemicals Sector
71. PHLX Defense Sector
72. PHLX Drug Sector
73. PHLX Gold/Silver Sector
74. PHLX Housing Sector
75. PHLX Marine Shipping Sector
76. PHLX Medical Device Sector
77. PHLX Oil Service Sector
78. PHLX Retail Sector
79. PHLX Semiconductor Sector
80. PHLX Sports Sector
81. PHLX Utility Sector
82. Russell 1000
83. Russell 1000 Growth
84. Russell 1000 Value
85. Russell 2000
86. Russell 2000 Growth
87. Russell 2000 Value
88. Russell 2500
89. Russell 2500 Value
90. Russell 3000
91. Russell 3000 Growth
92. Russell 3000 Value
93. Russell MidCap
94. Russell MidCap Growth
95. Russell MidCap Value
96. Russell Small Cap Completeness
97. Russell Small Cap Completeness Growth
98. Russell Small Cap Completeness Value
99. Russell Top 200
100. Russell Top 200 Growth
101. Russell Top 200 Value
102. S&P 100
103. S&P 500
104. S&P 500
105. S&P 500/BARRA Growth
106. S&P 500/BARRA Value
107. S&P Citigroup Growth Index
108. S&P MidCap 109. S&P Midcap 400
110. S&P Midcap 400/BARRA Growth
111. S&P Midcap 400/BARRA Value
112. S&P Retail Index
113. S&P SmallCap 600
114. S&P SmallCap 600/BARRA Growth
115. S&P SmallCap 600/BARRA Value
116. NASDAQ-100 Equal Weighted Index
117. US Large Cap 300 Index
118. US Large Cap Growth
119. US Large Cap Value
120. US Mid Cap 450 Index
121. US Mid Cap Growth
122. US Mid Cap Value
123. US Small Cap 1750 Index
124. US Small Cap Growth
125. US Small Cap Value
126. Wilshire 4500
127. Wilshire 5000
128. Wilshire 5000
129. Wilshire US Large Cap
130. Wilshire US Large Cap Growth
131. Wilshire US Large Cap Value
132. Wilshire US Micro Cap
133. Wilshire US Mid Cap
134. Wilshire US Mid Cap Growth
135. Wilshire US Mid Cap Value
136. Wilshire US REIT
137. Wilshire US RESI
138. Wilshire US Small Cap
139. Wilshire US Small Cap Growth
140. Wilshire US Small Cap Value One set of sample macroeconomic indicators are listed below. The details of the macroeconomic indicators are maintained by the Federal Reserve Economic Data database.

1. 10-Year Treasury Constant Maturity Rate
2. 10-Year Treasury Inflation-Indexed Security, Constant Maturity
3. 1-Month Treasury Constant Maturity Rate
4. 1-Year Treasury Bill: Secondary Market Rate
5. 1-Year Treasury Constant Maturity Rate
6. 30-Year Fixed Rate Mortgage Average in the United States
7. 30-Year Treasury Constant Maturity Rate
8. 3-Month Treasury Bill: Secondary Market Rate
9. 3-Month Treasury Constant Maturity Rate
10. 4-Week Moving Average of Initial claims
11. 5-Year Treasury Constant Maturity Rate
12. 7-Year Treasury Inflation-Indexed Security, Constant Maturity
13. Active Population: Aged 25-54: All Persons for the United States
14. Agency- and GSE-Backed Mortgage Pools; Total Mortgages; Liability
15. All Employees: Government
16. All Employees: Government: Federal
17. All Employees: Government: Local Government
18. All Employees: Manufacturing
19. All Employees: Total nonfarm
20. All Employees: Total Private Industries
21. All Federal Reserve Banks—Total Assets, Eliminations from Consolidation
22. All Sectors; Credit Market Instruments; Liability, Level
23. All-Transactions House Price Index for the United States
24. Average (Mean) Duration of Unemployment
25. Average Annual Hours Worked per Employed Person in the United States
26. Average Hourly Earnings of All Employees: Total Private
27. Average Hourly Earnings of Production and Non-supervisory Employees: Total Private
28. Average Hours of Work Per Week, Total, Household Survey for United States
29. Average Sales Price for New Houses Sold in the United States
30. Average Weekly Earnings of All Employees: Total Private
31. Average Weekly Hours of All Employees: Total Private
32. Average Weekly Hours of Production and Nonsupervisory Employees: Manufacturing
33. Average Weeks Unemployed
34. Balance on Current Account
35. Bank Credit, All Commercial Banks
36. Bank Prime Loan Rate
37. Business Sector: Unit Labor Cost
38. Capacity Utilization: Total Industry
39. Capital Account, Net (Excludes Exceptional Financing) for United States
40. Capital Stock at Constant National Prices for United States
41. CBOE DJIA Volatility Index
42. CBOE NASDAQ 100 Volatility Index
43. CBOE Russell 2000 Volatility Index
44. CBOE Volatility Index: VIX
45. Chained Consumer Price Index for all Urban Consumers: All items
46. Civilian Employment
47. Civilian Labor Force
48. Civilian Labor Force Participation Rate
49. Civilian Labor Force Participation Rate—Bachelor's Degree and Higher, 25 years and over
50. Civilian Non-institutional Population
51. Civilians Unemployed for 27 Weeks and Over
52. Commercial and Industrial Loans, All Commercial Banks
53. Commercial Paper Outstanding
54. Compensation of employees
55. Compensation of employees: Wages and salaries
56. Composite Index of Twelve Leading Indicators, Original Trend, Short List for United States
57. Consumer Loans at All Commercial Banks
58. Consumer Loans: Credit Cards and Other Revolving Plans, All Commercial Banks
59. Consumer Opinion Surveys: Confidence Indicators: Composite Indicators: OECD Indicator for the United States
60. Consumer Price Index for All Urban Consumers: All Items
61. Consumer Price Index for All Urban Consumers: All Items Less Food & Energy
62. Consumer Price Index for All Urban Consumers: Medical Care
63. Consumer Price Index for All Urban Consumers: Purchasing Power of the Consumer Dollar
64. Consumer Price Index: All Items for the United States
65. Consumer Price Index: Total, All Items for the United States
66. Continued Claims (Insured Unemployment)
67. Corporate business: Profits after tax (without IVA and CCAdj)

68. Corporate business: Profits before tax (without IVA and CCAdj)
69. Corporate profits after tax
70. Crude Oil Prices: Brent—Europe
71. Crude Oil Prices: West Texas Intermediate (WTI)—Cushing, Okla.
72. Currency in Circulation
73. Delinquency Rate On All Loans, All Commercial Banks
74. Delinquency Rate On Business Loans, All Commercial Banks
75. Delinquency Rate On Commercial Real Estate Loans (Excluding Farmland), Booked In Domestic Offices, All Commercial Banks
76. Delinquency Rate On Consumer Loans, All Commercial Banks
77. Delinquency Rate On Single-Family Residential Mortgages, Booked In Domestic Offices, All Commercial Banks
78. Demand Deposits at Commercial Banks
79. Deposits, All Commercial Banks
80. Disposable personal income
81. Dividend Yield of Common Stocks On The New York Stock Exchange, Composite Index for United States
82. Effective Fed Funds Rate
83. Employment Cost Index: Total compensation: All Civilian
84. Employment Cost Index: Wages & Salaries: Private Industry Workers
85. Employment Level
86. Existing Home Sales
87. Existing Home Sales: Housing Inventory
88. Existing Home Sales: Months' Supply
89. Exports of Goods and Services
90. Federal Debt Held by Foreign & International Investors
91. Federal Debt Held by the Public
92. Federal Debt: Total Public Debt
93. Federal government budget surplus or deficit (−)
94. Federal government current expenditures
95. Federal government current expenditures: Interest payments
96. Federal government current receipts
97. Federal government current tax receipts
98. Federal government current tax receipts: Personal current taxes
99. Federal government current tax receipts: Taxes on corporate income
100. Federal government total expenditures
101. Federal Government: Tax Receipts on Corporate Income
102. Federal government; consumer credit, student loans; asset, Level
103. Federal Net Outlays
104. Federal Outlays: Interest
105. Federal Receipts
106. Federal Surplus or Deficit [−]
107. Full-time and part-time employees
108. GDP Implicit Price Deflator in United States
109. Gold Fixing Price 10:30 A.M. (London time) in London Bullion Market, based in U.S. Dollars
110. Government social benefits: To persons: Federal: Supplemental Nutrition Assistance Program (SNAP)
111. Government total expenditures
112. Gross Domestic Income
113. Gross domestic income: Compensation of employees, paid: Wages and salaries
114. Gross domestic investment
115. Gross Domestic Product
116. Gross Domestic Product: Implicit Price Deflator
117. Gross Federal Debt
118. Gross National Income
119. Gross National Product
120. Gross Private Domestic Investment
121. Gross private domestic investment: Domestic business
122. Gross private saving
123. Gross saving
124. Home Ownership Rate for the United States
125. Homeownership Rate for the United States
126. Hours worked by full-time and part-time employees
127. Household Debt Service Payments as a Percent of Disposable Personal Income
128. Households; Owner-Occupied Real Estate Including Vacant Land and Mobile Homes
at Market Value, Level
129. Households; Owners' Equity in Real Estate, Level
130. Housing Affordability Index (Composite)
131. Housing Affordability Index (Composite)
132. Housing Affordability Index (Fixed)
133. Housing Inventory Estimate: Occupied Housing Units for the United States
134. Housing Inventory Estimate: Total Housing Units for the United States
135. Housing Starts: Total: New Privately Owned Housing Units Started
136. Imports of Goods and Services
137. Income Gini Ratio for Households by Race of Householder, All Races
138. Income Gini Ratio of Families by Race of Householder, All Races
139. Initial claims
140. Initial Claims, Unemployment Insurance, State Programs for United States
141. Interbank Loans, All Commercial Banks
142. Interest Rates, Discount Rate for United States
143. ISM Manufacturing: Inventories Index
144. ISM Manufacturing: PMI Composite Index
145. ISM Manufacturing: Prices Index
146. ISM Manufacturing: Production Index
147. Leading Index for the United States
148. Light Weight Vehicle Sales: Autos & Light Trucks
149. Loans and Leases in Bank Credit, All Commercial Banks
150. Long-Term Government Bond Yields: 10-year: Main (Including Benchmark) for the United States
151. M1 for the United States
152. M2 for the United States
153. Manufacturer's Inventories
154. Manufacturers' New Orders: Durable Goods
155. Manufacturers' New Orders: Nondefense Capital Goods Excluding Aircraft
156. Manufacturers Sales
157. Mean Sales Price of Existing Homes
158. Duration of Unemployment
159. Median Household Income in the United States
160. Median Sales Price for New Houses Sold in the United States
161. Median Sales Price of Existing Homes
162. Median Sales Price of Houses Sold for the United States
163. Monetary Base; Total
164. Monthly Supply of Homes in the United States
165. Moody's Seasoned Aaa Corporate Bond Yield 166. MZM Money Stock
167. MZM Money Stock
168. National Composite Home Price Index for the United States
169. Natural Gas Price: Henry Hub, LA
170. Natural Rate of Unemployment (Long-Term)
171. Natural Rate of Unemployment (Short-Term)
172. Net corporate dividends
173. Net domestic investment
174. Net domestic investment: Private: Domestic business
175. Net Exports of Goods & Services
176. Net private saving
177. Net private saving: Households and institutions
178. New Homes Sold in the United States
179. New One Family Homes For Sale in the United States
180. New One Family Houses Sold: United States
181. New Privately-Owned Housing Units Authorized by Building Permits: Total
182. Nominal Potential Gross Domestic Product
183. Nonfarm Business Sector: Unit Labor Cost
184. Nonfinancial Corporate Business; Credit Market Instruments; Liability
185. Nonperforming Loans (past due 90+ days plus nonaccrual)/Total Loans for all U.S. Banks
186. Nonperforming Total Loans (past due 90+ days plus nonaccrual)
187. Not in Labor Force
188. Not in Labor Force, Searched For Work and Available
189. Overnight London Interbank Offered Rate (LIBOR), based on U.S. Dollar
190. Personal Consumption Expenditures
191. Personal current taxes
192. Personal current transfer receipts: Government social benefits to persons
193. Personal income
194. Personal saving
195. Population: Mid-Month
196. Primary Credit Rate
197. Private Residential Fixed Investment
198. Privately Owned Housing Starts: 1-Unit Structures
199. Producer Price Index: All Commodities
200. Purchase Only House Price Index for the United States
201. Real Estate Loans: Commercial Real Estate Loans, All Commercial Banks
202. Real Government Consumption Expenditures & Gross Investment
203. Real Private Nonresidential Fixed Investment
204. Real Trade Weighted U.S. Dollar Index: Major Currencies
205. Rental Vacancy Rate for the United States
206. Reserve Balances with Federal Reserve Banks
207. Retail and Food Services Sales
208. Retail Trade: Total
209. Retailers Inventories
210. Retailers Sales
211. S&P Case-Shiller 10-City Home Price Index
212. S&P Case-Shiller 20-City Home Price Index
213. Savings Deposits—Total
214. St. Louis Adjusted Monetary Base
215. State and local government current tax receipts: Personal current taxes
216. State and local government total expenditures
217. Total Assets, All Commercial Banks
218. Total Business Inventories
219. Total Business Sales
220. Total Checkable Deposits
221. Total Construction Spending
222. Total Consumer Credit Owned and Securitized, Outstanding
223. Total Factor Productivity at Constant National Prices for United States
224. Total Federal Budget Surplus Or Deficit for United States
225. Total Liabilities, All Commercial Banks
226. Total Nonfarm Private Payroll Employment
227. Total Population: All Ages including Armed Forces Overseas
228. Total Private Construction Spending: Residential
229. Total Reserves of Depository Institutions
230. Total Revolving Credit Owned and Securitized, Outstanding
231. Total Savings Deposits at all Depository Institutions
232. Total unemployed, plus all marginally attached workers plus total employed part time for economic reasons
233. Total Value of Loans for All C&I Loans, All Commercial Banks
234. Trade Balance: Goods and Services, Balance of Payments Basis
235. Trade Weighted U.S. Dollar Index: Broad
236. Trade Weighted U.S. Dollar Index: Major Currencies
237. Unemployed
238. Unemployment Level
239. Unemployment Rate for United States
240. University of Michigan Inflation Expectation
241. University of Michigan: Consumer Sentiment
242. US All Grades All Formulations Gas Price
243. US Regular All Formulations Gas Price
244. Value of Manufacturers' New Orders for All Manufacturing Industries
245. Value of Manufacturers' New Orders for Capital Goods: Nondefense Capital Goods Excluding Aircraft Industries
246. Value of Manufacturers' New Orders for Consumer Goods: Consumer Durable Goods Industries
247. Value of Manufacturers' Shipments for Capital Goods: Nondefense Capital Goods Excluding Aircraft Industries
248. Value of Manufacturers' Total Inventories for All Manufacturing Industries
249. Working Age Population: Aged 15-64: All Persons for the United States
250. Working-age Population in the United States FIGS. 10A-33 illustrate the calculations that are performed on each dataset. Six dataset examples are provided, as follows:
  i. S&P 500 adjusted by CPI with no time lag (FIGS. 10A-10B, 11-13)
  ii. S&P 500 adjusted by DJIA Volatility Index with no time lag (FIGS. 14A-14B, 15-17)
  iii. S&P 500 adjusted by DJIA Volatility Index with six month time lag (FIGS. 18A-18B, 19-21)
  iv. NASDAQ adjusted by CPI with no time lag (FIGS. 22A-22B, 23-25)
  v. NASDAQ adjusted by DJIA Volatility Index with no time lag (FIGS. 26A-26B, 27-29)
  vi. NASDAQ adjusted by DJIA Volatility Index with six month time lag (FIGS. 30A-30B, 31-33)

Detailed Explanation of Dataset Calculation
Dataset Examples (FIGS. 10A and 10B; 14A and 14B; 18A and 18B; 22A and 22B; 26A and 26B; and 30A and 30B)

This table is an illustration of the calculations that are performed on each dataset (combination of stock index, macroeconomic indicator, and time lag) each evening. If the system tracks 80 stock indexes, 250 macroeconomic indicators, and three time lags, then the system produces 60,000 datasets every night. The system has a default time period for its examinations, which is from Jan. 20, 1997 to the most recent market close. If the particular stock index or macroeconomic indicator did not exist on Jan. 20, 1997, then the system will default the time period to the earliest observation for that stock index or macroeconomic indicator. When using the User-Defined Dataset Analysis feature, the User is free to adjust the time period to reflect the time frame that they wish to analyze.

The header indicates which Stock Index, Macroeconomic Indicator, and Time Lag was selected to create the dataset. Each row in the database represents a single date's data.

Column a—Stock Index Close: this column displays the closing stock index price for the selected stock index for that day.

Column b—Macroeconomic Indicator: this column displays the pro rata measurement for the selected macroeconomic indicator for that day.

Column c—Macroeconomic Adjustment Factor Formula: this column explains how Column D is calculated, which is that the most recent observation is divided by that day's observation, thereby showing the degree to which the macroeconomic indicator has increased or decreased from that day until the end of the time period.

Column d—Adjustment Factor: this column displays the result of the formula displayed in Column C. If the result is less than 1.0, the macroeconomic indicator has decreased during the time period. If the result is greater than 1.0, the macroeconomic indicator has increased over the time period.

Column e—Stock Index Adjustment Factor Formula: this column displays how Column F is calculated. The calculation is dependent on the Time Lag selected. If "None" is selected for Time Lag, the Stock Index Close for the day is multiplied by the Adjustment Factor for the same day. If "3-Months" is selected for Time Lag, the Stock Index Close for the day is multiplied by the Adjustment Factor for the day three months in the future from that day. If "6-Months" is selected for Time Lag, the Stock Index Close for the day is multiplied by the Adjustment Factor for the day six months in the future from that day.

Column f—Adjusted Stock Index Close: this column displays the result of the formula displayed in Column E. These number becomes the data points in the DataFall process, they are also the source of the x-axis values on the DataFall Chart.

Frequency Distribution Tables (FIGS. 11, 15, 19, 23, 27 and 31)

The purpose of this table is to track the number of times that an Adjusted Stock Index Close price is repeated in the dataset, this number is displayed in the "Frequency" column. The Frequency is the y-axis value of the frequency distribution histogram for the dataset; the larger this number, the taller the column for that x-axis value of the frequency distribution histogram.

The Min. and Max. values are the smallest and the largest, respectively, Adjusted Stock Index Close prices in the dataset. These values define the range of the x-axis for the DataFall Chart. The Mean value represents the x-axis value in the dataset where half of the observed Adjusted Stock Index Close prices are to the left (lower) and half are to the right (higher) in the dataset.

Price Charts (FIGS. 12, 16, 20, 24, 28 and 32)

This is an illustration of the Price Chart discussed in the Decision Tree Narrative. Each chart is headed by a listing of the Stock Index, Macroeconomic Indicator, and Time Lag for the dataset being analyzed. The Red Line displays the Stock Index Close values for the dataset, the actual closing price for the stock index selected for analysis. The Yellow Line displays the Adjusted Stock Index Close values for the stock index selected for analysis.

The x-axis values are the dates for the selected time period. The y-axis values are the values for the actual and adjusted stock index closing prices. The smallest x-axis value is always 0. The largest x-axis values is the Max. value of either the Stock Index Close or the Adjusted Stock Index Close, whichever is larger.

DataFall Charts (FIGS. 13, 17, 21, 25, 28 and 33)

This is a diagram of the final output of the DataFall Chart discussed in the Decision Tree Narrative, with several minor changes for illustrative purposes. The x-axis represents the Adjusted Stock Index Close price for each data point. The y-axis represents the frequency for each x-axis value on the Frequency Distribution Table. The height of each column represents the number of times each Adjusted Stock Index Close is repeated. In the invention, the column will be comprised of a unique graphical symbol for each data point, rather than a solid column, as it is represented in this example.

The black line in the diagram represents the Curve Line in the DataFall Chart as discussed in the Decision Tree Narrative. The Curve Line is the shape of the frequency distribution histogram, as calculated by a 200-day moving average of the data points. In this example, the Curve Line does not extend to include the full range of the x-axis values in the Chart, however, the Curve Line in the invention will cover the full range of x-axis values.

The red line in the diagram represents the Median Line in the DataFall Chart as discussed in the Decision Tree Narrative. The Median Line is drawn at the x-axis value of the Median value for the dataset as displayed in the Frequency Distribution Table.

The star in the diagram represents the most recent closing price of the stock index, in the invention, as discussed in the Decision Tree Narrative, the star will be displayed as a red dot or some other contrasting symbol. It is designed to draw the User's attention to that data point so that they can see where the most recent price falls in the frequency distribution histogram. If the most recent price is on the left-hand tail of the Curve Line, then it is on the low side of the historical price pattern. If the most recent price is on the right-hand tail of the Curve Line, then it is on the high side of its historical price pattern. If the most recent price is near the Median Line, then it is near its historical average price.

FIG. 34 is a frequency distribution table for a sample dataset (not one of the previously presented datasets).

Figure 35H:
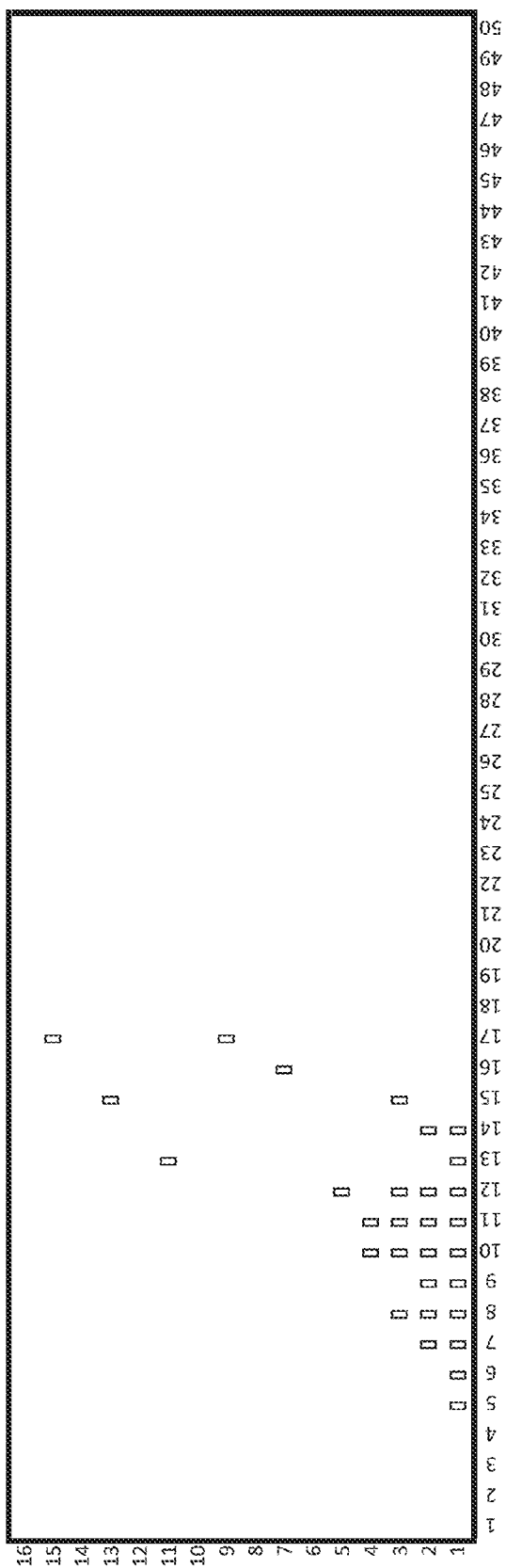
FIGS. 35A-35S illustrate an animated graphical display of the DataFall effect shown in FIGS. 4A-4B.
Figure 35I:
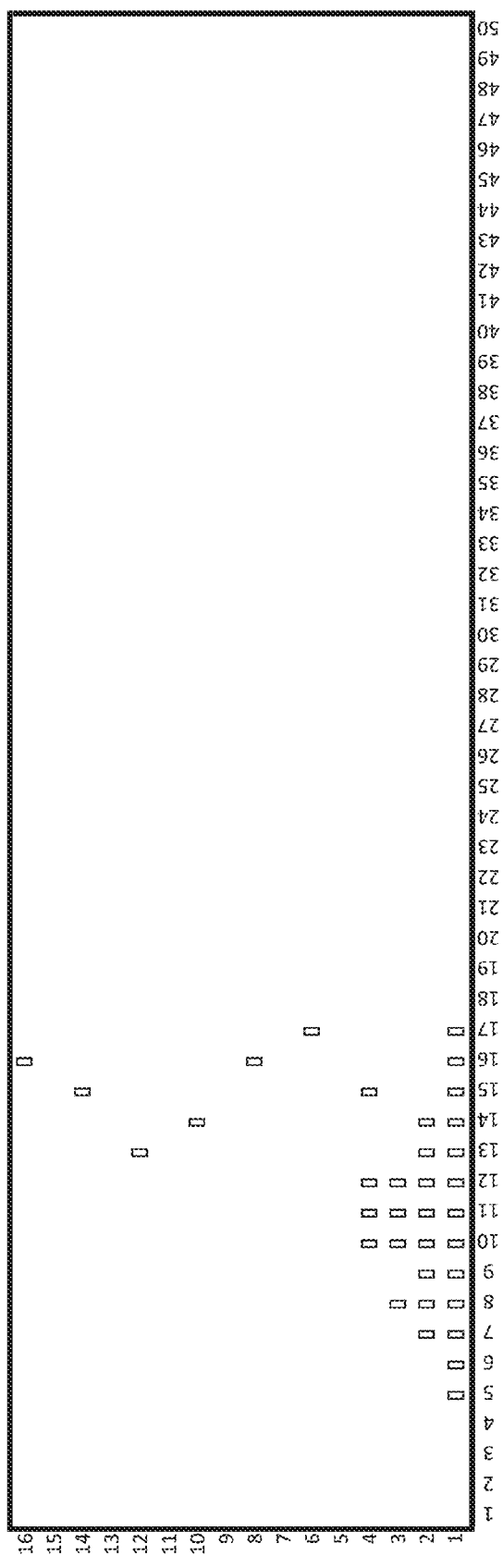
Figure 35K:
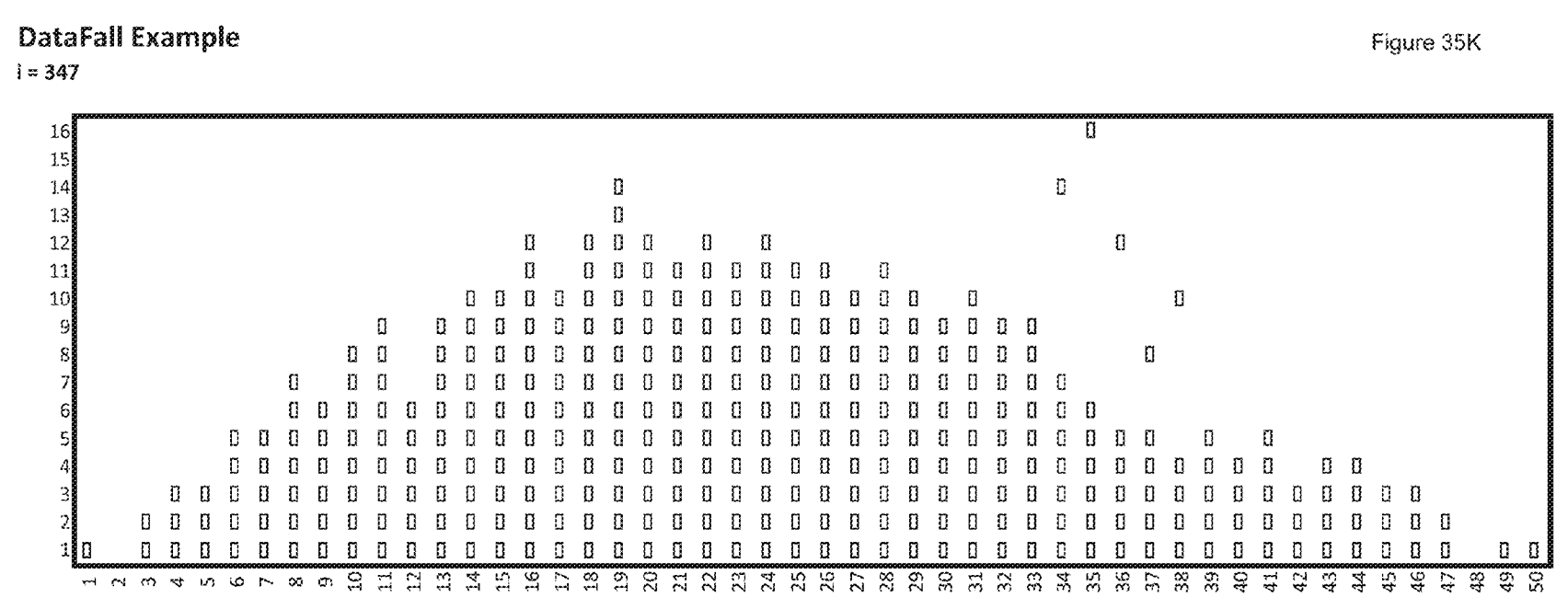
Figure 35N:
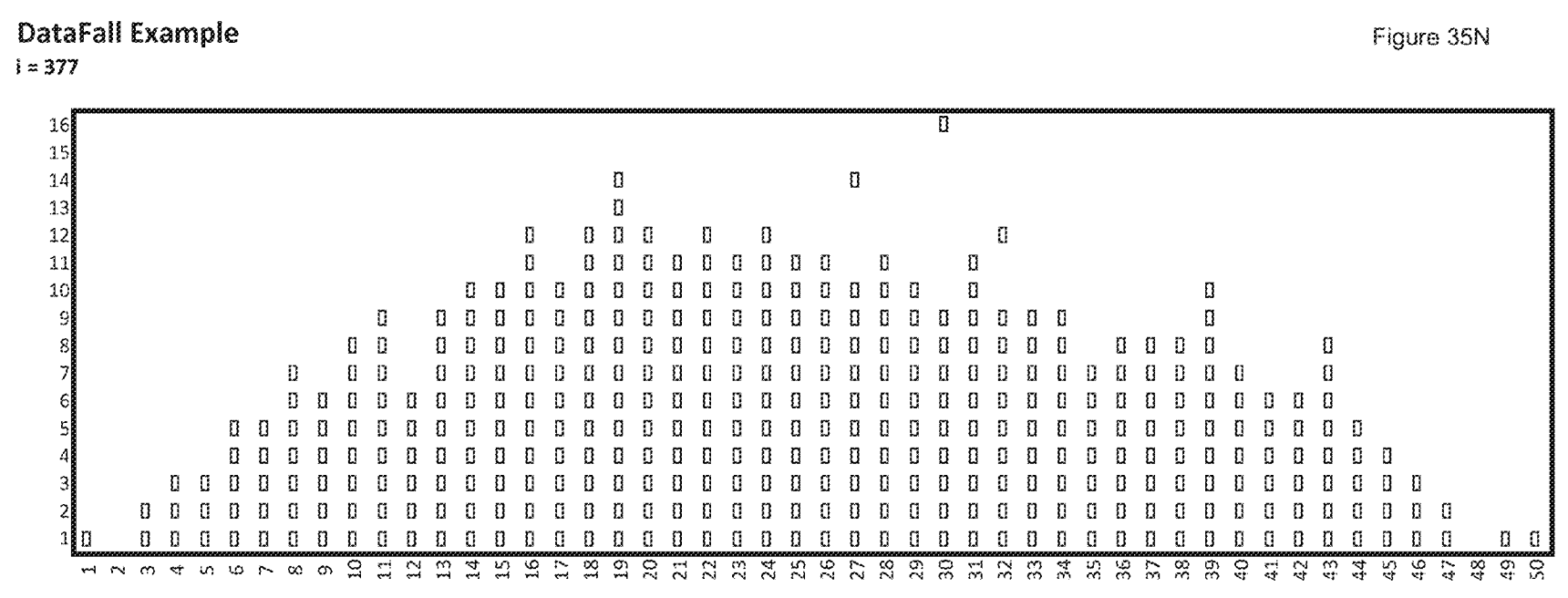

FIGS. 35A-35S illustrate an animated graphical display of the DataFall effect shown in FIGS. 4A-4B. FIGS. 35A-35S show this effect as a series of successive screen captures. The DataFall Speed selection button in FIG. 9A allows the user to adjust the speed by which the data points fall. In FIGS. 35A-35S, the x-axis can be shown as either a percent change or as a standard deviation from the median, depending upon the selection made by the user in the selection buttons in FIG. 9A.

Figure 36:
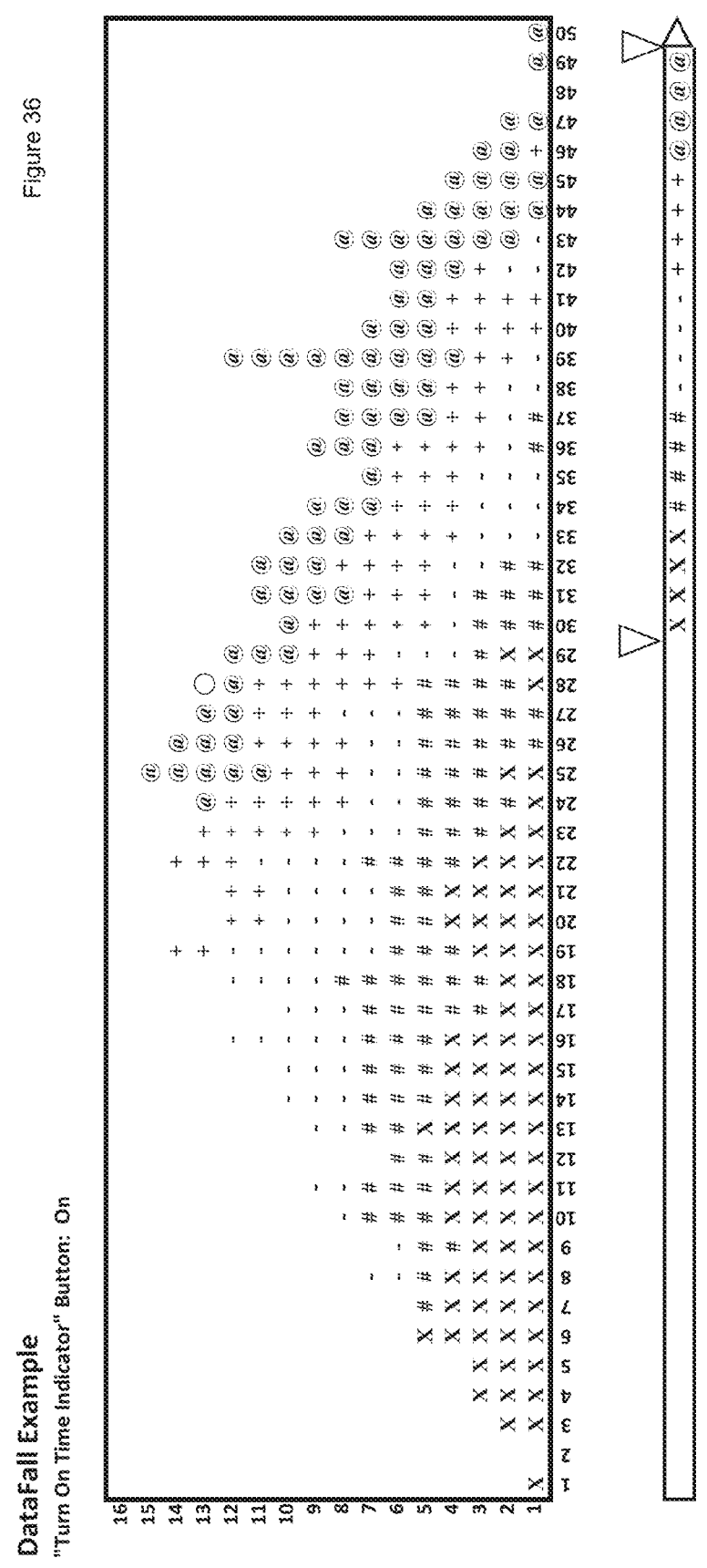

FIG. 36 illustrates the final output screen of the DataFall effect. This screen is thus identical to FIG. 35S. However, FIG. 36 is illustrated using different symbols to show data points that would be displayed in various colors according to the data point's time quintiles, as described above in item 7 of the explanation of the DataFall screen/chart of FIG. 9A.

The discussion below provides additional details regarding the Index Finder Algorithms illustrated in FIGS. 2A-2C.

The system tracks 80 stock indexes and 250 macroeconomic indicators, which are examined in relationship to three different time lags. Therefore, each night the system creates 60,000 datasets that need to be analyzed. In order to automate this process, the system includes the Index Finder feature to analyze, score, sort and rank each dataset and stock index. The result of the Index Finder process is that the system makes suggestions to the User as to which stock index is at the low end of its historic price pattern and which are at the high end. Based on the concept of Regression towards the Mean, the Index Finder provides long-term investors with strong buy or sell signals.

The Index Finder analyzes each of the datasets by way of two tests:
1. An outlier test, and
2. A normal distribution curve test Outlier Test The outlier test checks to see whether the most recent closing price of the dataset being examined is on either the far left-hand or far right-hand side of their frequency distribution histogram. If the most recent closing price is located in either tail of the dataset's curve, then it is historically high or low. Since the calculation to determine whether the most recent closing price in a dataset is an outlier is the far easier calculation than those that are performed in the normal distribution curve test, this is the first calculation that will be performed.

The formula for the outlier test is:

$$y < Q1\ 1.5 \times IQR\ \text{or}$$

$$y > Q3 + 1.5 \times IQR$$

If the dataset passes the outlier test, the dataset will be said to be an outlier. Then it will move on to the normal distribution curve test.

Data sets with an outlier in the 1st Quartile will be called a Positive set. Data sets with an outlier in the 4th Quartile will be called a Negative set. Positive sets are those where the most recent closing price is on the historically low side (left-hand side) of the dataset's historical price pattern, and are therefore considered to be a buy signal. Negative sets are those where the most recent closing price is on the historically high side (right-hand side) of the dataset's historical price pattern, and therefore a sell/short signal.

Normal Distribution Curve Test

This process involves two steps:
1. Normal Probability Plot:

The normal probability plot converts each dataset's frequency distribution histogram into a scatterplot. A frequency distribution histogram is often represented as a curve, which difficult to measure and compare. By converting the curve into a straight line, the data is more easily analyzed. If the scatterplot forms a straight line with a certain slope, it means that the dataset's frequency distribution is normally distributed. If the values on the scatterplot are randomly distributed, so is the dataset.

A normal probability plot is formed by:
a) Vertical axis: Ordered response values
b) Horizontal axis: Normal order statistic medians or means These are calculated according to the following formula. For each data value i-1, ..., n, find $z_i$ such that:

$$P(Z < z_i) = \begin{cases} 1 - 0.5^{1/n} & \text{for } i = 1 \\ 0.5^{1/n} & \text{for } i = n \\ \dfrac{i - 0.3175}{n + 0.365} & \text{otherwise} \end{cases}$$

That is, the observations are plotted as a function of the corresponding normal order statistic medians. Another way to think about this is that the sample values are plotted against what one would expect to see if the dataset was strictly consistent with the normal distribution. While frequency distribution histograms that are normally distributed have the familiar Bell Curve shape, once they have been converted by the normal probability plot, they resemble a straight line.

If the data is consistent with a sample from a normal distribution the points should lie close to a straight line. As a reference, a straight line can be fit to the points. The further the points vary from this line, the greater the indication of departure from normality. If the sample has mean 0, standard deviation 1 then a line through 0 with slope 1 could be used. How close to the line the points will lie does depend on the sample size. For a large sample, >100, we would expect the points to be very close to the reference line. Smaller samples will see a much larger variation, but might still be consistent with a normal sample.

The Law of Large Numbers holds that datasets have achieved full credibility once they reach 1200 data points. In this system, which is based on the number of days that the stock market is open, this threshold is reached when the time period being analyzed is at least five years long. The system will produce output if the User analyzes a time period of less than five years, but the Law of Large Numbers suggests that time periods of less than five years have too few data points to be statistically credible.

2. Test for Linearity:

The system tests for linearity by calculating the correlation coefficients for each dataset. Correlation coefficients are a statistical measure that indicates the strength of association between two variables. The system utilizes the most common correlation coefficient, called Pearson's r, which measures the strength of the linear association between variables. The purpose of this test is to determine how closely the pattern created by the Normal Probability Plot comes to forming a straight line. If the Normal Probability Plot forms a straight line, then the dataset's frequency distribution is normally distributed and is considered to be highly predictive (as long as no exogenous factors alter the manner by which the historical pattern was/is developed).

Figure 37:
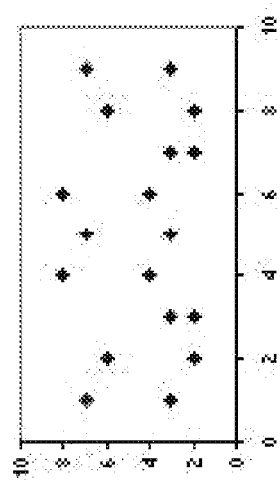
FIGS. 37-42 are prior art scatterplots which show how different patterns of data produce different degrees of correlation.
Figure 38:
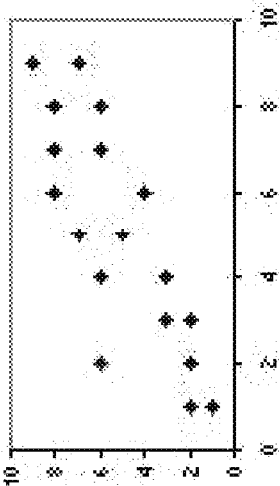
Figure 39:
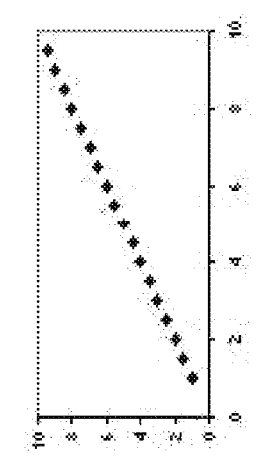
Figure 40:
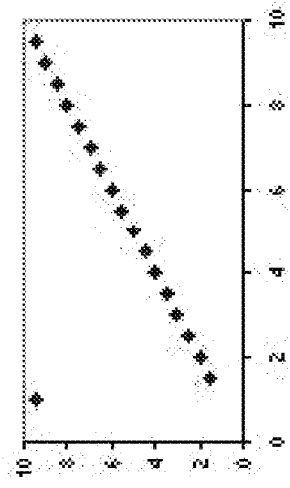
Figure 41:
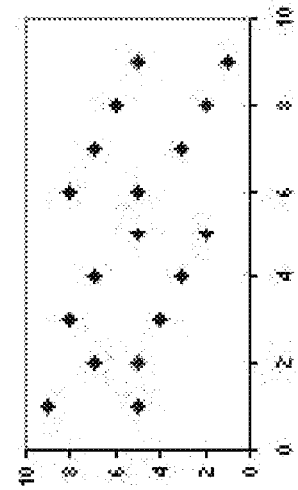
Figure 42:
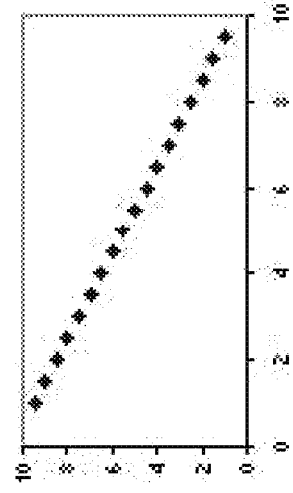

The sign and the absolute value of a correlation coefficient describe the direction and the magnitude of the relationship between two variables. The scatterplots below show how different patterns of data produce different degrees of correlation.

a) FIG. 37: Maximum positive correlation (r=1.00)
b) FIG. 38: Strong positive correlation (r=0.80)
c) FIG. 39: Zero correlation (r=0.00)
d) FIG. 40: Maximum negative correlation (r=−1.00)
e) FIG. 41: Moderate negative correlation (r=−0.43)
f) FIG. 42: Strong correlation and outlier (r=0.71)

Several points are evident from the scatterplots.
a) When the slope of the line in the plot is negative, the correlation is negative: and vice versa.
b) The strongest correlations (r=1.0 and r=−1.0) occur when data points fall exactly on a straight line.

c) The correlation becomes weaker as the data points become more scattered.
d) If the data points fall in a random pattern, the correlation is equal to zero.
e) Correlation is affected by outliers. Compare the first scatterplot with the last scatterplot.

The single outlier in the last plot greatly reduces the correlation (from 1.00 to 0.71).

There are several formulas that are used to calculate Pearson's r. The most common formula for computing it (r) is:

$$r = \Sigma(xy)/\sqrt{[(\Sigma x^2)*(\Sigma y^2)]}$$

Wherein $\Sigma$ is the summation symbol, x=xi−x, xi is the x value for observation i, x is the mean x value, y=yi−y, yi is the y value for observation i, and y is the mean y value.

Shape Scores, Combined Shape Scores, and Stock Index Ranking

The value of the Pearson's r for each dataset (which can range from −1.0 to 0 to +1.0) becomes the Shape Score for that dataset, with one important alteration. When the Pearson's r is calculated, its negative or positive value is indicative of whether the correlation between the variables is positive or negative. However, when the Pearson's r is converted into a Shape Score, the values are all converted into a positive number (because we are not interested in the correlation between the variables at this point) and then assigned a positive or negative number based on whether the most recent closing price is to the left or right of the median of the dataset's frequency distribution histogram. This alteration changes the Pearson's r into a new variable, that ranges from −1.0 to 0 to +1.0, which indicates whether that particular dataset has a frequency distribution histogram that strongly (or not) resembles a Bell Curve and whether that dataset's most recent closing price is an outlier to its historical price pattern, either at the high/right-hand (sell) or low/left-hand (buy) side of the Curve.

Once a Shape Score has been assigned to all the datasets which have passed both the Outlier and Normal Distribution Curve tests, then the system sorts each dataset based upon what stock index it refers to. All datasets which refer to the same stock index are grouped together. Then each group of datasets' Shape Scores are added together to create the Combined Shape Score for that group of datasets. The result is that each stock index (in the form of its proxy, the group of datasets that refer to that stock index that have passed both the Outlier and Normal Distribution Curve tests) now has a Combined Shape Score that indicates whether a plurality of variables indicate that:
1) The stock index's most recent closing price is relatively high or low, and is therefore very likely to regress back towards its mean in the medium-term;
2) The stock index's frequency distribution histogram closely resembles a Bell Curve, and can therefore be considered highly predictive in statistical terms; and
3) The plurality of the macroeconomic indicators and time lags indicate that the data all points in the same direction.

The system then ranks each stock index by its Combined Shape Scores and presents those with the highest negative Combined Shape Scores as "Historically High" and, therefore, likely to drop in price back towards its median level (which is a selling signal). It also presents those stock index with the highest positive Combined Shape Scores as "Historically Low" and, therefore, likely to rise in price back towards its median level (a buying signal).

Figure 43:
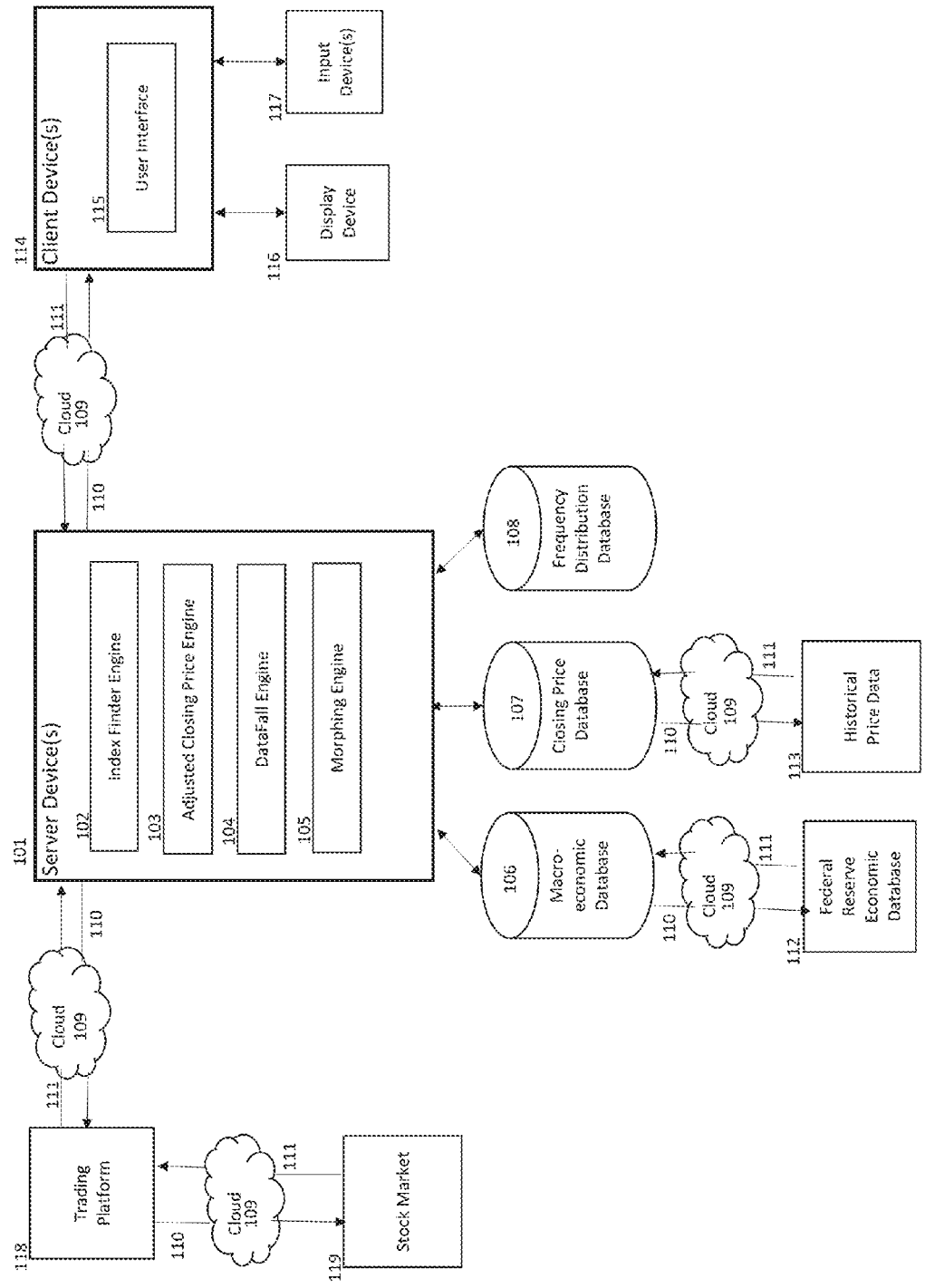
FIG. 43 is a hardware/software configuration in accordance with one preferred embodiment of the present invention.

FIG. 43 is a high level schematic of one preferred embodiment of a hardware/software configuration (system 100) for implementing the present invention. A Server Device 101 (also, referred to herein as a "processor") is attached to at least one data store, wherein data that is needed by the Server Device 101 resides in the Macroeconomic Database 106, Closing Price Database 107 and Frequency Distribution Database 108. Data regarding every tracked stock index and macroeconomic indicator are stored in their respective databases, updated nightly through a connection with outside data sources (e.g., Federal Reserve Economic Data 112 and Historical Price Data 113). The data created by the nightly Index Finder process is temporarily stored in the Frequency Distribution Database until it is replaced with the next day's calculations. Every dataset calculation which is completed is marked as such to be suggested to Users (also, referred to herein as "Investors") as Historically High or Historically Low, which can then be selected by the Users for trade execution via the system. Thus, the Frequency Distribution Database 108 provides summary information about the relative price of each stock index. Each time a User decides to execute a trade, the system 100 contacts a Trading Platform 118 which completes the transaction in the Stock Market 119 and returns confirmation of the executed trade.

Within the Server Device 101, several computational engines reside. The Index Finder Engine 102 performs the calculations described in FIGS. 2A-2C. The Adjusted Closing Price Engine 103 performs the calculations described in FIGS. 3A-3D. The DataFall Engine 104 performs the necessary calculations and creates the graphical animations described in FIGS. 4A-4B. The Morphing Engine 105 performs the necessary calculations and creates the graphical animations described in FIGS. 6A-6B.

While in some embodiments, Server Device 101 and one or more Client Device(s) 114 can reside on the same physical hardware, in most embodiments Server Device 101 and multiple Client Devices 114 will reside on separate hardware, communicating via Cloud 109. This Cloud 109 may be a local area network or a wide area network (e.g., the Internet). A user of the system 100 inputs data and modeling parameters via User Interface 115. The Server Device 101 returns its analyses, such as the generation of trade recommendations through the Index Finder and User-Defined Dataset Analysis, via output channel 111.

In a preferred embodiment, Server Device 101 communicates with Client Device 114 using standard established protocols, such as TCP/IP and HTTPS, and using data interchange formats such as XML and JSON. However, any acceptable communications protocols and data formats may be substituted.

There may be multiple instances of Client Device 114 connected to a single instance of the Server Device 101. In a preferred embodiment, communications between Server Device 101 and Client Device 114 are encrypted.

Client Device 114 is generally a device with significant computational ability. In a preferred embodiment, Client Device 114 runs the User Interface 115 code locally. In other embodiments, Client Device 114 may be a "thin" device, with most of the User Interface code being run in Server Device 101. In the described embodiment, User Interface 115 code comprises a web browser interpreting HTML, JavaScript, and other code, based on the capabilities of the underlying browser.

Client Device 114 has a Display Device 116 and one or more Input Devices 117, such as keyboard or mouse. In some embodiments, the Display Device 116 and Input Device 117 may be the same, as in the case of a touch-screen on a tablet computer.

The Server Device 101 processes input from the user communicated over input channel 110, utilizing the data in the Macroeconomic Database 106, Closing Price Database 107, and the Frequency Distribution Database 108 to model the Combined Shape Scores of each stock index that the system tracks, to generate a set of investment criteria, such as the output of the Index Finder feature, the User-Defined Dataset Analysis process, and Curve Morphing, and to execute the trade as instructed by the User (Investor). These functions are provided by Index Finder Engine 102, Adjusted Closing Price Engine 103, DataFall Engine 104, and Morphing Engine 105.

One preferred embodiment of the present invention first creates models of the historical price patterns of each of the stock indexes relative to a plurality of macroeconomic indexes, time lags, and time periods. It then processes the output of this model to select the investment criteria according to the criteria contained in the Index Finder process.

The present invention may be implemented with any combination of hardware and software. If implemented as a computer-implemented apparatus, the present invention is implemented using means for performing all of the steps and functions described above.

When implemented in software, the software code for the servers can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the servers may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of visualizing price history of a stock index in an animated graphical representation, the method comprising:
   (a) generating, using a processor, a dataset for a set of stock index closing prices adjusted by (i) a macroeconomic indicator, and (ii) a time lag, wherein the dataset includes a plurality of data points, each data point being an observed adjusted closing price of the stock index;
   (b) selecting, via a user interface, a time period of the price history to be visualized and electronically communicating the selected time period to the processor, wherein the selected time period has a plurality of segments, and each segment of the time period is distinguished by a different color and the data points are assigned a color based on their respective segment;

(c) providing a histogram on a display screen, the histogram having:
  (i) an x-axis representing the adjusted closing price of a stock index, and
  (ii) a y-axis representing the frequency of occurrence for each of the adjusted closing prices;
(d) animating the dataset in the histogram on the display screen using a datafall engine of the processor and the selected time period so that each data point appears at the top of the histogram at its x-axis value as a unique symbol which is then animated to fall in a straight line towards the bottom of the histogram, wherein each data point appears and falls in chronological order from the oldest data point to the most recent data point, the most recent data point being represented by a unique symbol that is visually distinct from the other data points in the dataset, each data point for the same x-axis value piling on top of an earlier data point; and
(e) constructing a frequency distribution histogram of the data points via the animation which visualizes the price history of the stock index in an animated graphical representation, the most recent data point being represented in the frequency distribution histogram by the unique symbol that is visually distinct from the other data points in the dataset.

2. The method of claim 1 wherein the time lag is either zero or a predetermined number of months.

3. The method of claim 1 further comprising:
(f) selecting via the user interface a data point on the constructed frequency distribution histogram; and
(g) displaying the data associated with the selected data point.

4. A method of creating an animated graphical representation of a frequency distribution for a chronologically ordered dataset, the method comprising:
(a) maintaining a database of chronologically ordered data points representing user-generated information;
(b) selecting, via a user interface, a time period of the range of data points to be visualized and electronically communicating the selected time period to a processor, wherein the selected time period has a plurality of segments, and each segment of the time period is distinguished by a different color and the data points are assigned a color based on their respective segment;
(c) providing a histogram on a display screen, the histogram having:
  (i) an x-axis representing the value of the data points, and
  (ii) a y-axis representing the frequency of occurrence for each of the values;
(d) animating the dataset in the histogram on the display screen using a datafall engine of the processor and the selected time period so that each data point appears at the top of the histogram at its x-axis value as a unique symbol which is then animated to fall in a straight line towards the bottom of the histogram, wherein each data point appears and falls in chronological order from the oldest data point to the most recent data point, the most recent data point being represented by a unique symbol that is visually distinct from the other data points in the dataset, each data point for the same x-axis value piling on top of an earlier data point; and
(e) constructing a frequency distribution chart of the data points via the animation which visualizes the dataset in an animated graphical representation, the most recent data point being represented in the frequency distribution histogram by the unique symbol that is visually distinct from the other data points in the dataset.

5. The method of claim 4 further comprising:
(f) selecting via the user interface a data point on the constructed frequency distribution histogram; and
(g) displaying the data associated with the selected data point.

6. The method of claim 4 wherein the data points represent adjusted historical stock index closing prices.

* * * * *